US012225345B2

(12) United States Patent
Fallon

(10) Patent No.: US 12,225,345 B2
(45) **Date of Patent: *Feb. 11, 2025**

(54) SOUND PRODUCTION USING SPEAKER ENCLOSURE WITH REDUCED INTERNAL PRESSURE

(71) Applicant: James J. Fallon, Armonk, NY (US)

(72) Inventor: James J. Fallon, Armonk, NY (US)

(73) Assignee: Monophase LLC, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,830

(22) Filed: Jan. 30, 2023

(65) Prior Publication Data

US 2023/0171536 A1 Jun. 1, 2023

Related U.S. Application Data

(60) Continuation of application No. 17/195,733, filed on Mar. 9, 2021, now Pat. No. 11,595,753, which is a (Continued)

(51) Int. Cl.

*H04R 1/26* (2006.01)
*H04R 1/02* (2006.01)
*H04R 1/28* (2006.01)

(52) U.S. Cl.

CPC ........... *H04R 1/2849* (2013.01); *H04R 1/021* (2013.01); *H04R 1/26* (2013.01); *H04R 1/2803* (2013.01);

(Continued)

(58) Field of Classification Search

CPC ...... H04R 9/025; H04R 1/2849; H04R 1/021; H04R 1/26; H04R 1/2803; H04R 1/2811; H04R 1/288; H04R 2201/029

See application file for complete search history.

(56) References Cited

U.S. PATENT DOCUMENTS 3,213,181 A 10/1965 Snoddy et al.
4,609,784 A 9/1986 Miller (Continued)

FOREIGN PATENT DOCUMENTS

GB 2083974 A 3/1982
WO 9307729 A 4/1993

(Continued)

OTHER PUBLICATIONS

PCT/US2019/046002, WO, Oct. 29, 2019, International Search Report and Written Opinion.

(Continued)

*Primary Examiner* — Suhan Ni

(74) *Attorney, Agent, or Firm* — Ryan, Mason & Lewis, LLP; Frank V. DeRosa

(57) ABSTRACT

Techniques are provided for generating sound using a speaker mounted to an enclosure (e.g., speaker cabinet) wherein a gas pressure level (e.g., air pressure level) inside the enclosure is lower than an ambient air pressure level outside the enclosure. The reduced gas pressure level within the enclosure provides an environment with a reduced pressure level at a back side of a speaker cone of the speaker, which enhances a low frequency response for a given speaker size, while also minimizing resonant frequencies and phase cancellation issues which could otherwise occur with conventional speaker systems in which acoustic sound waves are generated at the back side of the speaker cone. A pressure compensation system is utilized counteract a force applied to the front side of the speaker cone as a result of the gas pressure level inside the enclosure being lower than the ambient air pressure level outside the enclosure.

18 Claims, 27 Drawing Sheets

Related U.S. Application Data division of application No. 16/537,174, filed on Aug. 9, 2019, now Pat. No. 10,979,801.

(60) Provisional application No. 62/716,818, filed on Aug. 9, 2018.

(52) U.S. Cl.
CPC .......... *H04R 1/2811* (2013.01); *H04R 1/288* (2013.01); *H04R 2201/029* (2013.01)

(56) References Cited

U.S. PATENT DOCUMENTS

| | | | |
|---|---|---|---|
| 4,805,728 | A | 2/1989 | Carter et al. |
| 4,914,750 | A | 4/1990 | Lawson |
| 4,957,184 | A | 9/1990 | Negishi |
| 5,452,366 | A | 9/1995 | Sakamoto et al. |
| 6,738,490 | B2 | 5/2004 | Brandt |
| 6,904,158 | B1 | 6/2005 | Ohashi |
| 7,783,069 | B1 | 8/2010 | Miller et al. |
| 9,992,592 | B1 | 6/2018 | Alam et al. |
| 2002/0137478 | A1 | 9/2002 | Masamura |
| 2006/0039578 | A1 | 2/2006 | Stiles et al. |
| 2008/0019551 | A1 | 1/2008 | Watanabe |
| 2008/0043435 | A1 | 2/2008 | Yip et al. |
| 2009/0028374 | A1 | 1/2009 | Hashimoto et al. |
| 2010/0019584 | A1 | 1/2010 | Vercelli et al. |
| 2013/0089231 | A1 | 4/2013 | Wilk et al. |
| 2013/0283915 | A1 | 10/2013 | Booth |
| 2016/0286301 | A1 | 9/2016 | Agerkvist et al. |
| 2017/0195790 | A1 | 7/2017 | Choisel et al. |

FOREIGN PATENT DOCUMENTS

| | | | |
|---|---|---|---|
| WO | 2018139995 | A1 | 8/2018 |
| WO | 2016186997 | A1 | 11/2019 |

OTHER PUBLICATIONS

PCT/US2019/046002, WO, Sep. 15, 2020, International Preliminary Report on Patentability.
PCT/US2018/45663, WO, Oct. 25, 2018, International Search Report and Written Opinion.
R.G. Keen, "A Musical Distortion Primer," Geo-Fex Cybernetic Music, www.geofex.com/effxfaq/distn101.htm, 1993-2000, 7 pages.
"Chapter 1: Fundamentals of Amplification," unifi-uat.fusionwifi.com/chapter_1_fundamentals_of_amplification.pdf, Jun. 9, 2017, 35 pages.
amptone.com, "Guitar Amp Tone, Effects Placement, and Cranked-Amp Tone at Any Volume," http://www.amptone.com/, 1997, 22 pages.
Blackstone appliances.com, "Distortion 101," http://blackstoneappliances.com/dist101.html, 3 pages.
H. F. Olson, "The Measurement of Loudness," Audio, Feb. 1972, pp. 18-22.
wikipedia.org, "Ideal Gas Law," https://en.wikipedia.org/wiki/Ideal_gas_law, Oct. 6, 2017, 8 pages.
Thermaxx jackets.com, "Sound Pressure Math Made Easy," https://www.thermaxxjackets.com/sound-pressure-math/, Feb. 26, 2015, 6 pages.
sengpie/audio.com, "Levels and References of the Sound Quantities," http://www.sengpielaudio.com/calculator-soundvalues.htm, Jul. 30, 2017, 11 pages.
"Speed of Sound in Air," Physics of Music—Notes, https://pages.mtu.edu/~suits/SpeedofSound.html, 2 pages.
wikipedia.org, "Sound Pressure," https://en.wikipedia.org/wiki/Sound_pressure, Jun. 30, 2017, 10 pages.
wikipedia.org, "Isolation Cabinet (Guitar)," https://en.wikipedia.org/wiki/Isolation_cabinet_(guitar), Jul. 23, 2015, 3 pages.
wikipedia.org, "Sound Energy Density," https://en.wikipedia.org/wiki/Sound_energy_density, Nov. 3, 2016, 2 pages.
M. Florentine, "It's Not Recruitment—Gasp! It's Softness Imperception," Hearing Journal, Mar. 2003, 9 pages, vol. 56, No. 3.
wikipedia.org, "Loudness," https://en.wikipedia.org/wiki/Loudness, Sep. 26, 2017, 5 pages.
wikipedia.org, "Loudspeaker," https://en.wikipedia.org/wiki/Loudspeaker, Sep. 13, 2017, 32 pages.
wikipedia.org, "Power Attenuator (Guitar)," https://en.wikipedia.org/wiki/Power_attenuator_(guitar), Aug. 21, 2017, 2 pages.
EBU—Operating Eurovision and Euroradio, "Loudness Normalisation and Permitted Maximum Level of Audio Signals," EBU R 128-2014, Jun. 2014, 5 pages.
wikipedia.org, "Sound Pressure," https://en.wikipedia.org/wiki/Sound_pressure, Sep. 15, 2017, 11 pages.
fuzzeffect.com, "FuzzEffect—The Fuzz Story & Photos," http://www.fuzzeffect.com/, 1 page.
R. Aiken, "What is "Sag"?," Aiken Amplification, Inc., Feb. 19, 2014, 3 pages.
"Loudness and the Perception of Intensity," http://www.phon.ucl.ac.uk/courses/spsci/AUDL4007/Intensity%202014.pdf, 45 pages.

200

1000

1400

1700-1

1800-1

1800-2

1800-3

1800-4

FIG. 19
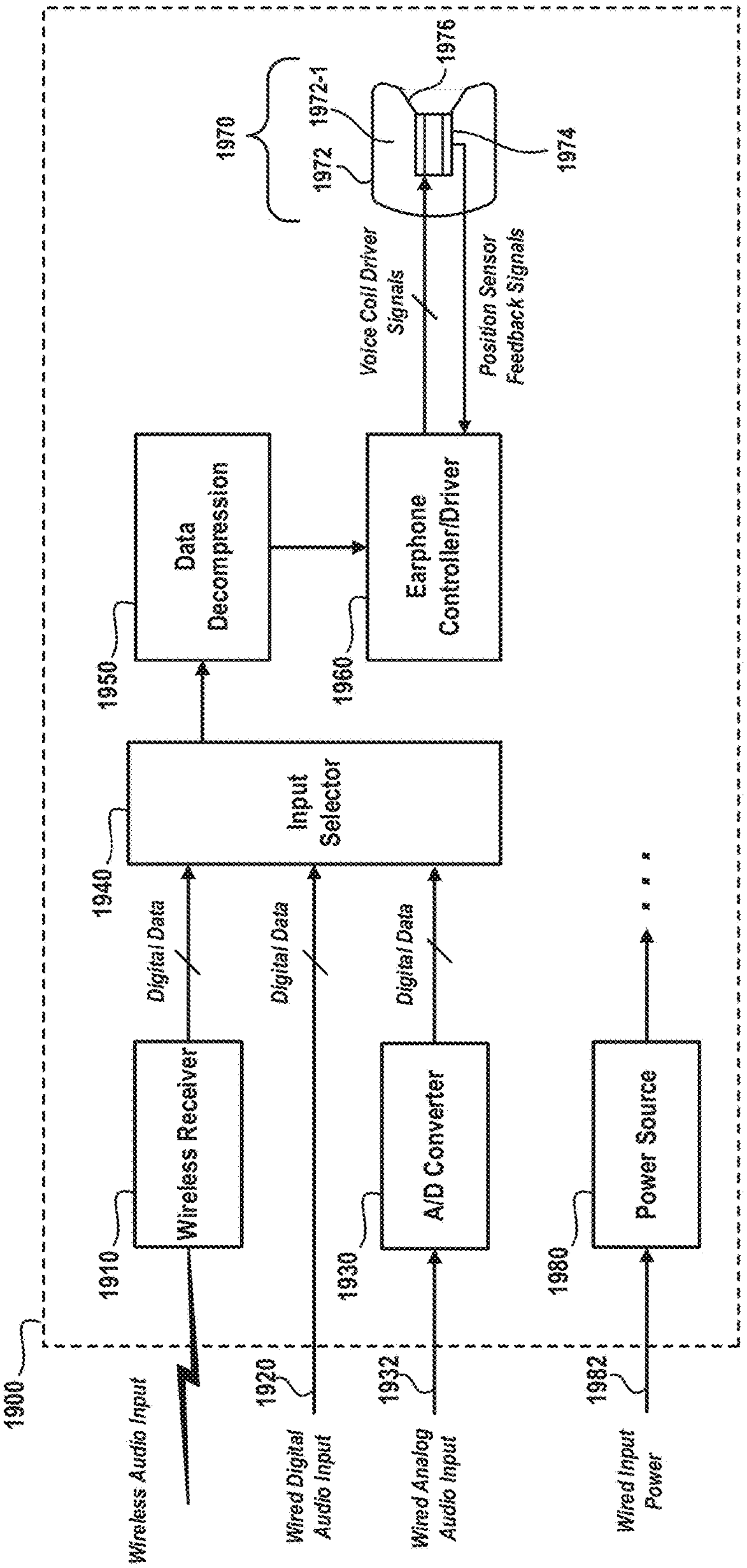
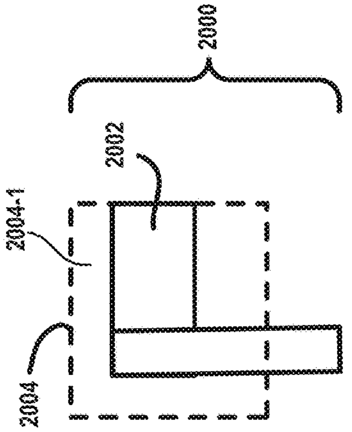
FIG. 20

FIG. 21

| TEMPERATURE (Celsius) | SPEED OF SOUND (meters/second) |
|---|---|
| -40 | 306.2 |
| 0 | 331.4 |
| 5 | 334.4 |
| 10 | 337.4 |
| 15 | 340.4 |
| 20 | 343.3 |
| 25 | 346.3 |
| 30 | 349.1 |
| 40 | 354.7 |
| 50 | 360.3 |
| 60 | 365.7 |
| 70 | 371.2 |
| 80 | 376.6 |
| 90 | 381.7 |
| 100 | 386.9 |
| 200 | 434.5 |
| 300 | 476.3 |
| 400 | 514.1 |
| 500 | 548.8 |
| 1000 | 694.8 |

FIG. 22

| SOLID MATERIAL | SPEED OF SOUND (meters/sec) |
|---|---|
| Aluminum, shear – longitudinal wave | 3040 - 6420 |
| Beryllium | 12890 |
| Brass | 3500 – 4700 |
| Brick | 3600 – 4200 |
| Concrete | 3200 – 3700 |
| Copper | 3560 – 3900 |
| Cork | 366 – 518 |
| Diamond | 12000 |
| Glass | 3950 – 5000 |
| Glass, pyrex | 5640 |
| Gold | 3240 |
| Granite | 5950 |
| Iron | 3850 – 5130 |
| Lead | 1160 – 1320 |
| Lucite | 2680 |
| Rubber, butyl | 1830 |
| Rubber | 40 – 150 |
| Silver | 3650 |
| Steel | 4880 – 5050 |
| Steel, stainless | 5790 |
| Titanium | 6070 |
| Wood (hard) | 3960 |
| Wood | 3300 – 5000 |

| GASEOUS MATERIAL | SPEED OF SOUND (meters/sec) |
|---|---|
| Acetaldehyde | 278 |
| Air | 329 |
| Air, 20°C | 343 |
| Ammonia (30°C) | 440 |
| Argon | 307.85 |
| Benzene (90°C) | 200 |
| Bromine (58°C) | 149 |
| Carbon dioxide (51°C) | 280 |
| Carbon disulfide (35°C) | 206 |
| Carbon monoxide | 336 |
| Carbon tetrachloride (22°C) | 133 |
| Chloroform (22°C) | 154 |
| Cyclohexan (30°C) | 181 |
| Deuterium | 888 |
| Diethyl ether (40°C) | 187 |
| Ethane (31°C) | 316 |
| Ethylene (20°C) | 327 |
| Fluorine (102°C) | 332 |
| Trichlorofluoromethane R11 (18°C) | 143 |
| 1,1,2-trichloro-1,2,2-trifluoroethane R113 (53°C) | 124 |
| Dichlorodifluoromethane R12 (17°C) | 140 |
| Chlorodifluoromethane R22 (17°C) | 179 |
| Helium | 972 |
| Hydrogen | 1290 |
| Hydrogen bromide | 200 |
| Hydrogen chloride | 296 |
| Hydrogen iodine | 157 |
| Hydrogen sulfide (24°C) | 309 |
| Krypton (30°C) | 224 |
| Methane (41°C) | 466 |
| Neon (30°C) | 461 |
| Nitric oxide (16°C) | 334 |
| Nitrogen (29°C) | 354.4 |
| Nitrous oxide (25°C) | 268 |
| Oxygen | 316 |
| Oxygen (30°C) | 332.2 |

FIG. 23

| LIQUID MATERIAL | SPEED OF SOUND (meters/sec) |
|---|---|
| Acetic acid (19.6°C) | 1173 |
| Acetone (25°C) | 1170 |
| Alcohol, ethyl (ethanol) (25°C) | 1144 |
| Alcohol, methyl (25°C) | 1103 |
| Alcohol, propyl | 1205 |
| Aniline (25°C) | 1640 |
| Argon (-243°C) | 840 |
| Benzene (25°C) | 1298 |
| Bismuth (280°C) | 1651 |
| Caesium (40°C) | 980 |
| Carbon disulfide (25°C) | 1242 |
| Carbon tetrachloride (25°C) | 926 |
| Castor oil | 1474 |
| Chloroform (25°C) | 984 |
| Chlorobenzene (25°C) | 1270 |
| Cyclohexane (20°C) | 1280 |
| Cyclohexanol (25°C) | 1465 |
| Ether | 985 |
| Ethylene glycol (25°C) | 1660 |
| Glycerol (glycerine) (25°C) | 1920 |
| Helium (-269°C) | 180 |
| Heptane | 1138 |
| Hexane | 1203 |
| n-Hexanol (25°C) | 1303 |
| Hydrogen (-255°C) | 1246 |
| Indium (160°C) | 2313 |
| Kerosene | 1324 |
| Lead (340°C) | 1766 |
| Mercury (25°C) | 1450 |
| Methane (-170°C) | 1420 |
| Napthalene (100°C) | 1248 |
| Neon (-243°C) | 540 |
| Nitrogen (-202°C) | 1056 |
| Octane | 1171 |

| LIQUID MATERIAL | SPEED OF SOUND (meters/sec) |
|---|---|
| Oil (castor) (25°C) | 1490 |
| Oil (lubricating) (25°C) | 1461 |
| Oxygen (-202°C) | 1056 |
| Potassium (80°C) | 1869 |
| n-Pentanol (25°C) | 1277 |
| Phenol | 1274 |
| n-Propanol (25°C) | 1207 |
| Pyridine (25°C) | 1417 |
| Rubidium (50°C) | 1247 |
| Sodium (110°C) | 2520 |
| Tin (240°C) | 2471 |
| Toluene (25°C) | 1306 |
| Turpentine | 1240 |
| Water | 1493 |
| Water, 0°C | 1402 |
| Water, 20°C | 1482 |
| Water, sea with 3.5% salinity | 1533 |
| Water, sea with 3.5% salinity, 20°C | 1522 |
| Zinc (450°C) | 2780 |

FIG. 24

SOUND PRODUCTION USING SPEAKER ENCLOSURE WITH REDUCED INTERNAL PRESSURE

CROSS-REFERENCE TO RELATED APPLICATIONS

This application is a Continuation of U.S. patent application Ser. No. 17/195,733, filed on Mar. 9, 2021, which is a Divisional of U.S. patent application Ser. No. 16/537,174, filed on Aug. 9, 2019, now U.S. Pat. No. 10,979,801, which claims priority to U.S. Provisional Application Ser. No. 62/716,818, filed on Aug. 9, 2018, the disclosures of which are fully incorporated herein by reference.

TECHNICAL FIELD

The present disclosure relates generally to audio recording and audio reproduction techniques.

BACKGROUND

Since the early 1950s, musicians have utilized various distortion techniques to alter the sound of amplified electric musical instruments, such as electric guitars, to produce distorted sounds that are typically desired for use in recording many types of music genres including pop, blues, and rock music. In general, such distortion techniques include, for example, overdriving preamplifiers and/or power amplifiers, creating power supply sag, causing output transformer saturation, overdriving speakers, utilizing specially designed "distortion effect" pedal devices. There are limitations to each type of distortion technique, and often the more desirous power amplifier, output transformer, and speaker distortion techniques require operating an amplifier at or near its maximum output power level for driving speakers, which results in correspondingly high sound pressure levels emanating from the speakers.

With the advent of low-cost high resolution non-linear multi-track recording systems, low-cost preamplifiers, inexpensive microphones and monitor systems, along with virtual instruments and effects processors, home recording has reached near epidemic levels. The ability to record music at home has created a revolution in music production. However, the use of overdriving amplifiers to achieve the desired distorted sound of amplified electric musical instruments, such as guitars, can be problematic in-home environments and many other places due to the significantly high sound pressure levels that are output from the speakers, which can be disruptive and audibly annoying to nearby individuals and neighbors.

In both commercial and home recording spaces, the high sound pressure levels utilized for amplified instrument recording causes significant complexity and cost in designing and building recording studios. Various instruments and players are often recorded simultaneously on separate recording tracks and require significant if not near perfect acoustic isolation from each other. For example, if a singer and a guitar player are recording simultaneously, then the guitar amplifier will need to be physically and acoustically isolated from the singer and the microphone. The high sound pressure level from the guitar amplifier often acoustically bleeds into the singer's microphone, making it difficult or often not possible to process the singer's voice. Thus, typical mixing effects utilized in real-time or during post recording editing and mixing (such as pitch correction with Autotune® or Melodyne®), along with the myriad of other modern effects utilized in production, will not function properly as the vocal track is essentially contaminated by the sound of the guitar amplifier. In addition, high sound pressure levels can damage certain types of microphones, for example ribbon microphones, prohibiting their use and/or limiting the placement of certain types of microphones for recording.

Further, it would be highly advantageous to also employ a smaller speaker or speakers in a system that is capable of recording high power levels of sound at low sound pressure levels. This would enable the system to be easily transported with the user for use at other recording locations or, indeed even for live use, when coupled to a sound reinforcement system, or incorporated into various pieces of equipment such as instrument amplifiers, recording consoles, musical instruments and equipment, and sound reinforcement systems or musical playback devices.

In addition to the need for being able to record at high power levels of sound at low sound pressure levels, there is a pressing need for the ability to reproduce sound with smaller speakers that can reproduce a wide range of frequencies including low audio frequencies. Most modern speakers have difficulty reproducing frequencies that possess wavelengths longer than the diameter of the speaker cone. The ability to reproduce sound with smaller speakers and speaker enclosures is widely needed for personal listening, earphones, audiophile sound systems, and in the sound reinforcement industry. In addition, within the current art there is a pressing need for speakers with highly accurate sound reproduction capability and speakers with accurate fidelity at lower costs. Currently speakers with highly accurate sound reproduction capability are expensive, requiring complex phase compensation systems or electronic networks, employ multiple or partitioned enclosures to avoid multi speaker element coupling, utilize large dense enclosures to reduce resonant frequencies, and incorporate ports or passive radiators to reduce nonlinear effects and distortion from speaker enclosure out of phase back pressure. These and other limitations of current art speaker systems are eliminated or reduced by embodiments of the disclosure.

SUMMARY

Embodiments of the disclosure generally include apparatus, systems, and methods for generating sound using one or more speakers mounted to an enclosure (e.g., speaker cabinet) with a reduced internal pressure within the enclosure. For example, in one embodiment, an apparatus comprises a speaker mounted to an enclosure with a front side of a speaker cone of the speaker facing outside the enclosure and a back side of the speaker cone facing inside the enclosure. A gas pressure level inside the enclosure is lower than an ambient air pressure level outside the enclosure, and the enclosure is sealed to maintain the lower gas pressure level inside the enclosure. The apparatus comprises a pressure compensation system which is configured to counteract a force applied to the front side of the speaker cone as a result of the gas pressure level inside the enclosure being lower than the ambient air pressure level outside the enclosure.

In another embodiment, an apparatus comprises an enclosure, a speaker mounted to the enclosure, and a pressure compensation system. A gas pressure level inside the enclosure is lower than an ambient air pressure level outside the enclosure. The enclosure is sealed to maintain the lower gas pressure level inside the enclosure. The speaker comprises a speaker cone and a voice coil assembly comprising a voice coil coupled to the speaker cone. The speaker is mounted to the enclosure with a front side of the speaker cone facing outside the enclosure and a back side of the speaker cone facing inside the enclosure. The pressure compensation system is configured to move the voice coil to a target null position within the voice coil assembly and thereby compensate for a pressure differential between the ambient air pressure level at the front side of the speaker cone and the lower gas pressure level at the back side of the speaker cone, while allowing the voice coil to move back and forth about the target null position in response to an audio signal applied to the voice coil during operation of the speaker.

Another embodiment includes a method which comprises (i) powering up a speaker system, the speaker system comprising a speaker mounted to an enclosure and a voice coil position control system, wherein the speaker comprises a speaker cone and a voice coil assembly comprising a voice coil coupled to the speaker cone, wherein the speaker is mounted to the enclosure with a front side of the speaker cone facing outside the enclosure and a back side of the speaker cone facing inside the enclosure, wherein a gas pressure level inside the enclosure is lower than an ambient air pressure level outside the enclosure, and wherein the enclosure is sealed to maintain the lower gas pressure level inside the enclosure; and (ii) in response to powering up the speaker system, the voice coil position control system generating a position control signal and applying the position control signal to the voice coil of the voice coil assembly of the speaker. The position control signal comprises a direct current signal that is configured to generate an electromagnetic force that is sufficient to move the voice coil to the target null position, while allowing the voice coil to move back and forth about the null position in response to an audio signal applied to the voice coil during operation of the speaker.

Another embodiment includes an earphone device, which comprises an earphone mounted to an enclosure, wherein the earphone comprises a speaker cone and a voice coil assembly comprising a voice coil coupled to the speaker cone, wherein the earphone is mounted to the enclosure with a front side of the speaker cone facing outside the enclosure and a back side of the speaker cone facing inside the enclosure, wherein a gas pressure level inside the enclosure is lower than an ambient air pressure level outside the enclosure, and wherein the enclosure is sealed to maintain the lower gas pressure level inside the enclosure. The earphone device comprises a voice coil position control system that is configured to generate a position control signal and apply the position control signal to the voice coil of the voice coil assembly of the earphone. The position control signal comprises a direct current signal that is configured to generate an electromagnetic force that is sufficient to move the voice coil to the target null position, while allowing the voice coil to move back and forth about the null position in response to an audio signal applied to the voice coil during operation of the earphone.

For speaker enclosures (e.g., speaker cabinets) and earphone speaker enclosures, etc., the lower internal pressure within the enclosure provides an environment with a reduced pressure level at a back side of a speaker cone of the speaker, which enhances a low frequency response for a given speaker size, while also minimizing resonant frequencies and phase cancellation issues which could otherwise occur with conventional speaker systems in which acoustic sound waves are generated at the back side of the speaker cone. In particular, reducing the pressure in the region behind the speaker cone has the effect of reducing or eliminating the generation of resultant out-of-phase acoustic signals at the back of the speaker cone, which in turn eliminates issues of phase cancellation for low frequencies, and allows smaller speakers and speaker systems to reproduce much lower frequencies than is presently possible with conventional speaker cabinet and enclosure designs.

Other embodiments of the disclosure will be described in the following detailed description of embodiments, which is to be read in conjunction with the accompanying figures.

BRIEF DESCRIPTION OF THE DRAWINGS

FIG. 19 schematically illustrates a sound reproduction apparatus which comprises a voice coil position control system to compensate for a pressure differential between a front side and back side of an earphone device, according to another embodiment of the disclosure.

FIG. 20 schematically illustrate a sound isolation apparatus for implementation with an earphone, according to another embodiment of the disclosure.

FIG. 21 illustrates a table with information regarding the speed of sound in air at different air temperatures.

FIG. 22 illustrates a table of information regarding the speed of sound in different solid materials.

FIG. 23 illustrates a table of information regarding the speed of sound in different gaseous materials.

FIG. 24 illustrates tables of information regarding the speed of sound in different liquid materials.

DETAILED DESCRIPTION

Figure 1:
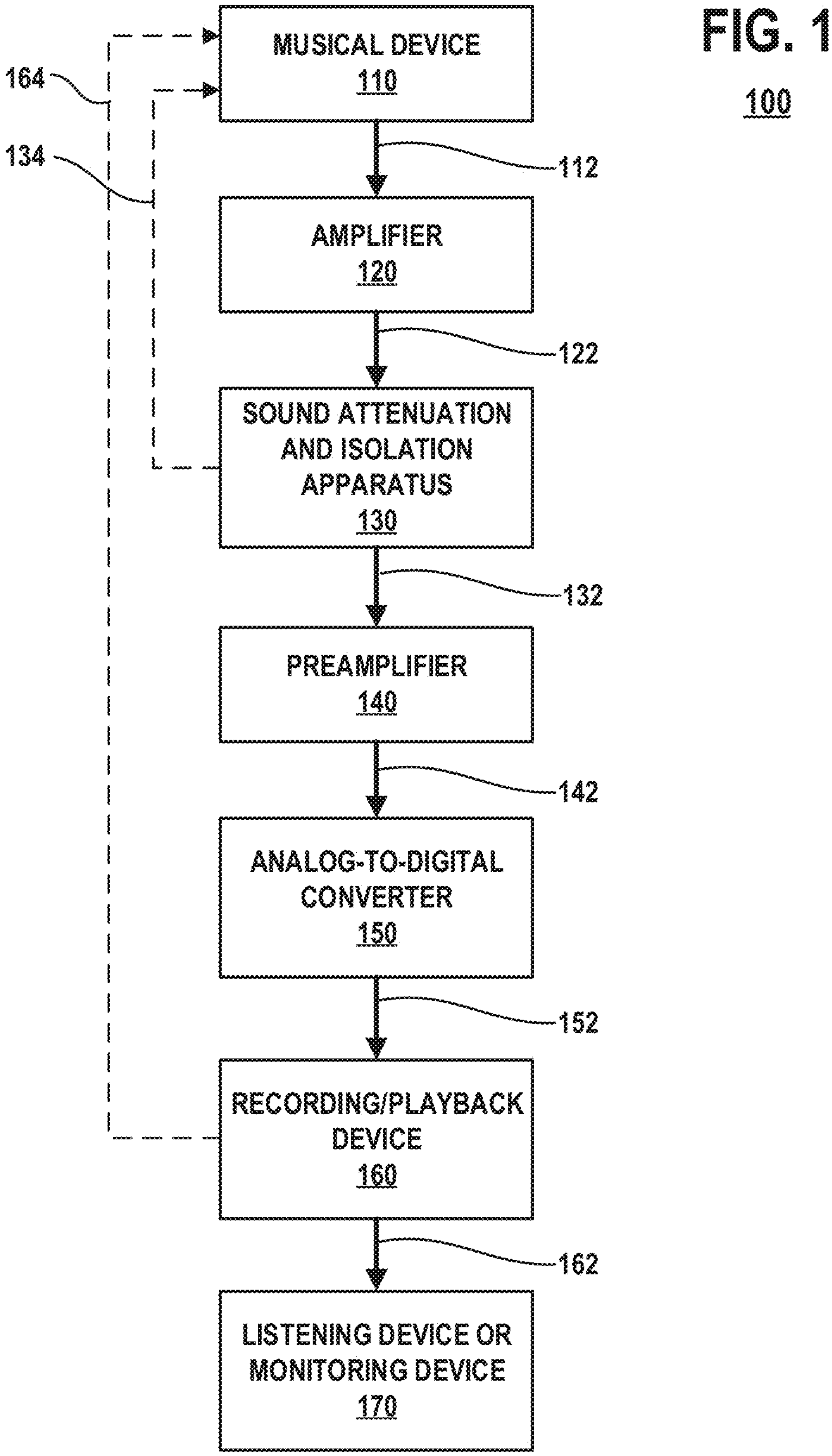
FIG. 1 illustrates a block diagram of a system for recording high output power levels of sound at low loudness levels using a sound attenuation and isolation apparatus, according to an embodiment of the disclosure.

Embodiments of the disclosure will now be described in further detail with regard to systems, methods, and apparatus for recording high output power levels of sound at low sound pressure levels using microphones and speakers disposed within an enclosure (e.g., speaker cabinet) with reduced internal pressure within the enclosure, as well systems, methods and apparatus for producing sound with speakers that are mounted to an enclosure (e.g., speaker cabinet) with reduced internal pressure within the enclosure. It is to be understood that the same or similar reference numbers are used throughout the drawings to denote the same or similar features, elements, or structures, and thus, a detailed explanation of the same or similar features, elements, or structures will not be repeated for each of the drawings. It is to be further understood that the term "about" as used herein with regard to thicknesses, widths, lengths, etc., is meant to denote being close or approximate to, but not exactly.

As explained in further detail below, embodiments of the disclosure include different configurations of sound attenuation and isolation apparatus. In general, a sound attenuation and isolation apparatus according to an embodiment of the disclosure comprises an enclosure, at least one speaker disposed within the enclosure, at least one microphone disposed within the enclosure, and an evacuation port disposed within a wall of the enclosure. The evacuation port is configured to connect to a system that can evacuate air or any other gas from within the enclosure to reduce a pressure level within the enclosure to a level that is less than an ambient air pressure level outside the enclosure. The enclosure is sealed or otherwise configured to provide a sealed enclosure, to maintain the reduced air/gas pressure within the enclosure. The speaker can be driven at high output power levels from an amplifier to generate a distorted sound of an amplified electric musical instrument for recording purposes, while the reduced pressure level within the enclosure serves to attenuate the sound pressure level within the enclosure, which in turn reduced the perceived loudness of sound which emanates from the enclosure.

It should be noted that the sealed enclosure may have an acceptable leak rate such that the reduced pressure level within the enclosure is maintained for an acceptable period of time for recording use in between evacuations of the enclosure. The evacuations may be conducted at any time prior to, during, or after use including one time, periodically, or on an as-needed basis to reduce the pressure level within the enclosure to the desired level. In particular, the evacuations to reduce the pressure level in the enclosure may be performed one time or periodic, intermittent, semi-continuous, or continuous basis, depending on factors such as (i) the leak rate of the enclosure (if any), (ii) the desired reduced pressure level from ambient in the enclosure, (iii) the rate of evacuation from the evacuation device, and (iv) the method of evacuation.

In this regard, a sound attenuation and isolation apparatus according to an embodiment of the disclosure serves as an "isolation cabinet" which provides a sound-proof or semi-sound proof enclosure that surrounds the speaker and sound-capturing microphone and prevents sound leakage from within the enclosure to the outside environment. In addition, the decreased pressure within the enclosure (e.g., reduced pressure in a range from below 1 atmosphere to near-vacuum pressure level) serves to attenuate the sound pressure level within the enclosure, and thus reduces the perceived loudness in sound which emanates from the enclosure. In other words, the reduced pressure within the enclosure results in a substantive reduction in sound leakage from within the enclosure to the outside environment. The pressure inside the enclosure can be reduced to at least 10%, 15%, 20%, 25%, 30%, 35%, 40%, 45%, 50%, 55%, 60%, 65%, 70%, 75%, 80%, 85%, 90%, or 95% lower than the ambient air pressure level outside the enclosure, or more generally, in a range of about 10% to about 95% less than the ambient pressure level outside the enclosure. The sound attenuation and isolation apparatus provides a unique solution for overdriving an amplifier to high output power levels for operating the speaker within the enclosure to achieve the distorted sound of amplified electric musical instruments for recording purposes, while reducing the perceived loudness of the sound signal which is generated by the speaker. In other words, the lower the pressure within the enclosure, the lower the sound pressure level produced for an equivalent excursion of the speaker.

Sound level is typically defined in terms of sound pressure level (SPL). SPL is a logarithmic measure of the effective sound pressure of a sound relative to a reference value. It is measured in decibels (dB) above a standard reference level. The standard reference sound pressure in air or other gases is 20 μPa, which is usually considered the threshold of human hearing (at 1 kHz). Sound pressure (ρ) is a local pressure deviation from the ambient (average, or equilibrium) atmospheric pressure, caused by a sound wave. In air, sound pressure can be measured using a microphone. The SI unit for sound pressure (ρ) is the pascal (symbol: Pa), which equates to 1 Newton per Meter squared (1 $N/m^2$).

Propagating sound waves in air or a gas induce localized deviations called dynamic pressure in the ambient air or gas referred to as static pressure. If we define the total pressure as ρtotal, the static pressure as ρstatic, and the sound pressure as ρ, then we have the following relationship:

$$\rho total = \rho static + \rho \qquad \text{EQN. [1]}$$

If we define Lρ as SPL, the logarithmic measure of the effective pressure of sound relative to a reference value, $\rho_0$ as our reference sound pressure which we will set as 20 μPa (ANSI S1.1-1994 reference level), and ρ as the root mean square sound pressure, Nρ as 1 neper, B as 1 bel which equates to (½ ln 10)Nρ, and 1 dB which equates to (1/20 ln 10) Nρ, then:

$$L\rho = \ln\left(\frac{\rho}{\rho 0}\right)N\rho = 2\log_{10}\left(\frac{\rho}{\rho 0}\right)B = 20\log_{10}\left(\frac{\rho}{\rho 0}\right)\text{dB} \qquad \text{EQN. [2]}$$

A sound attenuation and isolation apparatus with reduced pressure within the enclosure allows for standard guitar speakers to operate from guitar amplifiers that provide maximum rated speaker power and yet, at a constant amplifier maximum output level, produce sound pressures from below the threshold of human hearing (with the commonly used reference sound pressure in air is 20 μPa) up through and beyond the maximum rated SPL output of the speaker, which for a typical guitar speaker might be just under 120 dB SPL at a 10 foot listening distance. With a lower limit of audibility defined as SPL of 0 dB, and the upper limit in 1 atmosphere of pressure (approximately $1.01325\times10^{5}$ Pa) of 191 dB SPL (the largest pressure variation an undistorted sound wave can have in Earth's atmosphere), larger sound waves can be produced within the enclosure, but at lower sound pressure levels and thus lower perceived loudness. Perceived loudness is based upon psychoacoustic phenomenon and is a measure of how a sound is sensed. Factors affecting perceived loudness include sound pressure level, frequency range and associated amplitudes, and the duration and time envelope or function of the sound.

SPL is also often governed by an inverse-proportional law. SPL is measured from the origin of an acoustic event or source, and the sound pressure from a spherical sound wave decreases proportionally to the reciprocal of the distance. The human ear has an extremely large dynamic range. In standard atmospheric pressure, a leaf rustling as ambient sound may create a sound pressure of approximately $6.32\times10^{-5}$ Pa which equates to an SPL of approximately 10 dB. Typical human conversation at a distance of 1 meter ranges from about $2\times10^{-3}$ Pa to about $20\times10^{-2}$ Pa, which equates to an SPL of about 40 dB to about 60 dB. A passenger car as heard from roadside at a distance of 10 meters ranges from approximately about $2\times10^{-2}$ to about $20\times10^{-2}$ Pa which equates to approximately 60 dB to 80 dB. Traffic on a busy roadway at 10 meters is about 0.2 Pa to about 0.632 Pa, which is approximately 80 dB to 90 dB of SPL. An example of a higher SPL is an operating jack hammer at 1 meter, which is approximately 2 Pa or approximately 100 dB SPL. The sound pressure generated by a jet engine at a distance of 100 meters can range from 6.32 Pa to 200 Pa which is approximately equivalent to 110 dB to 140 dB SPL. Moving closer to a jet engine, e.g., 1 meter, increases the sound pressure to a level of about 632 Pa or approximately 150 dB SPL. The threshold of pain for humans is about 63.2 Pa to 200 Pa or about 130 dB to 140 dB. Examples of even higher sound pressure levels include those generated by a 0.30-06 rifle, at a distance of 1 meter, which is approximately 7,265 Pa which or 171 dB SPL. Finally, the theoretical limit for undistorted sound is approximately 101,325 Pa or approximately 191 dB.

FIG. 1 illustrates a block diagram of a system 100 for recording high output power levels of sound at low loudness levels, according to an embodiment of the disclosure. The system 100 comprises a musical device 110, an amplifier 120, a sound attenuation and isolation apparatus 130, a preamplifier 140, an analog-to-digital converter (ADC) 150, a recording/playback device 160, and a device 170 for listening or monitoring recorded sound. The musical device 110 may comprise any type of musical instrument (e.g., electric guitar) which comprises a pickup or transducer that converts acoustical energy into electrical energy. In another embodiment, the musical device 110 may be a virtual electronic instrument. In yet another embodiment, the musical device may be any source of audio including music, speech, or any other form of audio. An electrical output of the musical device 110 is connected to an input of the amplifier 120, typically using a suitable cable and connector 112 such as, for example, a 14 inch to 14 inch Monster® guitar cable that is either plugged into or otherwise electrically connected to the input of the amplifier 120 (e.g., Marshall JCM800 50-watt amplifier). The amplifier 120 may comprise any type of amplifier device such as a solid-state amplifier, a tube amplifier, a combination solid-state and tube amplifier, etc.

The sound attenuation and isolation apparatus 130 comprises an enclosure, a speaker disposed within the enclosure, one or more microphones disposed within the enclosure, and an evacuation port. The evacuation port is configured to connect to a system that reduces a pressure level within the enclosure to a level that is less than an ambient air pressure level outside the enclosure. The enclosure is sealed or otherwise configured to be sealed (i.e., sealable) to maintain the reduced pressure level within the enclosure for purposes of recording high output power levels of sound/audio (e.g., generated an output from the amplifier 120) at low sound pressure levels. Various examples of alternative embodiments of the sound attenuation and isolation apparatus 130 will be discussed in further detail below with reference to FIGS. 2 through 6.

The amplifier 120 comprises a speaker output port that is electrically connected to a speaker (which is disposed within the sound attenuation and isolation apparatus 130) using a speaker cable 122 (e.g., a ¼ inch to ¼ inch speaker cable or equivalent electrical connection) connected to a speaker input port. The outputs of the one or more microphones (which are disposed within the sound attenuation and isolation apparatus 130) are input to one or more corresponding preamplifier channels of the preamplifier 140 using a microphone cable 132 (e.g., commercially available XLR microphone cables, or equivalents thereof such as a wireless signal connection).

The preamplifier 140 supplies a line level output 142 (or equivalent thereof) to the input of the ADC 150. The ADC 150 digitizes the output signals of the preamplifier 140, and the digital signals are then output as digital codes through one or more digital interfaces 152 to the recording/playback device 160 (or mixing device) wherein the digital signals are recorded. An analog or digital output signal 162 from the recording/playback device 160 is input to the listening/monitoring device 170 (e.g., a powered or unpowered monitoring device or headset). If the device 170 is an unpowered monitoring device, a power amplifier would be utilized to drive the device 170. If the output 162 of the recording/playback device 160 is a digital signal, a digital-to-analog converter (DAC) would be used to convert the digital signal to an analog signal for input to the listening/monitoring device 170.

While the connections 112, 132, 142, 152 and 162 may be implemented as hard-wired connections using suitable cables and connectors, in alternate embodiments, the connections 112, 132, 142, 152 and 162 may be implemented wirelessly using any suitable wireless technology with sufficient bandwidth. The wireless network architecture may be implemented using a serial or star network topology, or using any suitable network topology that provides sufficient bandwidth for real-time connectivity with an acceptable latency for recording or playback purposes.

Furthermore, in an alternate embodiment, feedback signals 134 and 164 may be supplied to the musical device 110 from the sound attenuation and isolation apparatus 130 and the recording/playback device 160, respectively, to assist in generating feedback from the amplified signal. In particular, the feedback signal 134 may be an acoustic or electric signal (analog or digital) that is input to a transducer mounted on or near the musical device 110 to generate the feedback. A digital feedback signal would be converted to analog feedback signal using a DAC device. Similarly, the feedback signal 164 (analog or digital) from the recording/playback device 160 would be input to a transducer mounted on or near the musical device 110 to assist in generating feedback.

It should be noted that while various components of the system 100 are shown in FIG. 1 as discrete elements with wired or wireless interconnects, some components may be integrated within a common housing with alternative interconnection topologies. For example, with miniaturization, it may be possible to house the amplifier 120, the sound attenuation and isolation apparatus 130, the preamplifier 140, and the recording/playback device 160 in a highly-miniaturized enclosure. Integrated circuits, miniaturized speakers, discrete microphone elements, and recording/playback devices can be utilized to make the various components of the sound attenuation and isolation apparatus 130 fit within a relatively small enclosure. While there may be various tradeoffs with useful frequency range and power consumption, however, with very hard vacuums and high efficiency speakers, extremely low power consumption may be utilized to simulate very high sound pressure levels.

Figure 2:
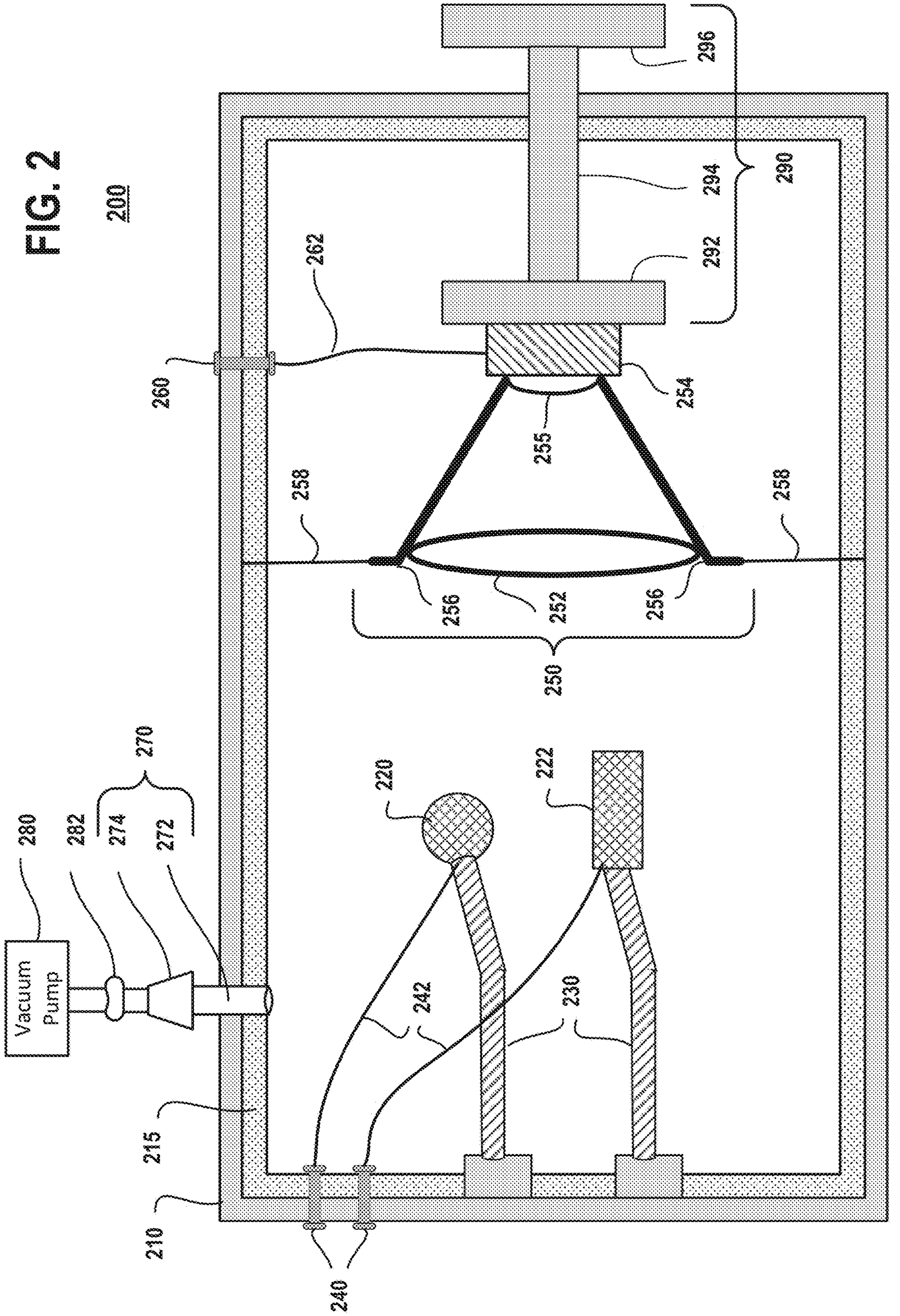
FIG. 2 schematically illustrates a sound attenuation and isolation apparatus according to an embodiment of the disclosure.

FIG. 2 schematically illustrates a sound attenuation and isolation apparatus 200 according to an embodiment of the disclosure. The sound attenuation and isolation apparatus 200 illustrates an embodiment of the attenuation and isolation apparatus 130 which can be implemented in the system of FIG. 1. The sound attenuation and isolation apparatus 200 comprises a sealed enclosure 210 with an optional layer of sound absorbing material 215 disposed adjacent to inner walls of the enclosure 210. The layer of sound absorbing material 215 may line substantially an entire inner surface of the enclosure 210, or the layer of sound absorbing material 215 may be disposed in strategic regions on the inner walls of the enclosure 210 to provide sound isolation and/or reduce internal acoustic wave reflections. Preferably the sound absorbing material comprises a material that is non-outgassing at reduced pressure levels within the enclosure 210. Ideally, the enclosure 210 can be anechoic, however the amount of sound reflections within the enclosure 210 is less problematic when the air/gas pressure within the enclosure 210 is reduced.

A plurality of microphones 220 and 222 are disposed within the enclosure 210. The microphones 220 and 222 are mounted to an inner wall of the enclosure 210 using microphone mounts 230 such as gooseneck microphone mounts, or other types of commercially available shock and vibration isolation mounts for microphones which eliminate or reduce vibrational coupling to the enclosure 210. In addition, position adjustable microphone placement allows for optimal microphone placement for recording. Since sound pressure levels within the enclosure 210 (which emanate from a speaker 250 disposed within the enclosure 210) are significantly reduced using techniques discussed herein, vibration by mechanical modes of the microphone mounts 230 and the enclosure 210 are less significant. While the example embodiment of FIG. 2 shows the use of two microphones 220 and 220 within the enclosure, it is to be noted that a single microphone may be disposed within the enclosure 210 for purposes of capturing the sound output from the speaker 250. However, the use of multiple microphones is often desirous to take advantage of optimal microphone placement and microphone characteristics. For example, in modern studio recordings of amplified guitar, it is often common practice to utilize a dynamic microphone such as a Sure® SM57 and a ribbon microphone such as Royer® R122.

The enclosure 210 comprises microphone feedthrough connectors 240 which are internally connected to the microphones 220 and 222 using microphone cables 242. In one embodiment, the microphone feedthrough connectors 240 comprise XLR male to female feedthrough adapters, or any other commercially available feedthrough adapter that is suitable for the given application. The microphones 220 and 222 may comprise one or more of various types of microphones including dynamic microphones (which utilizes a wire coil, magnet, and a thin diaphragm to capture an acoustic signal), condenser microphones (which capture an acoustic signal using a variable capacitance to provide enhanced frequency and transient responses) and/or ribbon microphones (which use a thin electrically conductive ribbon placed between poles of a magnet to produce a voltage by electromagnetic induction). The condenser and certain types of active ribbon type microphones use phantom power to operate, i.e., DC electric power transmitted through microphone cables to operate the microphones. It should be noted that phantom power may be supplied to one or more of the microphones 220 and/or 222 using XLR connectors which are configured to connect to the microphone feedthroughs 240 and supply phantom power to the microphones 220 and 222 via the microphone cables 242, if needed.

Further, the speaker 250 disposed within the enclosure 210 comprises a speaker cone 252 (or diaphragm), a speaker coil/magnet assembly 254, a dust cover 255 to cover the speaker coil, and a speaker frame 256 (or basket). The speaker 250 may be any commercially available speaker (e.g., guitar speaker) which is suitable for the given application. The speaker 250 is mounted inside the enclosure 210 using a mounting device 258 that is connected to the speaker frame 256. The speaker mounting device 258 may comprises any suitable mounting device such as a taught wire, a spring mechanism, or other type of mounting mechanism, preferably one that minimizes or eliminates vibrational coupling between the speaker 250 and the enclosure 210. In addition, the speaker mounting device 258 should provide for unrestricted air flow within the enclosure 210 and, in particular, between the front and the back of the speaker 250.

The enclosure 210 further comprises a speaker feedthrough connector 260 which is internally connected to the speaker 250 using a speaker cable 262 to provide audio signals and electrical power to the speaker 250 from an amplifier (e.g., amplifier 120, FIG. 1). Preferably the speaker feedthrough connector 260 allows for the passage of electrical current at voltages and power levels that are sufficient to operate the speaker 250 to maximum levels and beyond with a minimal loss of energy. In one embodiment, the speaker feedthrough connector 260 is configured to connect to an external ¼" female jack, as is standard with most guitar amplifier interconnects.

The sound attenuation and isolation apparatus 200 further comprises an evacuation port 270 which comprises a feedthrough port 272 and a valve 274. The evacuation port 270 is configured to connect to a vacuum pump 280 (or some other similar device or system) via a suitable connector 282. The vacuum pump 280 operates to evacuate air from within the enclosure 210 to reduce a pressure level within the enclosure 210 to a target pressure level which less than an ambient air pressure level outside the enclosure 210. The enclosure 210 provides a sealed environment to maintain the reduced pressure level within the enclosure 210. The valve 274 of the evacuation port 270 allows for sealing the feedthrough port 272 to maintain the reduced pressure levels within the enclosure 210 without the continuous use of the evacuation pump 280 or other evacuation device. The vacuum pump 280 can be an electric or manual pump, and can be active either manually or automatically during speaker sound production so that any sound emanating from the vacuum pump 280 does not interfere with the microphones 220 and 222 capturing the sound (of the musical device to be recorded) emanating from the speaker 250. It should be noted that due to a reduced air pressure level within the enclosure 210, any external sounds will also have negligible or no effect on the sound that is captured by the microphones 220 and 222.

An optional vacuum gauge or pressure monitoring device can be utilized to determine the air/gas pressure within the enclosure 210, which will allow user to reduce the pressure within the enclosure 210 to a target level which optimizes the use of the sound attenuation and isolation apparatus 200 for recording sound at lower sound pressure levels. In an alternate embodiment, the pressure within the enclosure 210 can be decreased to an even lower pressure level than is desired for the given application, and then the enclosure 210 can be backfilled with a dry inert gas, such as dry nitrogen gas, while keeping the pressure inside the enclosure 210 lower than 1 atmosphere to reduce the SPL generated by the speaker. Dry nitrogen has the advantage of being non-condensing which is important if the temperature within the enclosure 210 significantly decreases, and is inert on the internal transducers and component materials within the enclosure 210. In another embodiment, the sealed enclosure 210 can be backfilled with dry nitrogen at pressures greater than 1 atmosphere. With pressures that are higher than 1 atmosphere, it is possible to create sound pressure levels which are greater than the sound pressure levels that can be created in 1 atmosphere, allowing sound to be generated at even greater sound levels.

In another embodiment, a cooling device 290 may be thermally coupled to the speaker coil/magnet assembly 254 of the speaker 250 to prevent excessive thermal build-up of the speaker 250 and the coil/magnet assembly 254. It is known that overheating of a speaker coil is a predominant mode of speaker failure. In addition, it is generally known that speaker efficiencies range from about 0.5% to about 20% with typical efficiencies of 4% to 10% for certain applications. For example, for a 40-watt speaker at 5% efficiency, 38 watts of electrical energy is dissipated as heat, while only 2 watts is converted into acoustical energy. A speaker has a thermal resistance between the speaker coil and magnet structure, which is in parallel with a thermal capacitance of the voice coil, and in series with a thermal resistance of the speaker magnet to the ambient air. While sufficient heat may be dissipated from the speaker coil/magnet assembly 254 to surrounding air at under 1 atmosphere, the ability to dissipate heat to the surrounding air within the enclosure 210 of the sound attenuation and isolation apparatus 200 becomes more problematic as the air/gas pressure (air and/or nitrogen) within the enclosure 210 is evacuated to pressures lower than 1 atmosphere, as there is less thermal transfer of heat from the speaker coil/magnet assembly 254 to the surrounding air/gas within the enclosure 210.

In this regard, in some embodiments, the cooling device 290 may comprise a passive heat sink device that conducts thermal energy away from the speaker coil/magnet assembly 254 to the ambient environment external to the enclosure 210. In particular, as shown in FIG. 2, the cooling device 290 comprises a first portion 292, a second portion 294, and a third portion 296. The first portion 292 is thermally coupled to the back side of the speaker coil/magnet assembly 254 to absorb heat therefrom. The second portion 294 extends through a wall of the enclosure 210 to transfer heat from the first portion 292 to the third portion 296 outside the enclosure 210, wherein the transferred heat is dissipated from the third portion 296 to the ambient environment external to the enclosure 210 through radiative heat transfer. When implemented as a passive heat sink device, the cooling device 290 is formed of a material such as copper or aluminum which has a thermal conductivity sufficient for the given application. The cooling device 290 is implemented using a sufficient seal for the second portion 294 extending through the wall of the enclosure 210 so that the enclosure 210 can maintain a reduced pressure when air is evacuated from within the sealed enclosure 210, while providing the means to radiate or transfer heat from the speaker coil/magnet assembly 254 to the ambient environment external to the enclosure 210. In another embodiment, the cooling device 290 can be an active cooling device such as a Joule-Thomson cooler, an active liquid cooling system, a thermal electric cooler, a fan, a Stirling Engine or any combination thereof. Furthermore, the enclosure 210 may be constructed of a material with high thermal conductivity and/or coated with a high emissivity surface to radiate heat from within the enclosure 210 to the external environment. In yet another embodiment the cooling device 290 is coupled to a closed loop temperature controller to maintain an optimal or desired speaker operating temperature.

It should be noted that the reduced sound pressure levels presented to the internal microphones 220 and 222 for recording have several additional advantages. For example, many high-quality microphones, and in particular ribbon microphones, are not compatible with high sound pressure levels, limiting their use or proximity placement to a speaker that generates the sound to be recorded. Ribbon microphones are easily damaged by high sound pressure levels. For example, a Coles® 4038 Ribbon microphone can accommodate a maximum sound pressure of 125 dB. A 50-watt amplifier and standard efficiency speaker in ambient atmosphere can easily generate 140 dB SPL within a few inches of the speaker, which is often a typically desired microphone placement. Thus, embodiments of sound attenuation and isolation apparatus as discussed herein enables sound recording with a wider variety of desirous microphones and microphone placements.

In another embodiment, an optional warning indicator device may be coupled to the optional pressure gauge to warn of sound pressure levels being generated within the enclosure 210 which exceed a given sound pressure level that may damage one of more of the different types of microphones 220 and/or 222 of the sound attenuation and isolation apparatus. In addition, the optional pressure gauge may be operatively coupled to an inhibit device or disconnect device, which prevents power from being applied to the speaker 250 while the internal pressure is detected to be above a specified threshold. Alternately, the optional pressure gauge may be operatively coupled to an enable device or connect device which enables power to be applied to the speaker 250 from the amplifier 120 while the internal pressure is at or below a specified threshold.

In another embodiment, the enclosure 210 may be formed of a rigid material or flexible material. For example, the enclosure 210 may be formed of one or more of polyester (PES), polyethylene terephthalate (PET), polyethylene (PE), high-density polyethylene (HDPE), polyvinyl chloride (PVC), polyvinylidene chloride (PVDC), low-density polyethylene (LDPE), polypropylene (PP), polystyrene, (PS), high-impact polystyrene (HIPS), polyamides (PA), acrylonitrile butadiene styrene (ABS), polycarbonate (PC), polycarbonate/acrylonitrile butadiene styrene (PC/ABS), polyurethane (PU), maleimide/bismaleimide, melamine formaldehyde (MF), plastarch material, phenolics (PF) or (phenol formaldehydes), polyepoxide (epoxy), polyetheretherketone (PEEK), polyimide, polylactic acid (PLA), polymethyl methacrylate (PMMA) (acrylic), polytetrafluoroethylene (PTFE), urea-formaldehyde (UF), furan, silicone, and polysulfone.

Figure 3:
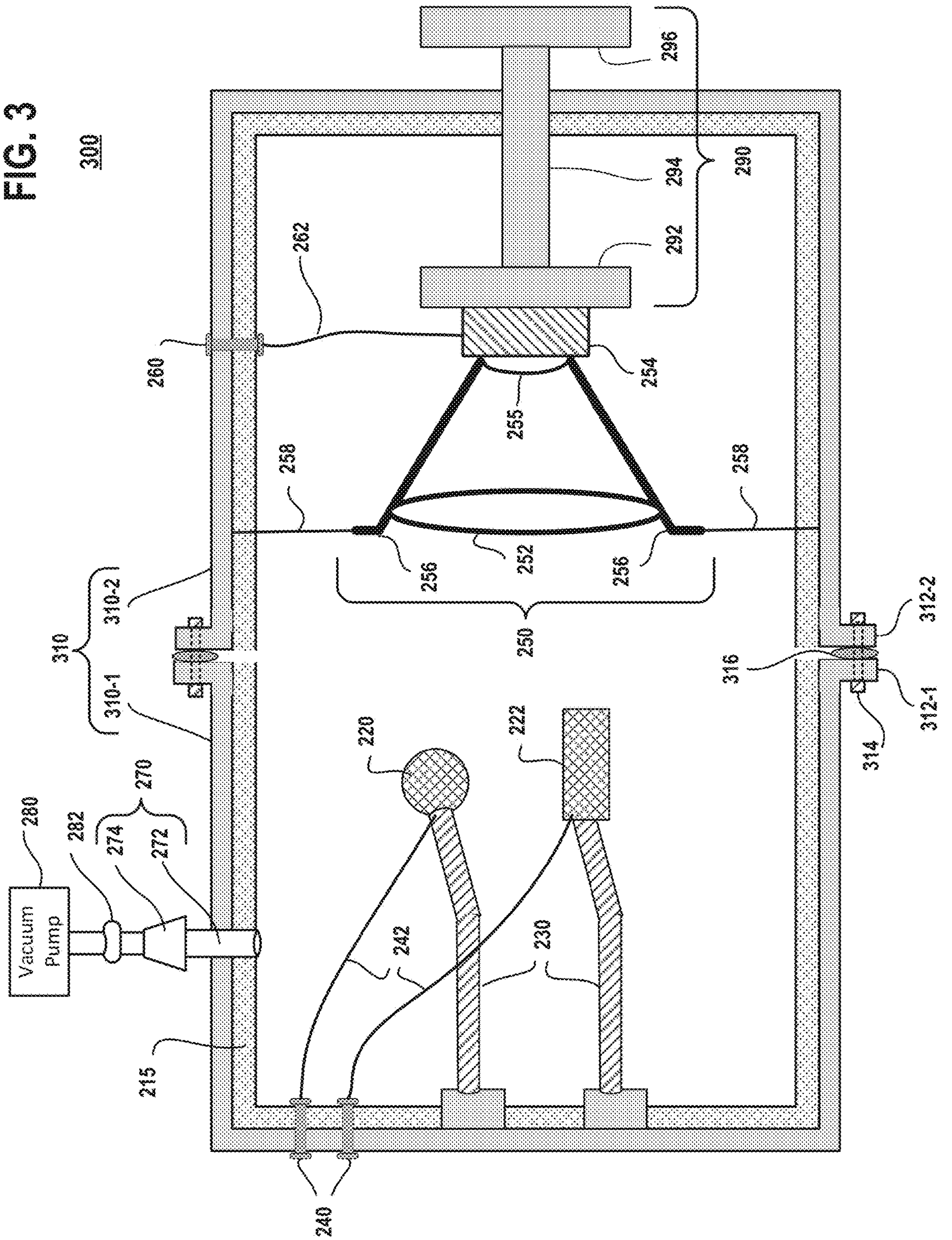
FIG. 3 schematically illustrates a sound attenuation and isolation apparatus according to another embodiment of the disclosure.

FIG. 3 schematically illustrates a sound attenuation and isolation apparatus 300 according to another embodiment of the disclosure. The sound attenuation and isolation apparatus 300 illustrates an embodiment of the sound attenuation and isolation apparatus 130 which can be implemented in the system of FIG. 1. The sound attenuation and isolation apparatus 300 is similar to the sound attenuation and isolation apparatus 200 of FIG. 2 as discussed above, except that the sound attenuation and isolation apparatus 300 shown in FIG. 3 comprises a multi-piece enclosure 310. For example, the enclosure 310 comprises a two-piece enclosure assembly comprising a first portion 310-1 and a second portion 310-2. The enclosure 310 allows access to the internal components such as the speaker 250, microphones 220 and 220, microphone mounts 230, cables 242 and 262, and other components, while the enclosure portions 310-1 and 310-2 can be assembled to together to form a sealed enclosure 310.

In particular, as shown in FIG. 3, each portion 310-1 and 310-2 of the enclosure 310 comprises a respective mating flange 312-1 and 312-2 formed around a perimeter opening thereof, which can be joined together using a fastener 314 (e.g., threaded bolts and nuts, clasps, etc.) with a sealing member 316 (rubber O-ring, gasket, etc.) disposed between the mating flanges 312-1 and 312-2 to provide a sealed enclosure 310 when the two portions 310-1 and 310-2 are assembled together. The enclosure 310 can be formed of any suitable material such as a metallic material, a high impact plastic material, or a rubberized material preferably having low cold flow and outgassing properties, or other enclosure materials as discussed herein. In another embodiment, one or more hinges may be utilized to retain the two portions 310-1 and 310-2 of the enclosure 310 together and facilitate alignment of the two portions 310-1 and 310-2.

Moreover, one or more manually adjustable clasp devices may be utilized to squeeze the mating flanges 312-1 and 312-2 together with the sealing member 316 disposed between the mating flanges 312-1 and 312-2 to provide the sealed enclosure 310. It is to be appreciated that as the enclosure 310 is evacuated, the atmospheric pressure external to the enclosure 310 will exert an additional force to push the enclosure portions 310-1 and 310-2 together, thereby exerting additional sealing force on the enclosure 310. Optionally, a transparent window or view port may be formed in a region of one or both of the enclosure portions 310-1 and 310-2 to allow a user to view the internal components (e.g., speaker operation) when then enclosure 310 is assembled. In addition, either a portion, or one half, of the entire enclosure 310 may be transparent.

In addition to, or in lieu of, a two-part enclosure, the enclosure may have an access door which can be completely removed or joined by a hinge and mated to the enclosure using a fastener (e.g., threaded bolts and nuts, clasps, etc.) with a sealing member (rubber O-ring, gasket, etc.) disposed between the surface of the door and the enclosure to provide a sealed enclosure. One or more manually adjustable clasp devices may be utilized to squeeze the door to the enclosure. The door may be opaque or transparent.

Figure 4:
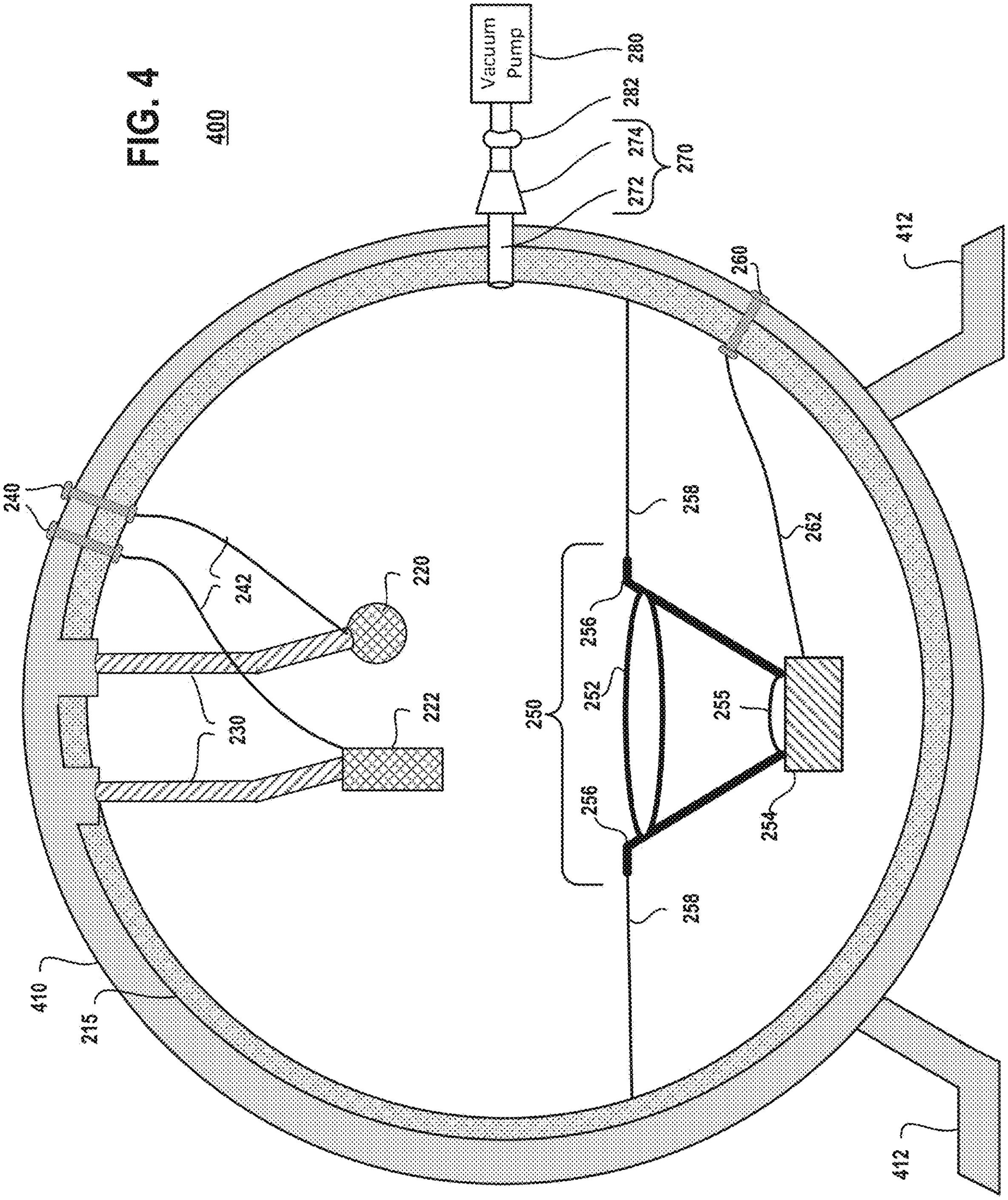
FIG. 4 schematically illustrates a sound attenuation and isolation apparatus according to another embodiment of the disclosure.

FIG. 4 schematically illustrates a sound attenuation and isolation apparatus 400 according to another embodiment of the disclosure. The sound attenuation and isolation apparatus 400 illustrates an embodiment of the sound attenuation and isolation apparatus 130 which can be implemented in the system of FIG. 1. The sound attenuation and isolation apparatus 400 is similar to the embodiments of the sound attenuation and isolation apparatus discussed above, except that the sound attenuation and isolation apparatus 400 shown in FIG. 4 comprises spherical-shaped enclosure 410 which is designed to minimize standing waves that typically occur with square or rectangular shapes, or enclosures of any shape which utilize edges. The spherical-shaped enclosure 410 comprises a plurality of stabilizing feet 412 (e.g., tripod arrangement) so that the spherical-shaped enclosure 410 can be placed on a flat surface. It should be noted that the enclosure 410 can be designed with other shapes having smooth curved surfaces with radii of curvature that are sufficiently large, which are sufficient to minimize standing waves within the enclosure. While not shown in FIG. 4, a cooling device 290 (such as shown in FIGS. 2 and 3) can be thermally coupled to the speaker coil/magnet assembly 254 to transfer heat from the speaker coil/magnet assembly 254 to the ambient environment external to the enclosure 410. In another embodiment, the enclosure 410 may be a sealable enclosure which comprises two or more portions that can be assembled together in manner analogous to the enclosure 310 of FIG. 3.

Figure 5:
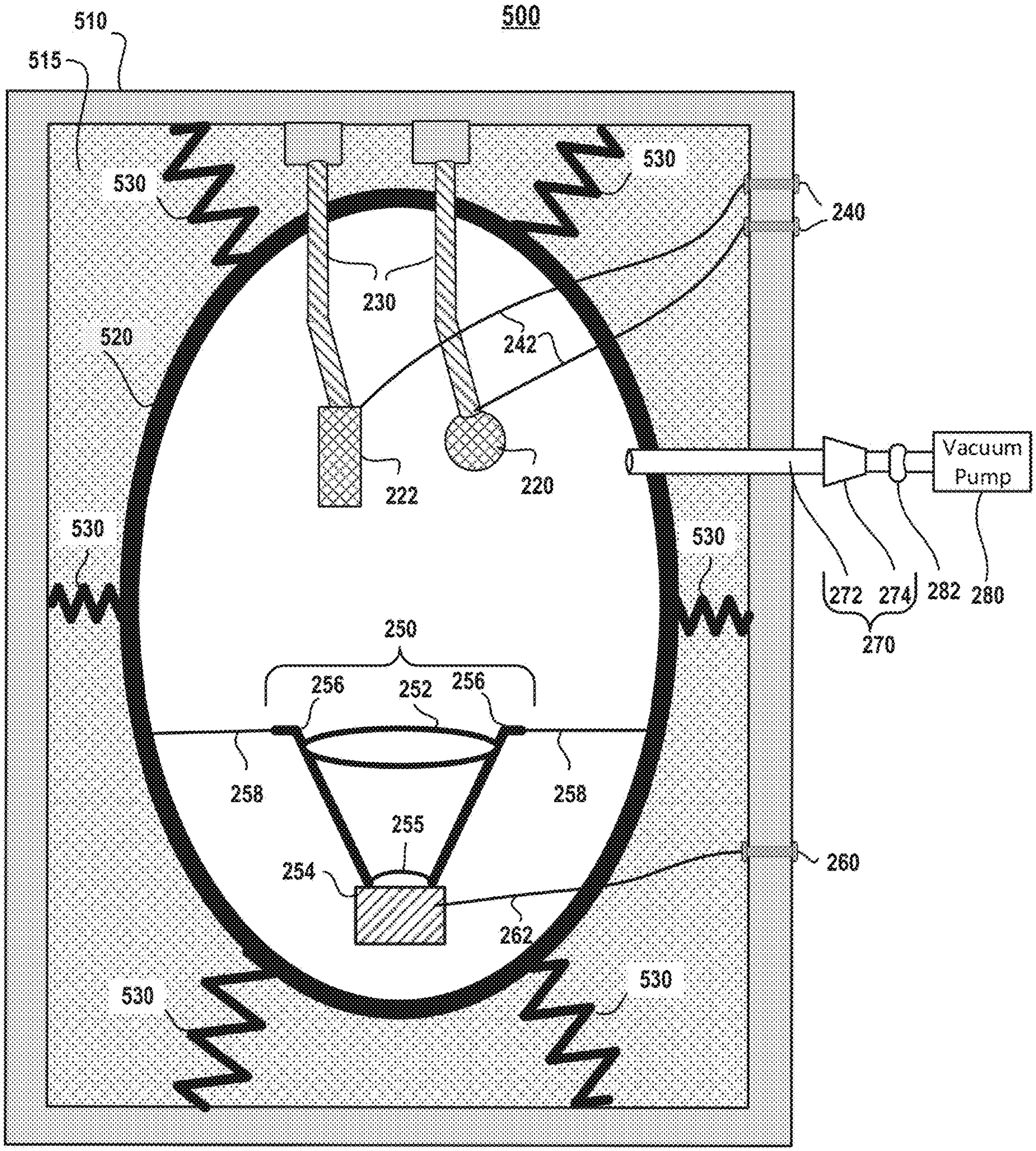
FIG. 5 schematically illustrates a sound attenuation and isolation apparatus according to another embodiment of the disclosure.

FIG. 5 schematically illustrates a sound attenuation and isolation apparatus 500 according to another embodiment of the disclosure. The sound attenuation and isolation apparatus 500 illustrates an embodiment of the sound attenuation and isolation apparatus 130 which can be implemented in the system of FIG. 1. The sound attenuation and isolation apparatus 500 comprises an enclosure comprising an outer enclosure 510 and an inner enclosure 520 with optional acoustic absorbing material 515 disposed in the space between the outer and inner enclosures 510 and 520. As shown in FIG. 5, the inner enclosure 520 is formed with curved surfaces to minimize standing wavers and wave reflections. The inner enclosure 520 comprises a bladder structure which is formed with a stiff or flexible rubber material (or other types of suitable material), and which is designed to not collapse under pressures of approximately 1/10th of an atmosphere or less. In another embodiment, the inner enclosure 520 can be formed of a sound absorbing material, e.g., rubber. The inner enclosure 520 is connected to the outer enclosure 510 through one or more isolation mounts 530, wherein the isolation mounts 530 may comprise springs, spring like material, or inflatable cushions such as bubble wrap. The inner enclosure 520 can be constructed in using one or more separate pieces, with gaskets or other methods of sealing the pieces together. While not shown in FIG. 5, a cooling device 290 (such as shown in FIGS. 2 and 3) can be thermally coupled to the speaker coil/magnet assembly 254 to transfer heat from the speaker coil/magnet assembly 254 to the ambient environment external to the enclosure 510.

Figure 6:
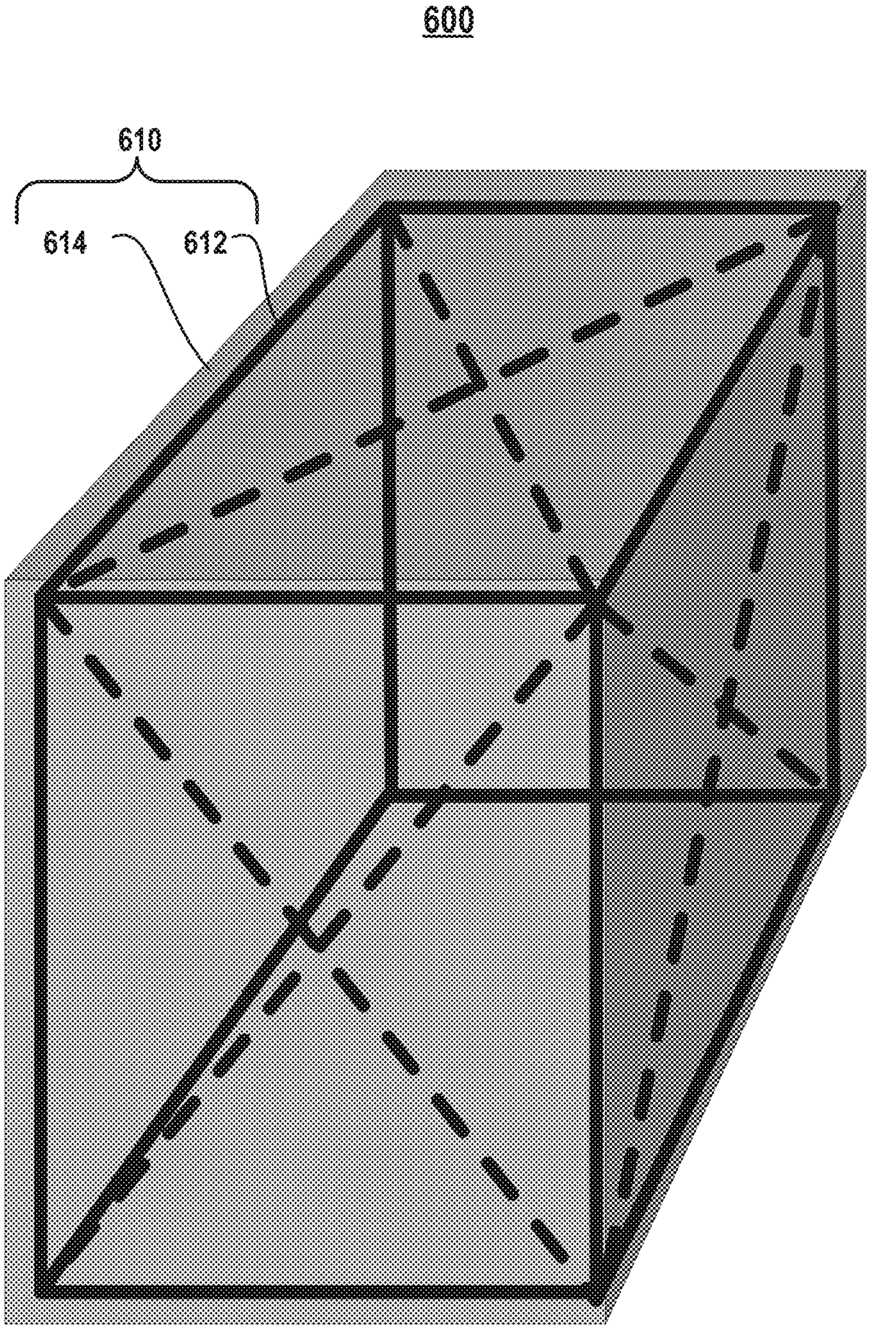
FIG. 6 schematically illustrates a sound attenuation and isolation apparatus according to another embodiment of the disclosure.

FIG. 6 schematically illustrates a sound attenuation and isolation apparatus 600 according to another embodiment of the disclosure. The sound attenuation and isolation apparatus 600 illustrates an embodiment of the sound attenuation and isolation apparatus 130 which can be implemented in the system of FIG. 1. The sound attenuation and isolation apparatus 600 is similar to the embodiments of the sound attenuation and isolation apparatus discussed above (with regard to components such as speakers, microphones, cables, vacuum evacuation port, etc.), except that the sound attenuation and isolation apparatus 600 shown in FIG. 6 comprises an enclosure 610 which comprises a supporting frame 612 encapsulated within a bag 614. While the supporting frame 612 is generically and schematically shown in FIG. 6 for illustrative purposes, it is to be understood that the supporting frame would be properly configured to provide means for fixedly mounting the internal components (microphone stands, feedthroughs speakers, evacuation port, etc.) within the enclosure 610. The outer bag 614 could be implemented using any commercially available plastic bags, or custom designed bags, with sufficient thickness and strength (e.g., 10 mil and above) to withstand damage from external pressure when the interior is evacuated.

When operating a speaker at high power levels in a sound attenuation and isolation apparatus with a lower internal air pressure, the speaker cone (or diaphragm) may be damaged over time from being over extended due the lack of sufficient air pressure within the sealed enclosure to provide an opposing force to the movement of the speaker cone. In addition, speaker characteristics may change from operation in a standard 1 atmosphere operating environment. In this regard, various techniques can be implemented according to embodiments of the disclosure for mechanically damping the speaker cone to compensate for the difference in movement (resonance) of the speaker cone when operating in normal atmosphere pressure as compared to movement of the speaker cone when operating in a low atmospheric pressure to a near vacuum environment.

Figure 7:
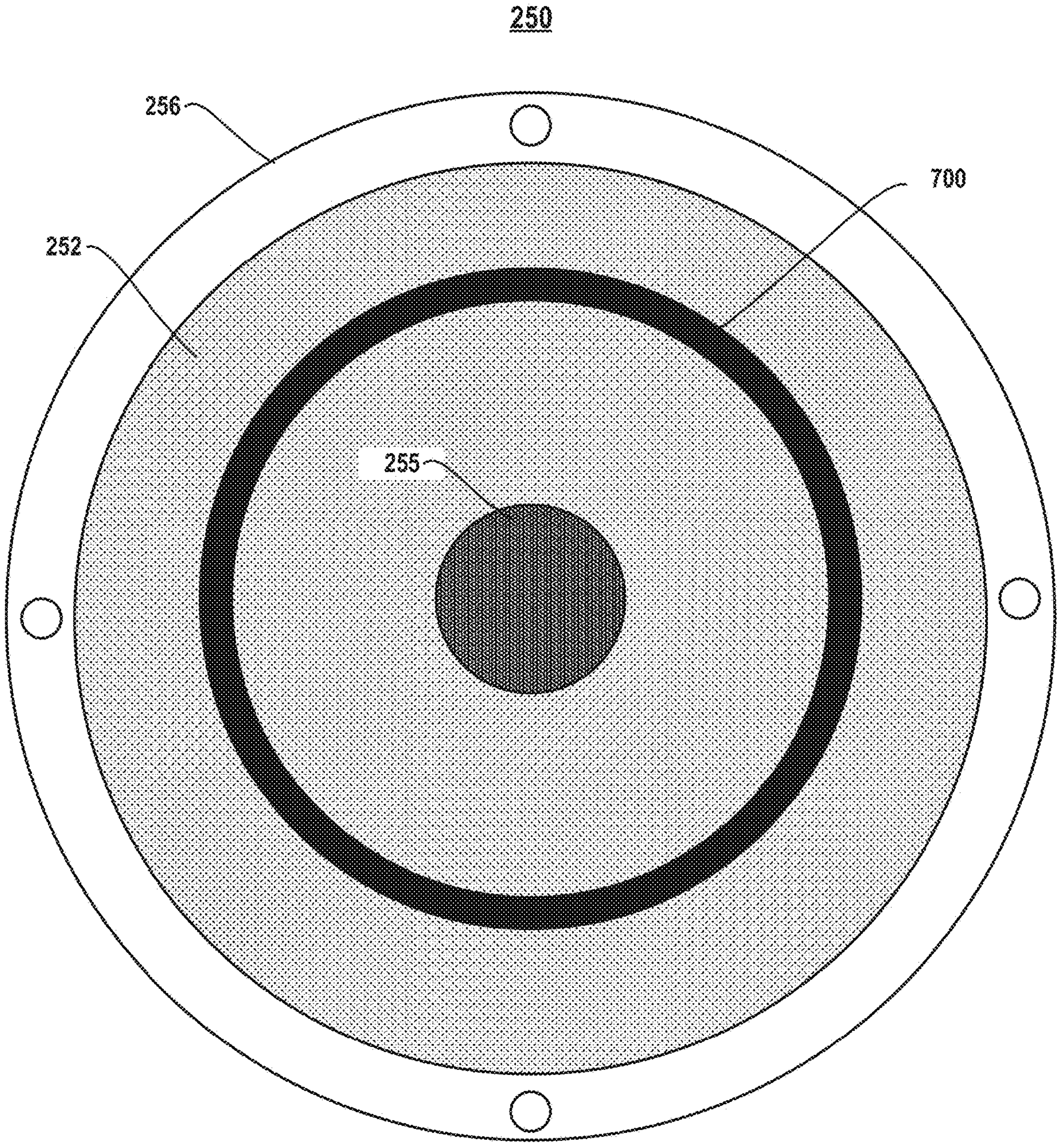
FIG. 7 schematically illustrates a method for mechanically damping the motion of a speaker cone according to an embodiment of the disclosure.

For example, FIG. 7 schematically illustrates a method for mechanically damping the motion of a speaker cone according to an embodiment of the disclosure. FIG. 7 is a schematic front view of the speaker 250 shown throughout the drawings, in which a mechanical damper weight 700 is glued or other affixed to the speaker cone 252 to assist in mechanical damping of the speaker and to help compensate for the difference of in-atmosphere to in-near vacuum or lower pressure resonance. The mechanical damper weight 700 can be formed of any suitable material, size, mass, etc., which is sufficient to achieve the intended results for the target application.

Figure 8:
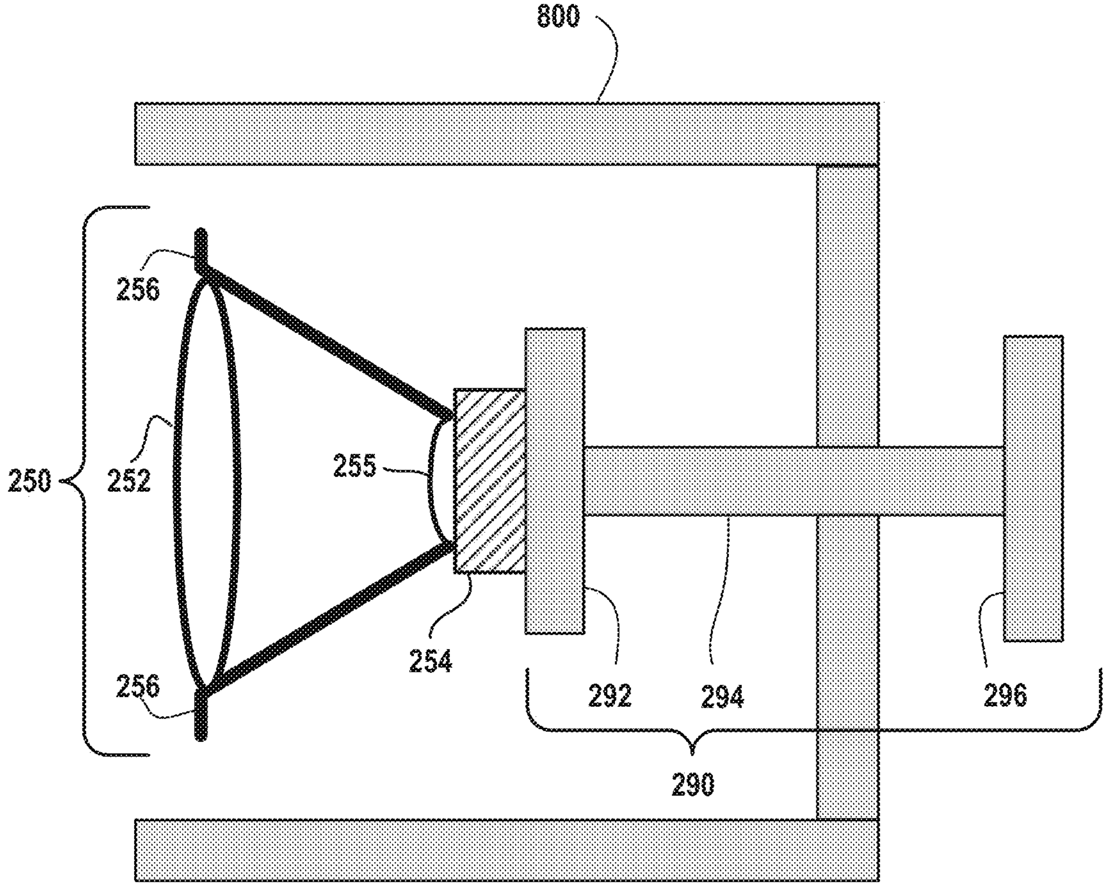
FIG. 8 schematically illustrates a method for mechanically damping the motion of a speaker cone according to another embodiment of the disclosure.

FIG. 8 schematically illustrates a method for mechanically damping the motion of a speaker cone according to another embodiment of the disclosure. In particular, FIG. 8 schematically illustrates a mechanical damping system which comprises a cooling system configured to cool the speaker cone 252 (which results in stiffening of the speaker cone 252) through the use of conductive cooling using the cooling device 290 as discussed above, in addition to a radiative cooling device 800 which surrounds the sides and back of the speaker 250. The radiative cooling device 800 is formed of a thermal conductive material (e.g., copper, aluminum, etc.) which serves to absorb heat from the speaker 250 and assist in stiffening the speaker cone 252 by cooling, thereby resulting in mechanical damping of the speaker cone 254. The cooling devices 290 and 800 can be implemented using passive or active cooling systems, or a combination thereof.

Figure 9:
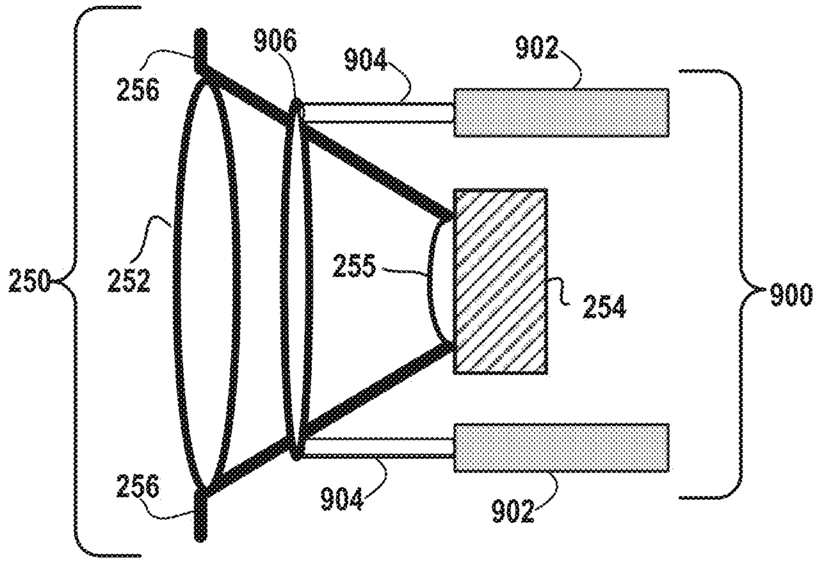
FIG. 9 schematically illustrates a method for mechanically damping the motion of a speaker cone according to another embodiment of the disclosure.

FIG. 9 schematically illustrates a method for mechanically damping the motion of a speaker cone according to another embodiment of the disclosure. In particular, FIG. 9 schematically illustrates a mechanical damping system which comprises a viscous damping system 900 mechanically coupled to the speaker cone 252 to mechanically damp the motion of the speaker cone 252. The viscous damping system 900 (e.g., hydraulic damping system) comprises a plurality of cylinders 902 with pistons 904 that extend in and out of the cylinder 902 under manual or automated control settings. The pistons 904 are coupled to an attachment ring 906 which is affixed around an outer surface of the speaker cone 252 to assist in mechanical damping of the speaker cone 252 and to help compensate for the difference of in-atmosphere pressure to in-near vacuum or lower pressure resonance. The amount of resistive force that the attachment ring 906 applies to the speaker cone 252 can be adjustably varied by automated or manual control of the viscous damping system 900, depending on air pressure level within sealed enclosure.

Figure 10:
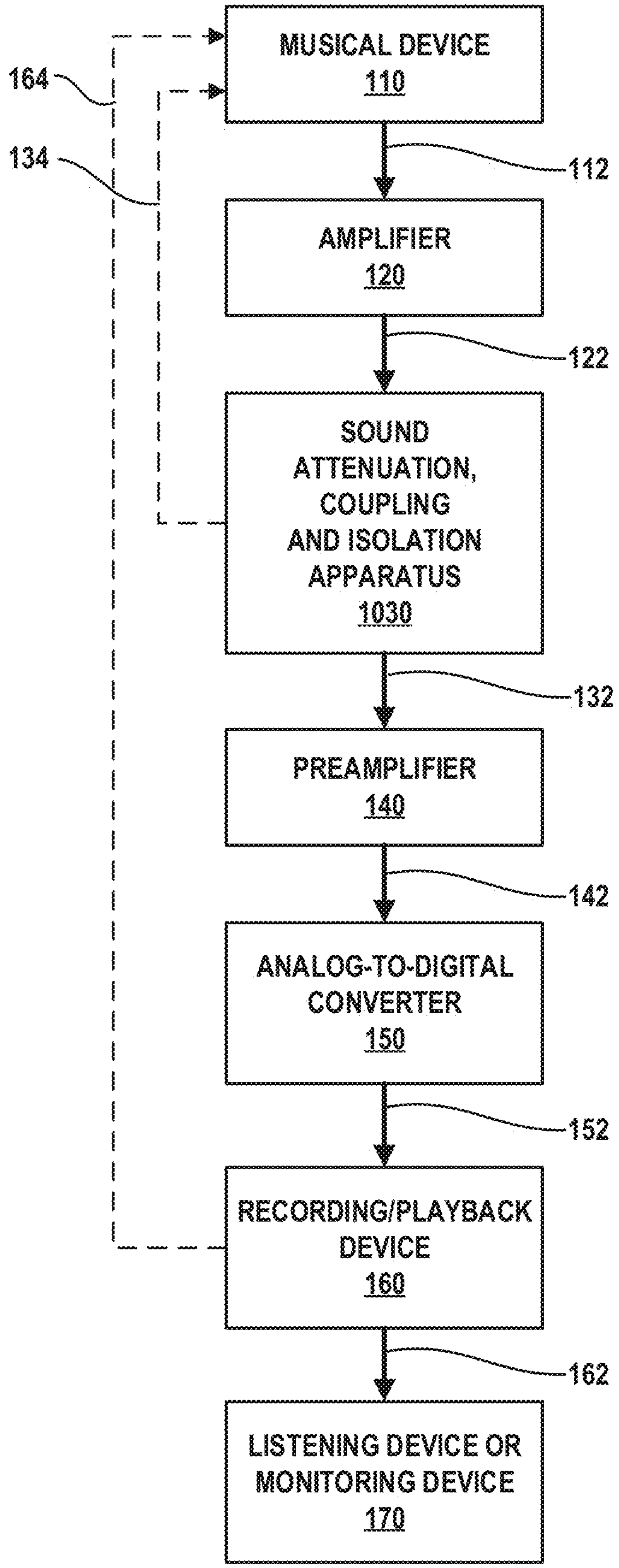
FIG. 10 illustrates a block diagram of a system for recording high output power levels of sound at low loudness levels using a sound attenuation, coupling, and isolation apparatus, according to an embodiment of the disclosure.

FIG. 10 illustrates a block diagram of a system 1000 for recording high output power levels of sound at low loudness levels using a sound attenuation, coupling, and isolation apparatus, according to an embodiment of the disclosure. The system 1000 of FIG. 10 is similar to the system 100 of FIG. 1 in that the system 1000 of FIG. 10 comprises a musical device 110, an amplifier 120, a preamplifier 140, an analog-to-digital converter 150, a recording/playback device 160, a device 170 for listening or monitoring recorded sound, and associated connections 112, 122, 132, 142, 152 and 162, the details of which are discussed above and will not be repeated.

The system 1000 of FIG. 10 comprises a sound attenuation, coupling and isolation apparatus 1030. The sound attenuation, coupling, and isolation apparatus 1030 is similar to the sound attenuation and isolation apparatus 130 of FIG. 1 (example embodiments of which are shown and discussed above with reference to FIGS. 2, 3, 4, 5, and 6, for example) in that the sound attenuation, coupling, and isolation apparatus 1030 comprises an enclosure, at least one speaker disposed within the enclosure, at least one microphone disposed within the enclosure, and an evacuation port disposed within a wall of the enclosure. The evacuation port is configured to connect to a system that can evacuate air or any other gas from within the enclosure to reduce a pressure level within the enclosure to a level that is less than an ambient air pressure level outside the enclosure. The enclosure is sealed or otherwise configured to provide a sealed enclosure (i.e., sealable enclosure), to maintain the reduced air/gas pressure within the enclosure. The speaker can be driven at high output power levels from an amplifier to generate a distorted sound of an amplified electric musical instrument for recording purposes, while the reduced air/gas pressure level within the enclosure serves to attenuate the sound pressure level of the sound signals generated by the speaker within the enclosure, which in turn reduces a perceived loudness of sound that emanates from the enclosure.

In addition, the sound attenuation, coupling, and isolation apparatus 1030 comprises an acoustic coupling device which is disposed within the sealed (or sealable) enclosure. The acoustic coupling device is configured to acoustically couple sound signals output from the speaker(s) to the microphone(s) disposed within the enclosure. In one embodiment, the acoustic coupling device comprises an acoustic coupling chamber which encapsulates a microphone and a speaker, wherein the acoustic coupling chamber is filled with a liquid material. In another embodiment, the acoustic coupling device comprises an acoustic coupling chamber which encapsulates a microphone and a speaker, wherein the acoustic coupling chamber is filled with a gaseous material. In yet another embodiment, the acoustic coupling device comprises a solid acoustic coupling device formed of one of a solid material, a semi-flexible material, and a flexible material, wherein the solid acoustic coupling device is mechanically and acoustically coupled to the microphone and at least a portion of a speaker cone of the speaker. In this manner, the acoustic coupling device serves as an acoustic waveguide to facilitate the propagation of sound waves from the speaker(s) to the microphone(s).

The combination of the reduced pressure level within the enclosure and the acoustic coupling device allows the recording of high power levels of sound at low sound pressure levels with relatively small speakers and a small enclosure. In particular, as noted above, the speaker can be driven by an amplifier at high output power levels to generate a distorted sound of an amplified electric musical instrument for recording purposes, while the reduced air pressure level within the enclosure serves to attenuate the sound pressure level of the sound signals generated by the speaker within the enclosure, which in turn reduces a perceived loudness of sound that emanates from the enclosure. In addition, the acoustic coupling device allows the speaker to drive the microphone with an extended frequency range including low frequencies with wavelengths that are longer than the diameter of the speaker cone, thereby enabling a reduction in the size of the speaker and enclosure necessary to reproduce low frequencies.

As such, the sound attenuation, coupling and isolation apparatus 1030 is capable of recording high power levels of sound at low sound pressure levels with much smaller speakers and much smaller enclosure. This enables the system to be easily transported with the user for use at other recording locations or, indeed even for live use, when coupled to a sound reinforcement system, or incorporated into various pieces of equipment such as instrument amplifiers, recording consoles, musical instruments and equipment, and sound reinforcement systems or musical playback devices. Example embodiments of an acoustic coupling device will be discussed in further detail below with reference to FIGS. 11 and 12.

Acoustic impedance matching of a sound source to air has always limited the efficiency of modern speakers, especially with lower acoustic frequencies. Embodiments of the disclosure utilize an acoustic coupling device placed between a speaker and one or more microphones, wherein the acoustic coupling device functions as an acoustic waveguide which provides an impedance match between the sound waves emanating from the sound source (speaker) and the acoustic coupling device, wherein the acoustic coupling device can be comprised of a solid, a gas, air, or a liquid. The acoustic impedance Z of a given material or medium is governed by the density of the material or medium and acoustic velocity as follows:

$$Z=\rho V \qquad \text{EQN. [3]}$$

wherein Z denotes the acoustic impedance of a given material or medium, wherein ρ denotes the density of the given material or medium, and wherein V denotes the acoustic velocity of sound in the given material or medium.

With first and second materials possessing different acoustic impedances, the amount of reflection and transmission may be calculated as follows. Assume that $Z_1=\rho_1 V_1$ and $Z_2=\rho_2 V_2$ wherein $Z_1$ denotes the acoustic impedance of a first material having a material density of $\rho_1$ and an acoustic velocity of $V_1$, and wherein $Z_2$ denotes the acoustic impedance of a second material having a material density of $\rho_2$ and an acoustic velocity of $V_2$. The impedance mismatch between the first and second materials is defined as:

$$\Delta Z=Z_2-Z_1. \qquad \text{EQN. [4]}$$

Assume further that T denotes a transmission of energy coefficient at an interface boundary, and that R denotes a reflection of energy coefficient at the interface boundary, and that E denotes a total incident energy at the interface. By the law of conservation of energy, in a theoretically lossless system, the total incident energy is computed as:

$$E=T+R \qquad \text{EQN. [5]}$$

Normalizing E to unity yields:

$$T=I-R \qquad \text{EQN.[6]}$$

where the reflection coefficient R is governed by the equation:

$$R=\left[\frac{(Z_2-Z_1)}{(Z_2+Z_1)}\right]^2 \qquad \text{EQN. [7]}$$

and substituting EQN [6] into EQN. [5] yields:

$$T=[1-R]=1-\left[\frac{(Z_2-Z_1)}{(Z_2+Z_1)}\right]^2 \qquad \text{EQN. [8]}$$

Typically, material or mediums which possess differing speeds of sound will have different acoustic impedances. A mismatch within the acoustic impedances causes undesirable wave reflections and loss of transmission of energy. Matching acoustic impedances optimizes acoustic energy transfer. The tables shown in FIGS. 21, 22, 23 and 24 provide information with regard to the speed of sound (meters per second) in air, and selected solids, gasses, and liquids.

It should be noted that while various components of the system 1000 are shown in FIG. 10 as discrete elements with wired or wireless interconnects, some components may be integrated within a common housing with alternative interconnection topologies. For example, with miniaturization, it may be possible to house the amplifier 120, the sound attenuation, coupling and isolation apparatus 1030, the preamplifier 140, and the recording/playback device 160 in a highly-miniaturized enclosure. Indeed, the inclusion of the acoustic coupling device allows for the use of much smaller speakers and microphone elements. Integrated circuits, miniaturized speakers, discrete microphone elements, and recording/playback devices can be utilized to make the various components of the sound attenuation, coupling and isolation apparatus 1030 fit within a relatively small enclosure. While there may be various tradeoffs with useful frequency range and power consumption, however, the combined implementation of (i) the acoustic coupling device, (ii) low pressure in the within the enclosure (e.g., isolation cabinet), and (iii) high efficiency speakers, enable the simulation of very high sound pressure levels at extremely low levels of power consumption.

Figure 11:
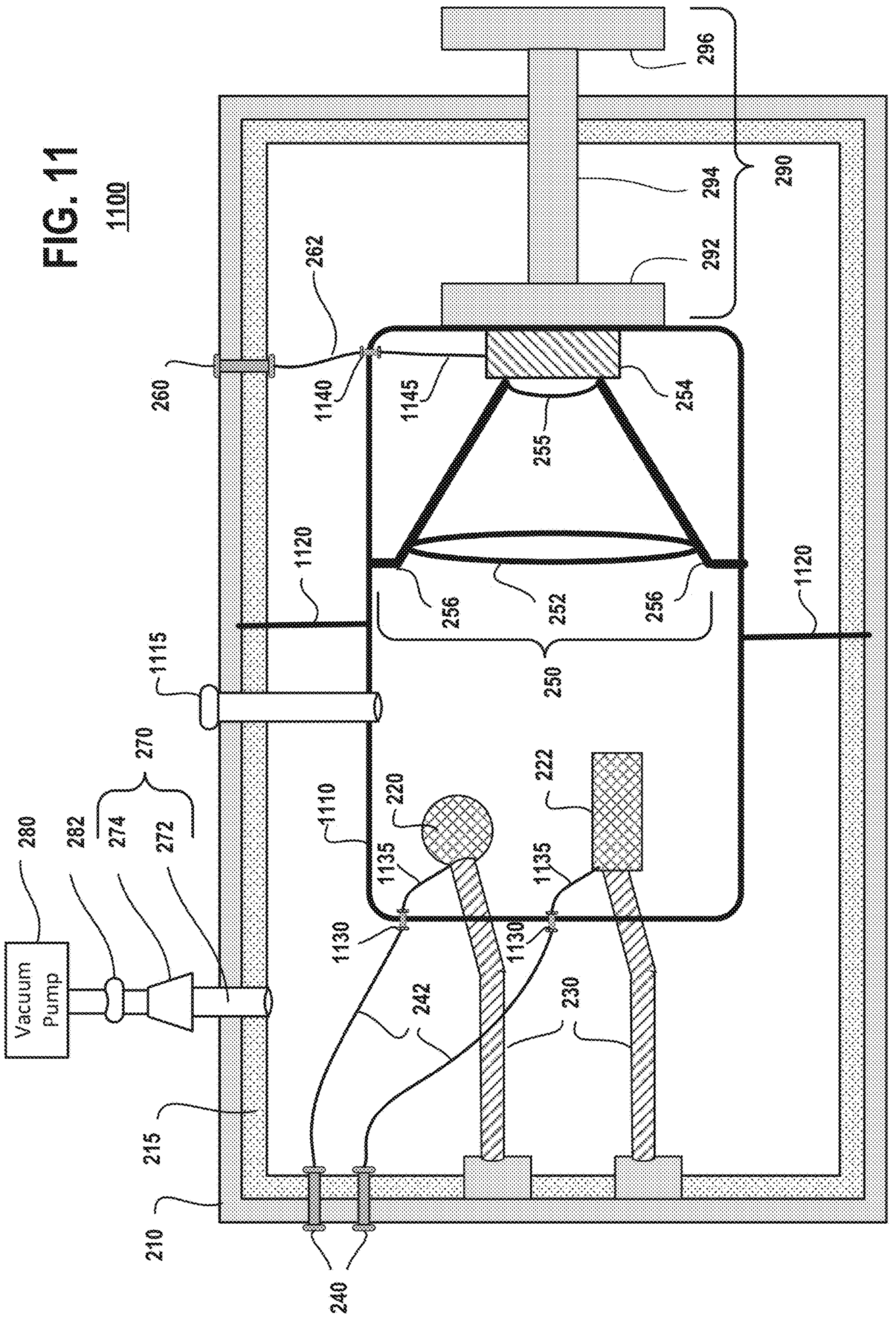
FIG. 11 schematically illustrates a sound attenuation, coupling, and isolation apparatus according to an embodiment of the disclosure.

FIG. 11 schematically illustrates a sound attenuation, coupling, and isolation apparatus 1100 according to an embodiment of the disclosure. The sound attenuation, coupling, and isolation apparatus 1100 illustrates an embodiment of the sound attenuation, coupling and isolation apparatus 1030 which can be implemented in the system 1000 of FIG. 10. In the exemplary embodiment shown in FIG. 11, the sound attenuation, coupling, and isolation apparatus 1100 is similar to the sound attenuation and isolation apparatus 200 of FIG. 2 as discussed above, except for the inclusion of an acoustic coupling device 1110 (or acoustic coupling chamber 1110) and other associated components (e.g., elements 1115, 1120, 1130, 1135, 1140, and 1145), which is configured to operate as a waveguide that transfers acoustic energy from the speaker 250 to the microphones 220 and 222.

In the example embodiment of FIG. 11, the speaker 250 and the microphones 220 and 222 are enclosed within the acoustic coupling chamber 1110. The acoustic coupling chamber 1110 is filled with a gaseous material or liquid material which provides a medium that serves as an acoustic waveguide to transfer acoustic energy from the speaker 250 to the microphones 220 and 222. Examples of different types of gaseous materials that can be included within the acoustic coupling chamber 1110 are shown in FIG. 23. Examples of different types of liquid materials that can be included within the acoustic coupling chamber 1110 are shown in FIG. 24.

In one embodiment, a sealable through port device 1115 is provided to allow liquid or gas material to be injected into the acoustic coupling chamber 1110, and then sealed to maintain the liquid or gas material within the acoustic coupling chamber 1110. The sealable through port device 1115 allows a user to utilize different types of liquids or gasses, as desired. In addition, the sealable through port device 1115 allows user to adjust the air or gas pressure within the acoustic coupling chamber 1110, as desired to achieve different acoustic responses. In other embodiments, the acoustic coupling chamber 1110 is a sealed unit in which the liquid or gas is injected into the acoustic coupling chamber 1110 at time of manufacture.

The acoustic coupling chamber 1110 may be formed of any suitable rigid or flexible material. For example, the acoustic coupling enclosure 1110 may be formed of one or more of more of polyester, polyethylene terephthalate, polyethylene, high-density polyethylene, polyvinyl chloride, polyvinylidene chloride, low-density polyethylene, polypropylene, polystyrene, high-impact polystyrene, polyamides, acrylonitrile butadiene styrene, polycarbonate, polycarbonate/acrylonitrile butadiene styrene, polyurethane, maleimide/bismaleimide, melamine formaldehyde, plastarch material, phenolics (or phenol formaldehydes), polyepoxide (epoxy), polyetheretherketone, polyimide, polylactic acid, polymethyl methacrylate (acrylic), polytetrafluoroethylene, urea-formaldehyde, furan, silicone, and polysulfone.

In one embodiment, the speaker 250 is mounted within the acoustic coupling chamber 1110 by attaching, bonding, or otherwise mounting the speaker frame 256 to the acoustic coupling chamber 1110. Further, the acoustic coupling chamber 1110 is mounted inside the enclosure 210 with a mounting mechanism 1120. The mounting mechanism 1120 can be any suitable mounting mechanism or device including, but not limited to, a taught wire, a spring mechanism, or other types of mounting mechanisms, which preferably minimize or eliminate vibrational coupling between acoustic coupling chamber 1110 and the enclosure 210.

The acoustic coupling chamber 1110 comprises microphone feedthrough connectors 1130 and a speaker feedthrough connector 1140. The microphone feedthrough connectors 1130 are connected internally to the microphone feedthrough connecters 240 of the enclosure 210 via the microphone cables 242, and to the microphones 220 and 222 using microphone cables 1135 within the acoustic coupling chamber 1110. In one embodiment, the microphone feedthrough connectors 1130 comprise XLR male to female feedthrough adapters, or any other commercially available feedthrough adapter that is suitable for the given application. In one embodiment, phantom power may be supplied to one or more of the microphones 220 and/or 222 using XLR connectors which are configured to connect to the microphone feedthroughs 240 and 1130 and supply phantom power to the microphones 220 and 222 via the microphone cables 242 and 1135, if needed. The speaker feedthrough connector 1140 is connected internally to the speaker feedthrough connector 260 of the enclosure 210 via the speaker cable 262, and to the speaker 250 using a speaker cable 1145 within the acoustic coupling chamber 1110.

In one embodiment, a suitable sealing mechanism is utilized to form a liquid or gas tight seal between the acoustic coupling chamber 1110 and the voice coil/magnet assembly 254 and the first portion 292 of the cooling device, while allowing the voice coil/magnet assembly 254 and the first portion 292 of the cooling device 290 to be in sufficient thermal contact. In addition, a suitable sealing mechanism is utilized to form a liquid or gas tight seal between the acoustic coupling chamber 1110 and the microphone mounts 230. Depending on the types of liquid or gaseous materials used to fill the acoustic coupling chamber 1110, the microphone elements and speaker elements can be designed with materials that are non-reactive with the liquid or gas material to prevent or minimize corrosion or damage to the microphone elements and speaker elements. In addition, the speaker 250 may be a modification of a commercially available speaker (e.g., guitar speaker) or a custom design speaker which is suitable for the given application. Indeed, a custom designed speaker can be optimized for minimal size with a full range of frequency response.

The space between the enclosure 210 and the acoustic coupling chamber 1110 comprises a reduced pressure environment (e.g., below 1 atmosphere to near-vacuum pressure, or from about 10% to about 95% less than the external ambient pressure) to provide acoustic isolation as discussed above, while the acoustic coupling chamber 1110 comprises a liquid or a gaseous material (at a pressure with the same or less than the ambient pressure) to provide a desired level of acoustic coupling. Indeed, when the acoustic coupling chamber 1110 is filled with one or more preferably inert gasses, the gas pressure within the acoustic coupling chamber 1110 may be pressurized to any level below, at, or above one atmosphere of pressure.

It should be noted that there is a tradeoff between pressure levels in the acoustic coupling chamber 1110 as acoustic waves created within the acoustic coupling chamber 1110 are presented to the internal microphones 220 and 222. While the pressure within the acoustic coupling chamber 1110 may be less than one atmosphere, it is still significantly greater than the low pressure or vacuum maintained within the housing 210 external to the acoustic coupling chamber 1110. Thus, ribbon microphones, which are easily damaged by high sound pressure levels, are preferably utilized with gas pressure levels that will not damage the ribbon microphones. Conversely, solids or liquids, which are utilized as the acoustic coupling transmission medium will have unique effects on sound, such as significantly enhanced transient response. Sound pressure levels within the acoustic coupling chamber 1110, which emanate from the speaker 250, can be optimally selected as discussed herein.

In the example embodiment of FIG. 11, the connection between the speaker frame 256 and the inner walls of the acoustic coupling chamber 1110 effectively forms an "acoustic seal" (or speaker baffle) between a front region of the acoustic coupling chamber 1110 (in front of the speaker cone 252) and a back region of the acoustic coupling chamber 1110 (in back of the speaker cone 252). This "acoustic seal" allows for a much lower frequency response of acoustic signals produced by given speaker 250 as there is minimal to no destructive interference or cancellation of sound signals output from the from the front of the speaker as a result of refracted out of phase waveforms generated behind the speaker by the backwards motion of the speaker cone 252.

Figure 12:
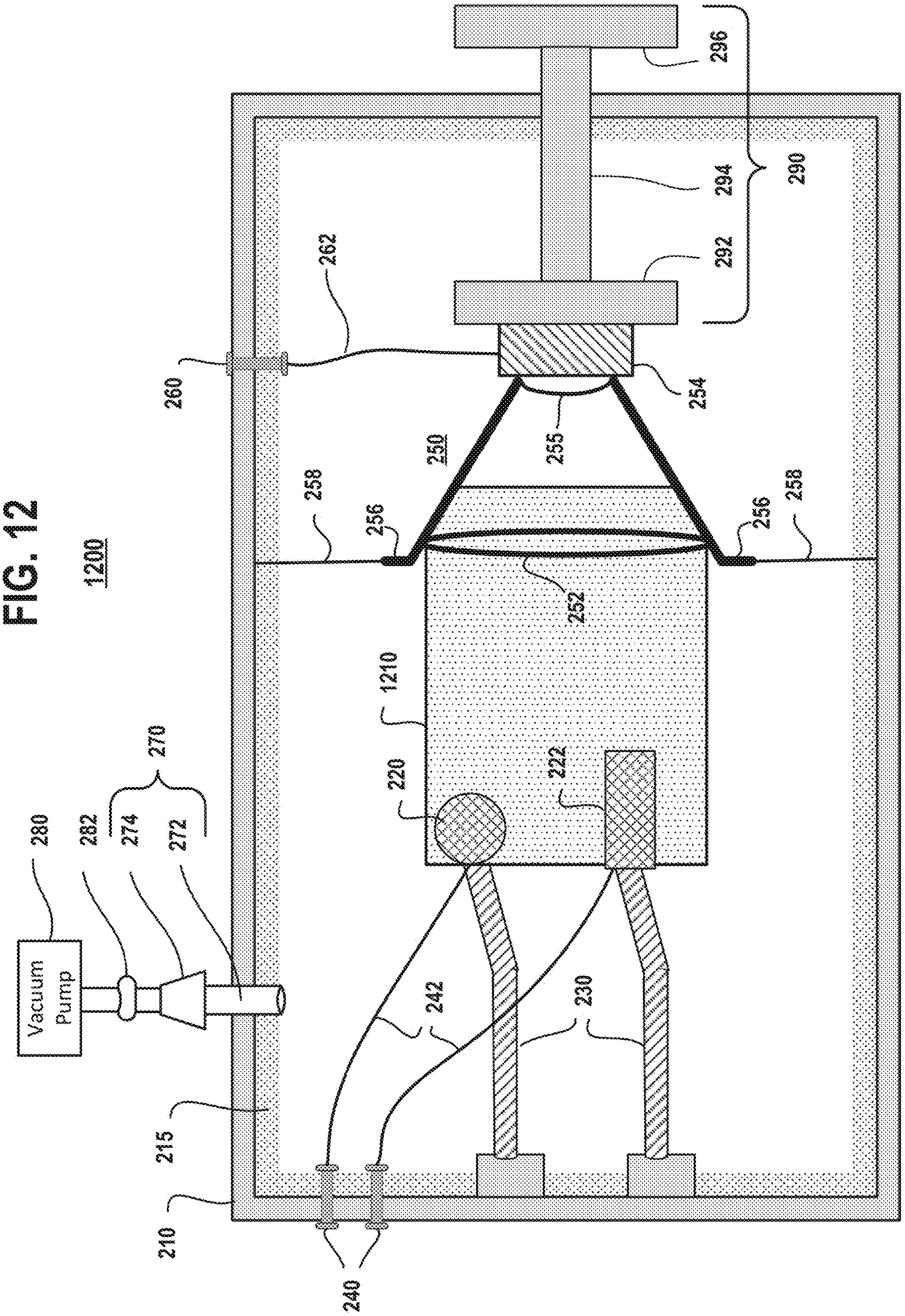
FIG. 12 schematically illustrates a sound attenuation, coupling, and isolation apparatus according to another embodiment of the disclosure.

FIG. 12 schematically illustrates a sound attenuation, coupling, and isolation apparatus 1200 according to another embodiment of the disclosure. The sound attenuation, coupling, and isolation apparatus 1200 illustrates an embodiment of the sound attenuation, coupling and isolation apparatus 1030 which can be implemented in the system 1000 of FIG. 10. In the exemplary embodiment shown in FIG. 12, the sound attenuation, coupling, and isolation apparatus 1200 is similar to the sound attenuation and isolation apparatus 200 of FIG. 2 as discussed above, except for the inclusion of an acoustic coupling device 1210, which is configured to operate as an acoustic waveguide that transfers acoustic energy from the speaker 250 to the microphones 220 and 222.

In the exemplary embodiment of FIG. 12, the acoustic coupling device 1210 comprises a solid acoustic coupling device which is formed of one of a solid material, a semi-flexible material, and a flexible material. The solid acoustic coupling device 1210 is mechanically and acoustically coupled to the microphones 220 and 222, and at least a portion of a speaker cone 252 of the speaker 250. Examples of different types of solid materials that can be utilized to form the acoustic coupling device 1210 are shown in FIG. 22. As compared to the embodiment of FIG. 11 which implements an acoustic coupling chamber filled with gas or liquid, the acoustic coupling device 1210 is essentially a solid block of material(s), which is mechanically coupled to, or otherwise encapsulates, the microphone 220 and 222 and a front region of the speaker cone 252 of the speaker 250. In this embodiment, the acoustic signals (vibrational energy) generated by the speaker cone 252 are transmitted through the solid acoustic coupling device 1210 to the microphones 220 and 222.

In this configuration, an enhanced low frequency response with relatively small speaker size is achieved by the enhanced acoustic coupling provided by the acoustic coupling device 1200 which allows the speaker 250 to drive the microphones 220 and 222 with an extended frequency range including low frequencies with wavelengths that are longer than the diameter of the speaker cone. In addition, the reduced air pressure within the enclosure 210 surrounding the acoustic coupling device 1210 prevents out of phase standing waves (generated by the backwards motion of the speaker cone 252) from destructively interfering with the acoustic energy transmitted by the mechanical acoustic coupling device 1210.

It should be noted that embodiments of the disclosure for reducing sound pressure levels as discussed herein can be utilized in conjunction with other types of existing solutions to further reduce sound pressure levels. By way of example, such sound reducing solutions include baffling at various angles to reduce wave reflections, other sound suppression techniques used in isolation cabinets, and sound suppression systems and devices such as isolation boxes, power attenuators, flux density attenuation speakers, and fluxtone technology.

Other embodiments of the disclosure, as will be discussed in further detail below in conjunction with FIGS. 13-19, include systems, methods and apparatus for producing sound with speakers that are mounted to an enclosure (e.g., speaker cabinet) with reduced internal pressure within the enclosure. The reduced internal pressure within the enclosure provides an environment with a reduced air/gas pressure level at a back side of a speaker cone of the speaker, which enhances a low frequency response for a given speaker size, while also minimizing resonant frequencies and phase cancellation issues which could otherwise occur with conventional speaker systems in which acoustic signals (sound waves) are generated at the back side of the speaker cone. As explained below, reducing the pressure behind the speaker cone (e.g., within a speaker cabinet) has the effect of reducing or eliminating the generation of resultant out-of-phase acoustic signals at the back of the speaker cone, which in turn eliminates issues of phase cancellation for low frequencies, and allows smaller speakers and speaker systems to reproduce much lower frequencies than is presently possible with conventional speaker cabinet and enclosure designs.

To better understand principles of the exemplary embodiments discussed herein, a brief discussion of the relationships between speed of sound, acoustic frequency and wavelength is provided as follows.

To begin, the speed of sound in air is governed by the following equation:

$$v = \frac{f}{\lambda} \qquad \text{EQN. [8]}$$

where v denotes the speed of sound (meters/sec), λ denotes the wavelength (meters), and f denotes frequency (Hertz). The speed of sound in a given solid or liquid medium is determined by density and rigidity of the given medium, and the speed of sound in a given gaseous medium is determined by the density and compressibility of the gas. Assuming a standard atmospheric pressure, a temperature of 20° C., and dry air, the speed of sound is 343 meters/sec. If we take the widely adopted numbers for the range of human hearing as 20 Hz to 20,000 Hz, we have corresponding periods of 50 milliseconds and 50 microseconds, respectively.

We can derive wavelengths from EQN. 8 above: For 20 Hz, the lowest part of the audible range, the wavelength is:

$$\lambda = v/f = \frac{343\text{ meters/sec}}{20\text{ Hz}} = \frac{343\text{ meters/sec}}{20\text{ cycles/sec}} = 17.15\text{ meters/cycle}$$

For 20,000 Hz, the highest part of the audible range, the wavelength is:

$$\lambda = v/f = \frac{343\text{ meters/sec}}{20{,}000\text{ Hz}} = \frac{343\text{ meters/sec}}{20{,}000\text{ cycles/sec}} = 1.715\ \textit{centi}\text{meters/cycle}$$

It has long been recognized that a modern dynamic speaker has difficulty in reproducing acoustic signals (sounds) which possess wavelengths that are larger than the diameter of the speaker itself. As shown above, low frequency acoustic signals have commensurately long wavelengths. For a standard 12-inch guitar speaker (30.48 centimeters), the corresponding frequency is determined as follows:

$$f = v/\lambda = \frac{343\text{ meters/sec}}{0.3048\text{ meters}} \cong 1{,}125\text{ Hz}$$

For example, a typical six string guitar with common string gauges and standard tuning, the lowest note is E2 which equates to approximately 82.41 Hz. The corresponding highest string on the typical six string guitar in standard tuning is E4, which is approximately 329.63 Hz. For a modern rock guitar with 24 frets, the basic pitch can be raised two octaves to E6, yielding approximately 1,318.52 Hz. Harmonics can be much higher and are often utilized. This analysis ignores the effects due to various temperaments which are typically minor. In addition to standard tuning, the guitar may be placed in scordatura, or altered tuning. The most common of these is the drop D tuning where the lowest note is D, which equals approximately 73.42 Hz. The problem is further compounded when one examines the Bass guitar, which in a 5-string configuration commonly has a low note of E1, approximately 41.20 Hz, and in a 6-string configuration can go as low as BO, or approximately 30.87 Hz. Needless to say, all of these frequencies are many octaves below the fundamental size and corresponding frequency of the 12-inch speaker.

Figure 13:
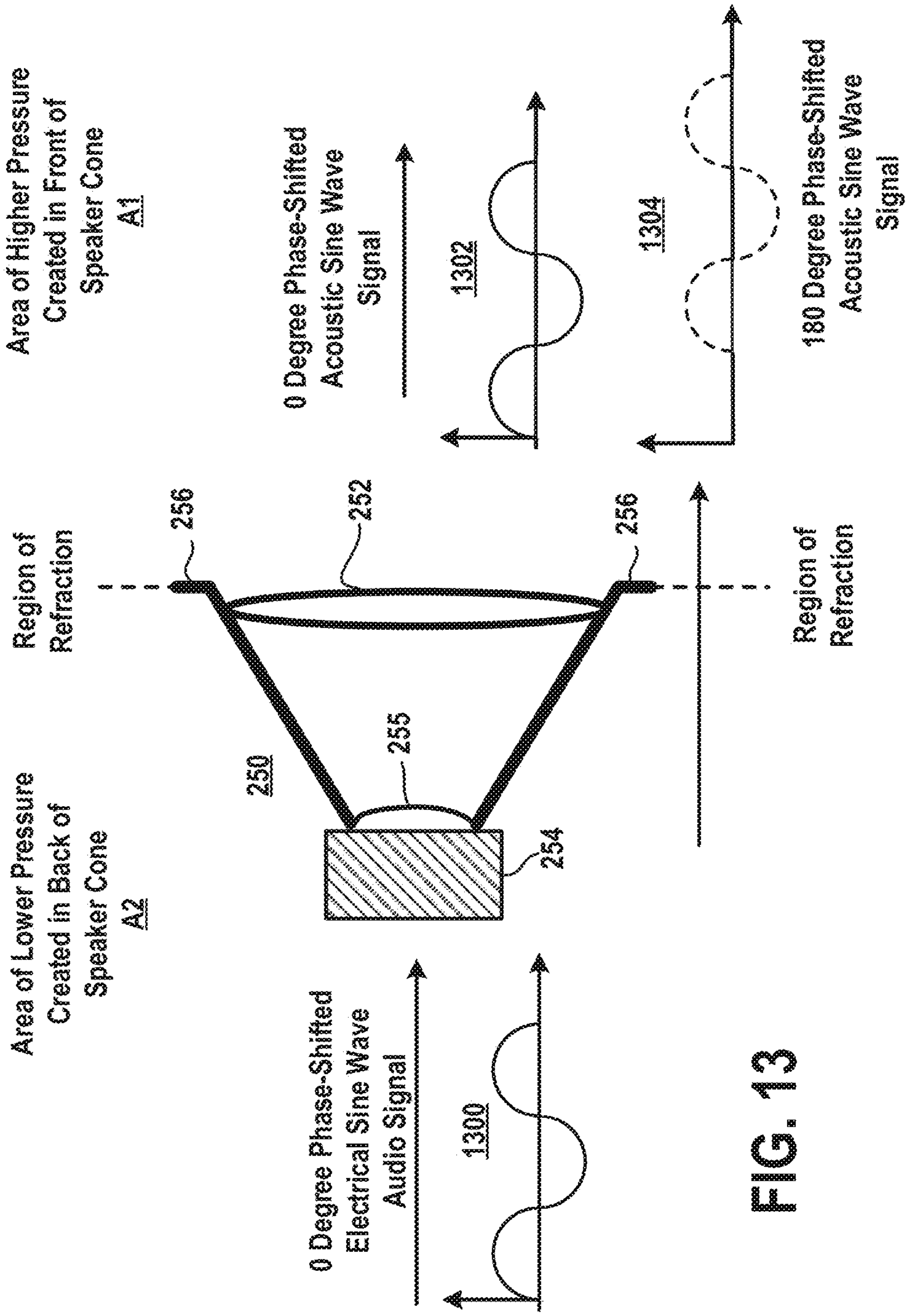
FIG. 13 schematically illustrates a phenomenon of phase cancellation of low frequency acoustic signals which arises by operation of a speaker in standard atmosphere outside of a speaker enclosure.

FIG. 13 schematically illustrates a phenomenon of phase cancellation of low frequency acoustic signals which arises by operation of a speaker in standard atmosphere outside of a speaker enclosure. In particular, FIG. 13 illustrates a speaker 250 placed in standard atmosphere without an enclosure. By way of example, an electrical input signal 1300 (0-degree phase-shifted sine wave audio signal), at a suitable low frequency, is applied to the voice coil assembly 254. The electrical signal 1300 causes the speaker cone 252 to move back and forth. The forward motion of the speaker cone 252 pushes the air (which is in front of the speaker cone 252) forward, thereby creating an area A1 of higher pressure in front of the speaker 250. Assuming an idealized speaker, in response to the electrical signal 1300 (0-degree phase shifted sine wave audio signal), the speaker will generate an acoustic signal 1302 (0-degree phase shifted acoustic wave), which is in phase with the electrical input signal 1300.

On the other hand, the forward motion of the speaker cone 252 creates a corresponding low-pressure area A2 behind the speaker cone 252, which results in the speaker 250 creating a second acoustic signal 1304 behind the speaker cone 252 which is 180-degree phase-shifted from the electrical and acoustic signals 1300 and 1302. Thus, the area A1 in front of the speaker 250 and the area A2 behind the speaker 250 concurrently create acoustic waveforms that are nearly equal in magnitude and approximately 180 degrees out of phase with each other. When the corresponding acoustic signals 1302 and 1304 have a wavelength that is substantially the same or greater than the diameter of the speaker cone 252, the acoustic signal 1304 that is generated behind the speaker cone 252 will refract around an edge (e.g., frame 256) of the speaker 250 and destructively interfere with the acoustic signal 1302 generated in front of the speaker cone 252. In other words, for components of an acoustic signal generated by the speaker 250 having wavelengths that are substantially the same or greater than the diameter of the speaker cone 252, the corresponding 180-degree out-of-phase acoustic signal components created behind the speaker cone 252 refract around the edge of the speaker 250 and cancels out much, if not all, of the corresponding acoustic signal components emitted from the front of the speaker 250.

On the other hand, no refraction occurs for higher frequency components of the acoustic signal generated by the speaker 250 with wavelengths that are relatively smaller than the diameter of the speaker cone 252. Consequently, when the corresponding acoustic signals 1302 and 1304 have a wavelength that is smaller than the diameter of the speaker cone 252, the acoustic signal 1304 that is generated behind the speaker cone 252 will not refract around an edge (e.g., frame 256) of the speaker 250 and destructively interfere with the acoustic signal 1302 generated in front of the speaker cone 252. As such, no destructive cancellation occurs for high frequency acoustic signals generated by operation of the speaker 250 in standard atmosphere outside of a speaker enclosure.

Embodiments of the disclosure provide techniques for reducing or eliminating distortions and/or destructive interference of acoustic signals generated by a speaker within a speaker cabinet as a result of increased back pressure and undesired resonant frequencies generated as a result of the speaker enclosure components (e.g., air ports of the speaker cabinet) and the structural configuration of the speaker cabinet. For example, exemplary embodiments as discussed in further detail below with reference to, e.g., FIG. 14 through FIG. 18E, provide methods for reducing or eliminating the pressure in an area behind the speaker cone (e.g., within a speaker cabinet) to reduce or eliminate generation of a resultant out-of-phase acoustic signal. This in turn eliminates the problem of phase cancellation for low frequencies, which in turn allows smaller speaker and speaker systems to reproduce much lower frequencies than is presently possible.

In addition, the reduction or elimination of pressure within the area in back of the speaker cone effectively reduces or eliminates coupling to the speaker enclosure. This is highly desirous as modern high-end speaker systems typically require sophisticated mechanical configurations to eliminate mechanical coupling to the enclosure and/or the external environment. Additional benefits of the exemplary embodiments discussed below are realized when multiple speakers are disposed within the same enclosure, e.g., when a two-element speaker system is utilized to more efficiently reproduce high and low frequencies, or when multiple speakers are housed within the same speaker cabinet enclosure to create higher sound pressure levels. In either case, the pressure waves created behind each respective speaker cone propagate to other speakers within the enclosure and interfere with each other. This is most prevalent in fully enclosed speaker housings but is also a significant issue in ported or open back speaker enclosures. Further when two speakers, often of disparate size, are utilized to reproduce high and low frequencies, the reduction or elimination of pressure from the back of the speaker cones effectively reduces or eliminates undesired coupling and interference.

Figure 14:
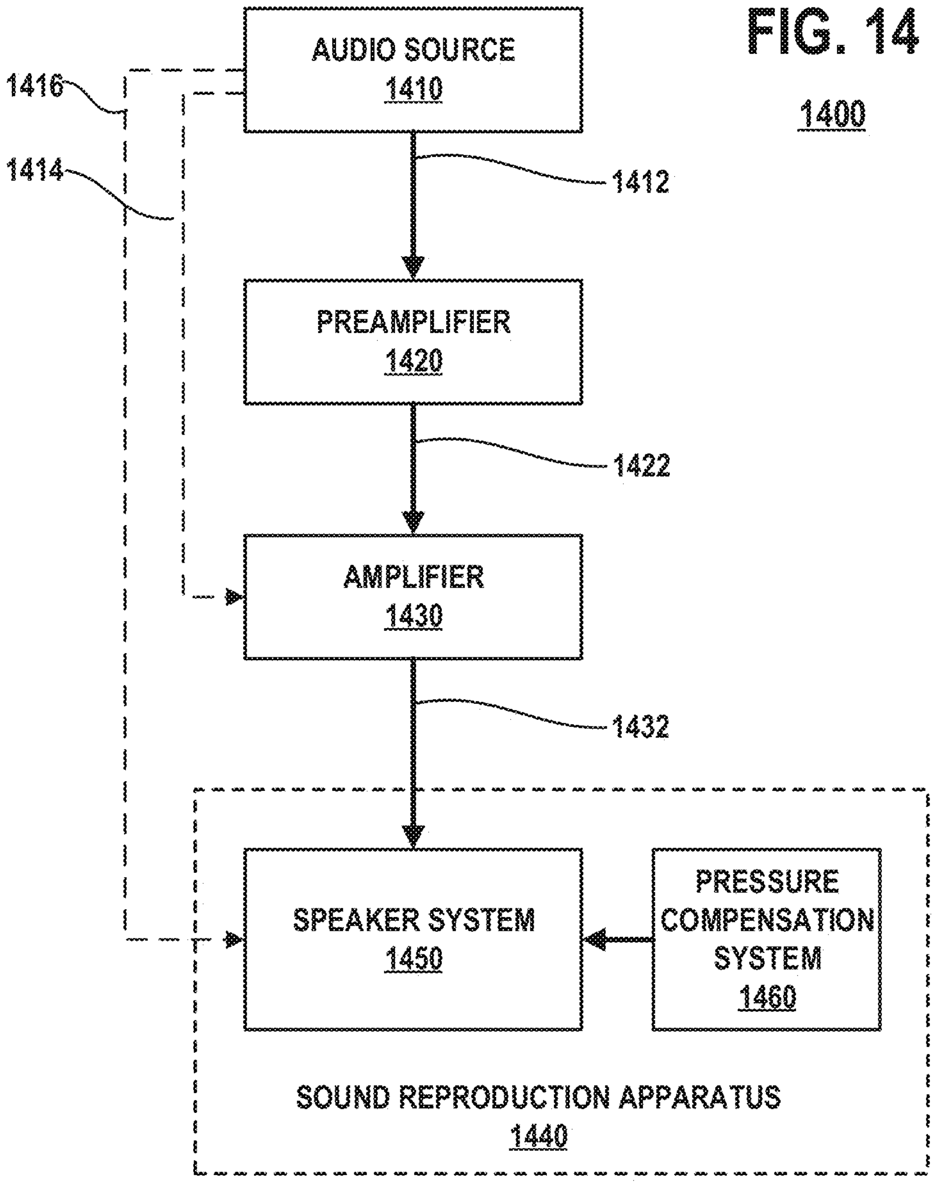
FIG. 14 illustrates a block diagram of an audio system which comprises a sound reproduction apparatus which is configured to enhance an acoustic response of speaker using a speaker cabinet with reduced internal pressure and a pressure compensation system to compensate for a pressure differential between a front side and a back side of a speaker cone of the speaker, according to an embodiment of the disclosure.

FIG. 14 illustrates a block diagram of an audio system 1400 which comprises a sound reproduction system that is configured to enhance an acoustic response of speaker, according to an embodiment of the disclosure. In particular, the audio system 1400 comprises an audio source 1410, a preamplifier 1420, an amplifier 1430, and a sound reproduction apparatus 1440. The sound reproduction apparatus 1440 comprises a speaker system 1450 and a pressure compensation system 1460. The speaker system 1450 comprises one or more speakers mounted to an enclosed speaker cabinet (or fully enclosed baffle system) with a front side of the speaker(s) facing outside the enclosure and a back side of the speaker(s) disposed within the enclosed speaker cabinet. The enclosure of the speaker system 1450 comprises an evacuation port or similar device, which is configured to connect to a system that reduces a pressure level within the enclosure to a level that is less than an ambient air pressure level outside the enclosure. The speaker enclosure and speaker(s) are structurally configured and designed to maintain the reduced pressure level within the enclosure which is less than an ambient air pressure level outside the enclosure. The enclosure is permanently sealed or otherwise configured to be sealed (i.e., sealable) to maintain the reduced pressure level within the enclosure. The pressure inside the enclosure can be reduced to at least 10%, 15%, 20%, 25%, 30%, 35%, 40%, 45%, 50%, 55%, 60%, 65%, 70%, 75%, 80%, 85%, 90%, or 95% less than the ambient air pressure level outside the enclosure, or more generally, in a range of about 10% to about 95% less than the ambient pressure level outside the enclosure.

By maintaining the back side of the speaker in a reduced gas (e.g., air) pressure level environment, the sound reproduction apparatus 1440 is designed to maximize the low frequency response for a given speaker size, while also minimizing resonant frequencies and phase cancellation issues which could otherwise occur with conventional speaker systems in which acoustic signals (sound waves) are generated at the back side of the speaker cone. As explained in further detail below, the pressure compensation system 1460 is configured to compensate for a pressure differential between a front side and back side of a speaker cone of the speaker, and thereby maintain the voice coil assembly of the speaker at a null position.

For example, in some embodiments, the pressure compensation system 1460 comprises a mechanical system that is implemented, for example, using the framework of FIG. 9. In this embodiment, the viscous damping system 900 (e.g., hydraulic damping system) would be configured to extend the pistons 904 from the cylinder 902 at a sufficient distance to push the speaker cone 252 forward and place the voice coil assembly 254 of the speaker 250 into a null position, and allow the voice coil assembly 254 to move back and forth about the null position during operation of the speaker 250. The amount of force exerted by the viscous damping system 900 to place the voice coil assembly 254 into the null position could be controlled under manual or automated control settings.

In other embodiments, the pressure compensation system 1460 comprises an electrical-based voice coil position control system which can be implemented using exemplary embodiments as discussed in further detail below with reference to FIGS. 15 through 18E. In general, an electrical-based voice coil position control system generates a DC control signal (voltage or current) which is applied to a voice coil of the voice coil assembly 254. The DC control signal has a DC magnitude which generates an electromagnetic force (EMF) that is sufficient to push the voice coil assembly 254 of the speaker 250 forward from a rest position (and thus push the speaker cone 252 forward) and place the voice coil assembly 254 of the speaker 250 into a null position, and allow the voice coil assembly 254 to move back and forth about the null position during operation of the speaker 250. In this regard, the DC control signal applied to the voice coil of the speaker compensates for a differential force applied to the speaker cone as a result of the differential pressure between the atmospheric pressure external to the speaker and the lower internal pressure within the enclosure.

The audio source 1410 may comprise any type of musical instrument (e.g., electric guitar) which comprises a pickup or transducer that converts acoustical energy into electrical, optical, or other form of energy, a virtual electronic instrument such as a sampler or synthesizer, a microphone, a tape, compact disk, MP3 player, radio receiver, satellite receiver, steaming music source, home theater player, or any other type device that outputs music or any other representation of sound. This includes all forms of sound such as and music, speech, and sound effects associated with all and any form of video. The audio source output signal may be in analog or digital format and may have one or more outputs that are transmitted individually or multiplexed.

The preamplifier 1420 and amplifier 1430 are optional components. In one embodiment, the audio source 1410 is operatively connected to an input of the preamplifier 1420 using a suitable cable/connector 1412, the preamplifier 1420 is operatively connected to an input of the amplifier 1430 using a suitable cable/connector 1422, and the amplifier 1430 is operatively connected to the speaker system 1450 using a suitable cable/connector 1432. The preamplifier 1420 converts a low-level signal into a high-level signal suitable for sending to the power amplifier 1430. The preamplifier 1420 can also accept signals from a variety of industry standard and other interfaces such as optical inputs, digital inputs, or any other suitable means. The optical and electrical digital signals may have multiple forms of information also encoded with digital audio such as video, graphics, still photos, and control information. The exemplary embodiments discussed herein can be applied to the audio portion of such signals.

With modern audio systems, the preamplifier 1420 may be embedded into another device, e.g., an audio mixer. Further, the preamplifier 1420 may be integrally housed with or without the amplifier 1430 within the speaker system 1450. In some embodiments, one or more signals transmitted from the audio source 1410 are compatible and operatively connected (via connector 1414) to the amplifier 1430. Similarly, in some embodiments, one or more signals transmitted from the audio source 1410 are compatible and operatively connected (via connector 1416) to the speaker system 1450.

The power amplifier 1430 may comprise any type of amplifier device such as a solid-state amplifier, a tube amplifier, a combination of solid-state and tube amplifiers, or any type of device utilized to amplify or accept an input signal and drive the speaker system 1450. While the connections 1412, 1414, 1416, 1422 and 1432 may be implemented as hard-wired connections using suitable cables and connectors, in alternate embodiments, the connections 1412, 1414, 1416, 1422 and 1432 may be implemented wirelessly using any suitable wireless or alternate communication technology with sufficient bandwidth. The wireless network architecture may be implemented using a serial or star network topology or using any suitable network topology that provides sufficient bandwidth for real-time connectivity with an acceptable latency for playback purposes. In this regard, it is to be understood that the connections 1412, 1414, 1416, 1422 and 1432 can be implemented using a variety of different technologies to accomplish the intended function.

It should be noted that while various components of the system 1400 are shown in FIG. 14 as discrete elements with wired or wireless interconnects, some components may be integrated within a common housing with alternative interconnection topologies. For example, it may be possible to house the audio source 1410, the preamplifier 1420, the amplifier 1430, and the speaker system 1450 in a common enclosure. Integrated circuits, miniaturized speakers, and other applicable technologies can be utilized to make the various components of the speaker system 1450 fit within a relatively small enclosure. While there may be various tradeoffs with useful frequency range and power consumption, however, with low pressure and high efficiency speakers, extremely low power consumption may be utilized to create high sound pressure levels.

Figure 15:
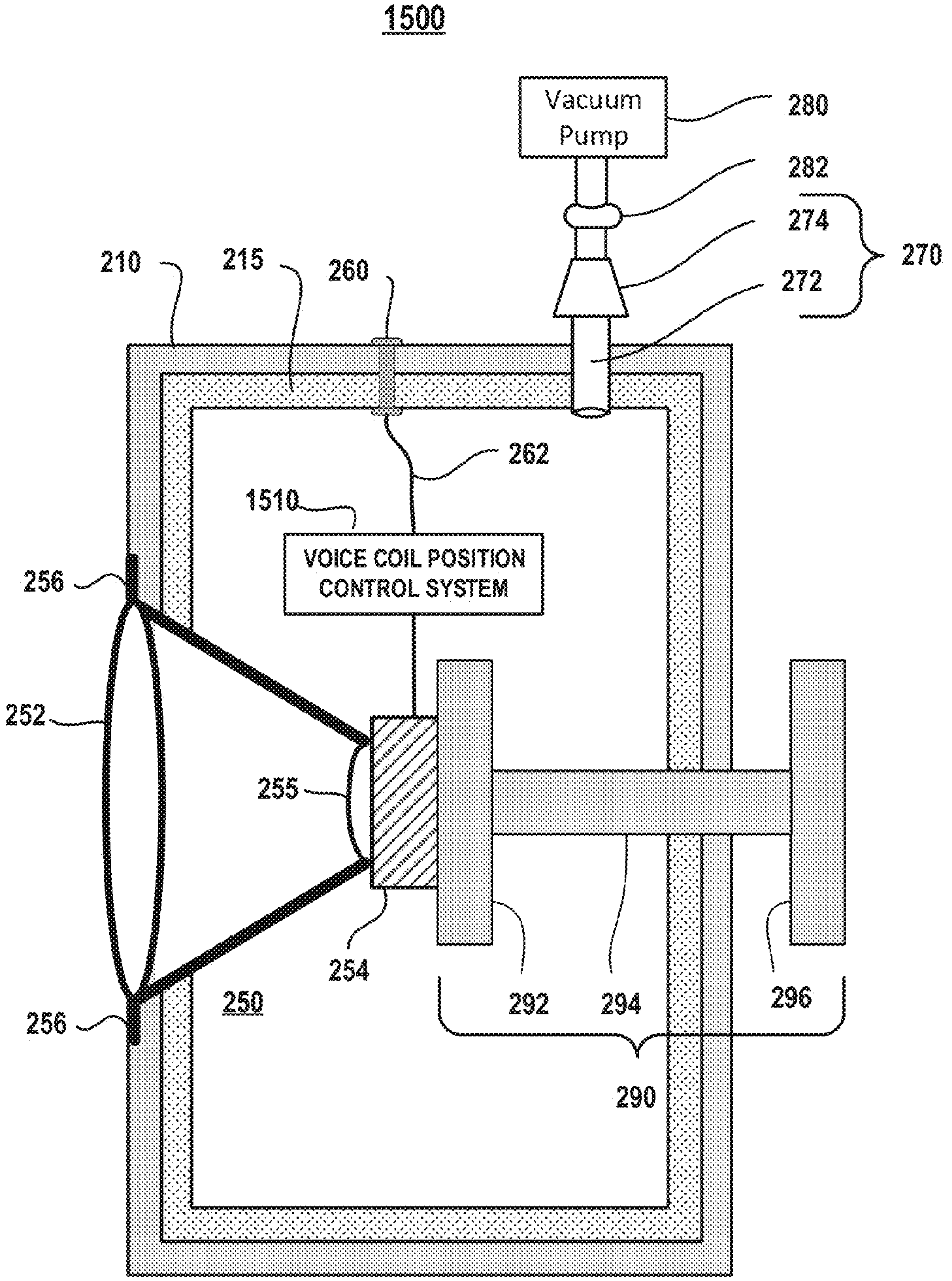
FIG. 15 schematically illustrates a sound reproduction apparatus which is configured to enhance an acoustic response of speaker using a speaker cabinet with reduced internal pressure and a pressure compensation system implemented using a voice coil position control system to compensate for a pressure differential between a front side and a back side of a speaker cone of the speaker, according to an embodiment of the disclosure.

FIG. 15 schematically illustrates a sound reproduction apparatus 1500 which is configured to enhance an acoustic response of a speaker using a speaker cabinet with reduced internal pressure and a pressure compensation system implemented using a voice coil position control system to compensate for a pressure differential between a front side and back side of a speaker cone of the speaker, according to an embodiment of the disclosure. The pressure inside the enclosure can be at least 10%, 15%, 20%, 25%, 30%, 35%, 40%, 45%, 50%, 55%, 60%, 65%, 70%, 75%, 80%, 85%, 90%, or 95% lower than the ambient air pressure level outside the enclosure, or more generally, in a range of about 10% to about 95% less than the ambient pressure level outside the enclosure. The sound reproduction apparatus 1500 illustrates an embodiment of the sound reproduction apparatus 1440 which can be implemented in the system of FIG. 14. Similar to the sound attenuation and isolation apparatus 200 of FIG. 2, the sound reproduction apparatus 1500 comprises a sealed enclosure 210 (or sealable enclosure), an optional layer of sound absorbing material 215, at least one speaker 250, a speaker feedthrough connector 260, a pressure reducing system (270, 280, 282) for reducing the internal pressure level within the enclosure 210, and a speaker cooling device 290, the functions of which are described above and will not be repeated.

The speaker 250 comprises a speaker cone 252 (or diaphragm), a speaker coil/magnet assembly 254, a dust cover 255 to cover the speaker coil, and a speaker frame 256 (or basket). The speaker 250 is mounted to the enclosure 210 with a front side of the speaker 250 facing outside the enclosure 210 and a back side of the speaker 250 disposed within the enclosure 210 (in which a lower internal pressure is maintained). In this configuration, the speaker 250 is specifically designed or modified as needed to be able to maintain the reduced air/gas pressure within the enclosure 210. For example, common commercially available speakers can be modified for such purpose, or custom designed speakers with sufficient sealing mechanisms to maintain a gas pressure seal can be implemented. The speaker 250 is mounted to the enclosure 210 using a suitable mounting mechanism connected to the speaker frame 256. The speaker mounting device may comprise any suitable mounting device such as a taught wire, a spring mechanism, or other type of mounting mechanism, preferably one that minimizes or eliminates vibrational coupling between the speaker 250 and the enclosure 210, and which can maintain the reduced air/gas pressure within the enclosure 210.

In another embodiment, a one-way valve is utilized in conjunction with the evacuation port or other orifice to reduce air pressure within the enclosure 210. The speaker cone 252 is driven to its full negative excursion into the enclosure 210 forcing air out of the one-way valve and reducing the air pressure within the enclosure 210. Alternately, the one-way valve reduces or maintains a reduced pressure within the system each time the speaker cone 252 has an excursion into the enclosure 210 while reproducing sound.

The sound reproduction apparatus 1500 further comprises a voice coil position control system 1510. The voice coil position control system 1510 is electrically connected to the voice coil assembly 254 of the speaker 250 and to the speaker feedthrough connector 260 via the speaker cable 262. The voice coil position control system 1510 is configured to apply a DC control voltage to the voice coil assembly 254 of the speaker 250, wherein the DC control voltage (or current) comprises a DC magnitude that generates an electromagnetic force (EMF) which is sufficient to push the voice coil assembly 254 of the speaker 250 forward from a rest position (and thus push the speaker cone 252 forward) and place the voice coil assembly 254 of the speaker 250 into a null position which allows the voice coil assembly 254 to move back and forth about the null position during operation of the speaker 250. In this regard, the DC control signal applied to the voice coil assembly 254 of the speaker 250 serves to compensate for the differential force applied to the front and back sides of the speaker cone 252 as a result of the differential pressure between the atmospheric pressure external to the speaker (applied to the front of the speaker cone 252) and the lower internal pressure within the enclosure 210 (applied to the back of the speaker cone 252).

The voice coil position control system 1510 can be implemented using various techniques according to embodiments of the disclosure as discussed herein. In some embodiments, the voice coil position control system 1510 is configured to apply a DC control signal (DC current or voltage) to the voice coil assembly 254 of the speaker 250, wherein the DC control signal is either fixed a priori or user-adjusted. In this instance, the sound reproduction apparatus 1500 can be calibrated to determine optimal magnitude levels of a DC control signal to apply to the voice coil assembly 254 for different reduced pressure levels within the enclosure 210. In other embodiments (e.g., FIGS. 16, 17A-B, and 18A-E), various sensors can be implemented to automatically generate DC control signals which are sufficient to position the voice coil assembly 254 of the speaker 250 into a null position, based on the differential pressure between the external and internal environment of the enclosure 210.

Further, in some embodiments, the voice coil position control system 1510 is configured to combine an audio signal (which is input via the speaker feedthrough 260 and cable 262) with a DC control signal generated by the voice coil position control system 1510 (e.g., add the DC control signal as a DC offset voltage to the input audio signal), and apply the combined signal to a primary voice coil of the voice coil assembly 254. In other embodiments, the voice coil position control system 1510 is configured to apply an audio signal (which is input via the speaker feedthrough 260 and cable 262) to a primary voice coil of the voice coil assembly 254 and apply a DC control signal generated by the voice coil position control system 1510 to a secondary voice coil of the voice coil assembly 254.

The sound reproduction apparatus 1500 provides for a reduced internal pressure within the enclosure 210 to maximize the low frequency response for a given speaker size, while also minimizing resonant frequencies and phase cancellation issues as discussed above. It is to be understood that while one speaker 250 is shown in FIG. 15 for ease of illustration, the sound reproduction apparatus 1500 may include two or more speakers mounted within the sealed enclosure 210. The use of multiple speakers within the enclosure 210, often to cover abroad range of sound frequencies efficiently, is enhanced by the reduced internal pressure within the enclosure 210 as there is little to no coupling of undesired acoustic signals from speaker to speaker since there are minimal or no acoustic waves generated inside the enclosure 210. In addition, the lack of destructive interference from each speaker due to out of phase acoustic waves is essentially eliminated, which thereby allows much smaller speakers to generate sound at much lower frequencies.

Figure 16:
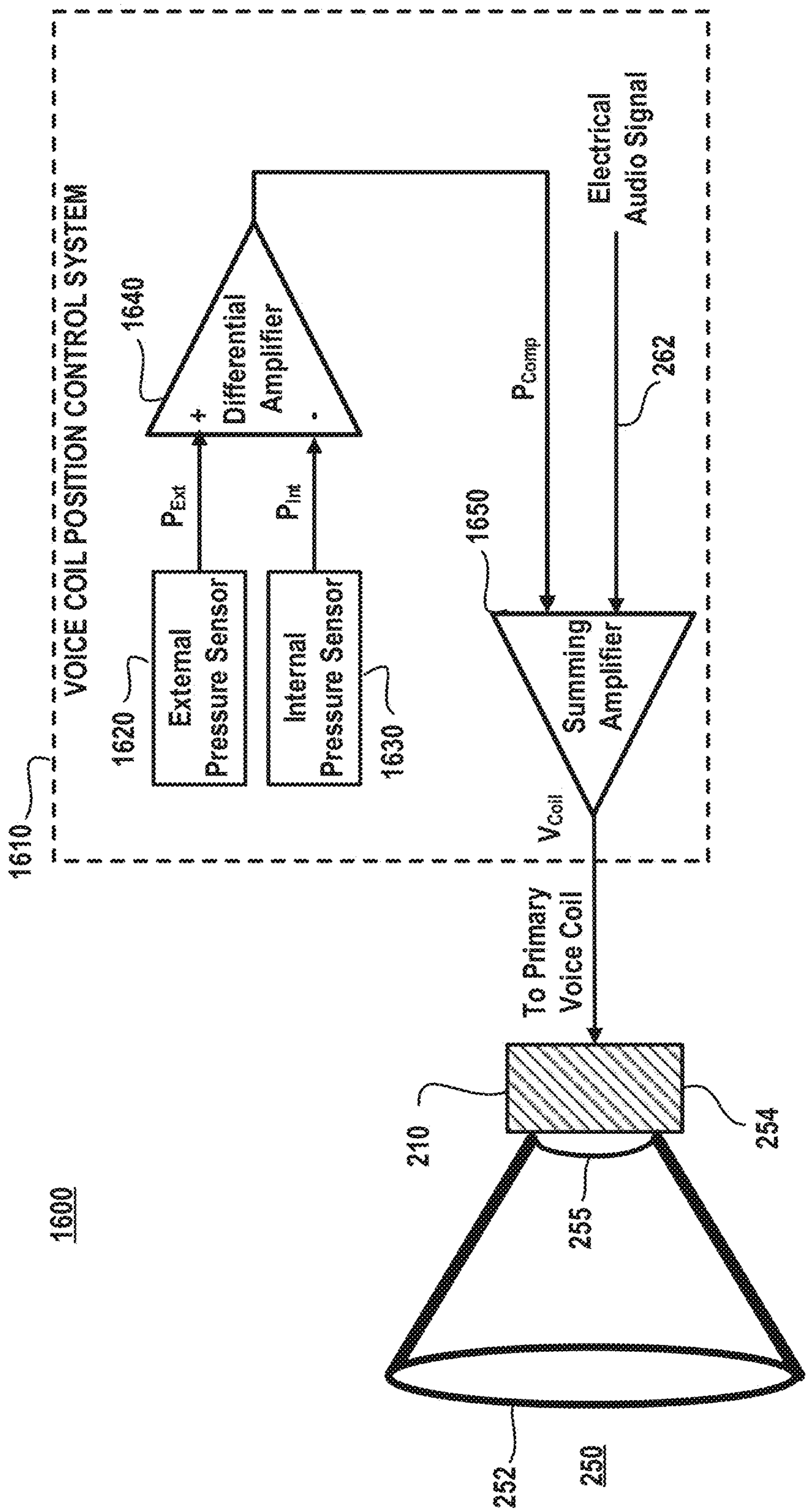
FIG. 16 schematically illustrates a sound reproduction apparatus which comprises a voice coil position control system to compensate for a pressure differential between a front side and a back side of a speaker cone of a speaker, according to an embodiment of the disclosure.

FIG. 16 schematically illustrates a sound reproduction apparatus 1600 which comprises a voice coil position control system 1610 to compensate for a pressure differential between a front side and a back side of a speaker cone of a speaker, according to an embodiment of the disclosure. FIG. 16 schematically illustrates an exemplary embodiment of the voice coil position control system 1510 of FIG. 15. The voice coil position control system 1610 comprises an external pressure sensor 1620, an internal pressure sensor 1630, a differential amplifier 1640, and a summing amplifier 1650. The outputs of the pressure sensors 1620 and 1630 are connected to the differential inputs (non-inverting (+) input, and inverting (−) input) of the differential amplifier 1640. An output of the differential amplifier 1640 is connected to a first input of the summing amplifier 1650. In addition, an electrical audio signal (which is applied to the internal speaker cable 262 from an audio source or amplifier) is applied to a second input of the summing amplifier 1650. An output of the summing amplifier 1650 is connected to an input terminal of a voice coil winding of the voice coil assembly 254 of the speaker 250.

In operation, the external pressure sensor 1620 sensor generates a pressure detection signal $P_{Ext}$ which corresponds to an external ambient pressure level outside the enclosure 210, and the internal pressure sensor 1630 generates a pressure detection signal $P_{int}$ which corresponds to an internal pressure within the enclosure 210. Furthermore, during operation, the internal environment inside the enclosure 210 is maintained as a reduced pressure level as compared to the external pressure level outside of the enclosure 210. The differential amplifier 1640 generates and amplifies a difference between the pressure detection signals $P_{Ext}$ and $P_{int}$ and outputs a position compensation control signal $P_{Comp}$, which is input to the summing amplifier 1650.

In some embodiments, embodiment, the position compensation signal $P_{Comp}$ comprises a DC voltage which serves to drive the primary voice coil winding (e.g., asymmetric voice coil) of the voice coil assembly 254 to a "null position" (or "0" position) based on magnitude of the position compensation signal $P_{Comp}$. The summing amplifier 1650 amplifies a sum of the position compensation signal $P_{Comp}$ and the input electrical audio signal (which is an alternating current (AC) signal), and outputs a voice coil drive voltage $V_{Coil}$ which comprises an amplified AC audio signal with a DC offset that corresponds to the position compensation signal $P_{Comp}$. The DC offset component of the voice coil drive voltage $V_{Coil}$ induces a constant EM force on the voice coil to compensate for the pressure differential between the front and back side of speaker cone and thereby position the voice coil in a target null position.

Figure 17A:
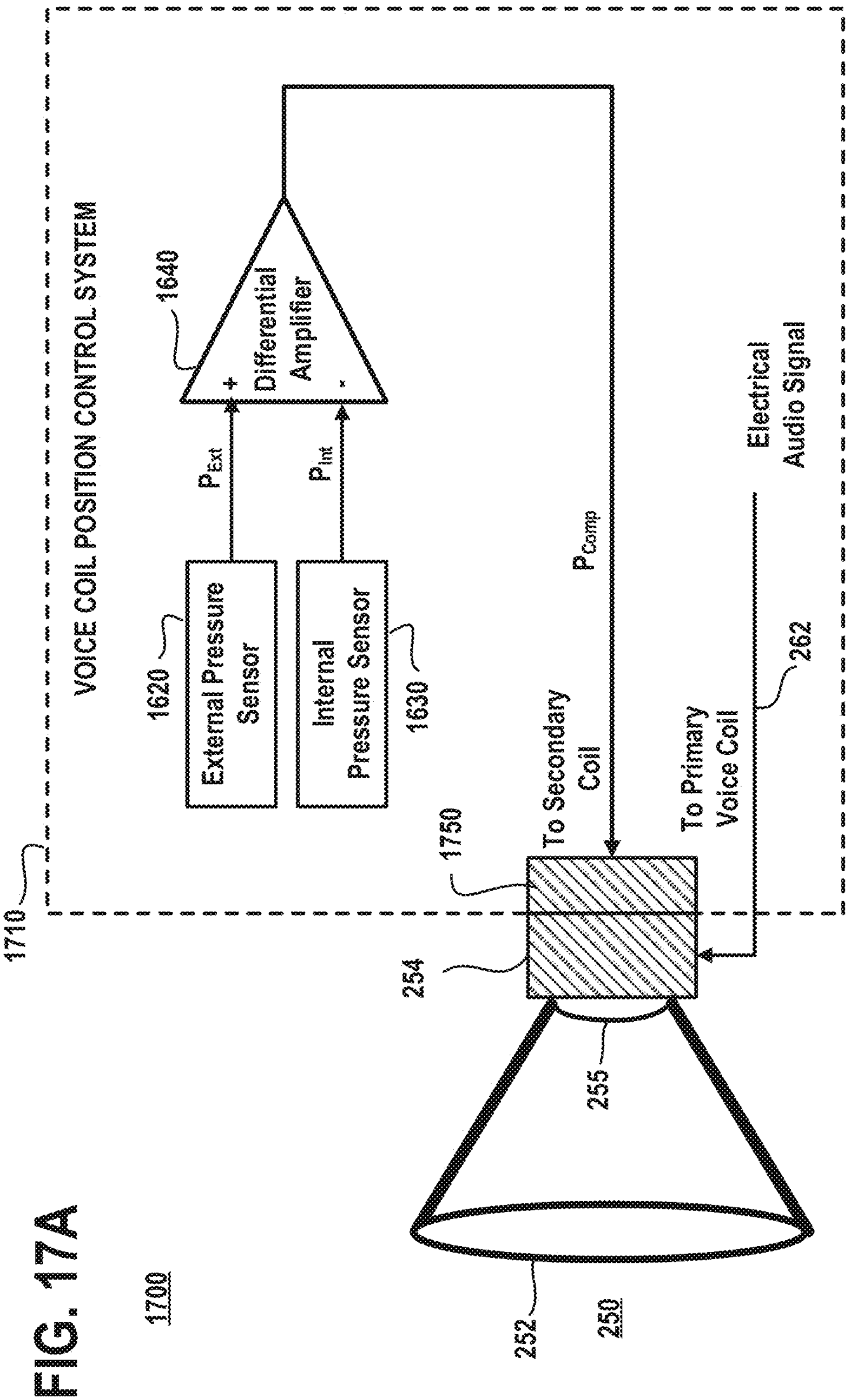
FIG. 17A schematically illustrates a sound reproduction apparatus which comprises a voice coil position control system to compensate for a pressure differential between a front side and a back side of a speaker cone of a speaker, according to another embodiment of the disclosure.

FIG. 17A schematically illustrates a sound reproduction apparatus 1700 which comprises a voice coil position control system 1710 to compensate for a pressure differential between a front side and a back side of a speaker cone of a speaker, according to another embodiment of the disclosure. The voice coil position control system 1710 is similar to the voice coil position control system 1610 of FIG. 16, expect that the position compensation signal $P_{Comp}$ (DC offset signal) is applied to a secondary voice coil winding of the voice coil assembly 254, while the input electrical audio signal (AC signal) is applied the primary voice coil winding of the voice coil assembly 254. In this embodiment, the primary and second voice coil windings are independently terminated, and the voice coil position control system 1710 applies the position compensation signal $P_{Comp}$ to the secondary voice coil winding to drive the voice coil assembly to a target null position.

Figure 17B:
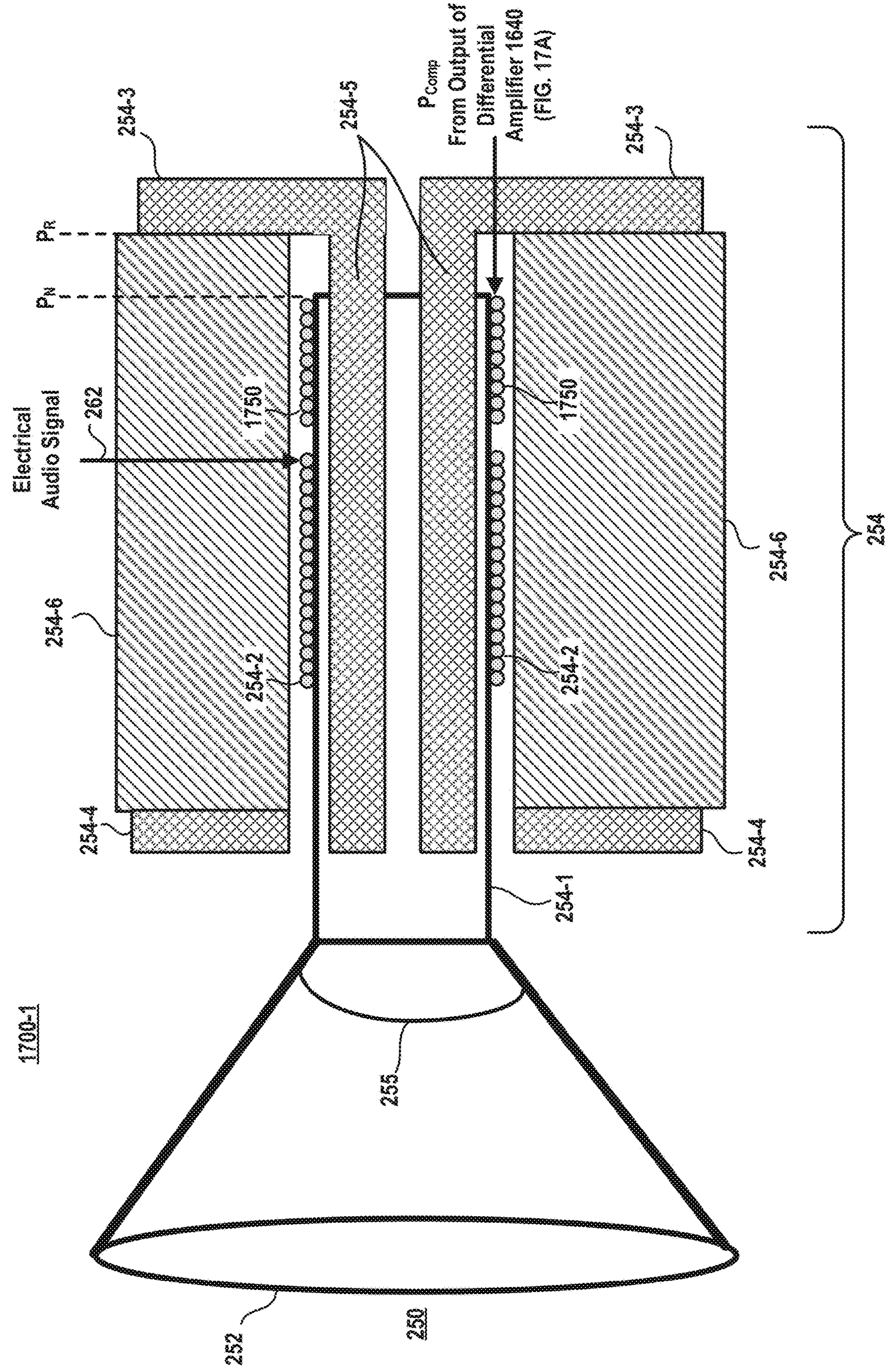
FIG. 17B schematically illustrates a speaker architecture comprising a secondary voice coil winding which is configured to operate in conjunction with the voice coil position control system of FIG. 17A, according to an embodiment of the disclosure.

FIG. 17B schematically illustrates a speaker architecture comprising a secondary voice coil winding which is configured to operate in conjunction with the voice coil position control system of FIG. 17A, according to an embodiment of the disclosure. As schematically illustrated in FIG. 17B, the voice coil assembly 254 of the speaker 250 comprises a cylindrical voice coil former 254-1 (or cylindrical bobbin), a primary voice coil winding 254-2, a secondary voice coil winding 1750, a back plate 254-3, a top plate 254-4, a magnetically conductive pole 254-5, and a ring-shaped magnet 254-6. The speaker cone 252 (or diaphragm) is moved back and forth by the voice coil, wherein the term "voice coil" as used herein denotes an assembly comprising the voice coil former 254-1 and the voice coil windings (e.g., primary voice coil winding 254-2 and secondary voice coil winding 1750). The voice coil windings 254-2 and 1750 each comprise conductive wiring that is wound around the cylindrical voice coil former 254-1. The voice coil is suspended in a magnetic field provided by the permanent magnet 254-6. The magnetically conductive pole 254-5 is disposed within an interior region of the cylindrical voice coil former 254-1. The functions and configuration of such components are well-known, and thus a detailed explanation is not necessary for understanding the embodiments discussed herein.

For ease of illustration, other standard components of the speaker 250 are not shown. For example, such speaker components include a speaker frame (or basket), a surround element which couples the front portion of the speaker cone 252 (or diaphragm) to the speaker frame, a spider element (or damper) which couples a front portion of the voice coil former 252-1 to the speaker frame, electrical terminals, and other standard speaker components. It is to be understood that the speaker configuration shown in FIG. 17B (and other drawings) is merely a high-level schematic depiction of a generic framework that is presented to illustrate inventive aspects of the exemplary embodiments discussed herein with regard to voice coil position control techniques. In this regard, it is to be understood that the exemplary voice coil position control techniques as described herein can be implemented and configured for use with any type of speaker architecture.

As shown in FIG. 17B, the primary voice coil winding 254-2 and the secondary voice coil winding 1750 are independently terminated, wherein the electrical audio signal is applied to the primary voice coil winding 254-2 and the position compensation signal $P_{Comp}$ (DC offset signal) is applied to the secondary voice coil winding 1750. FIG. 17B also includes dashed lines to show a rest position $P_R$ and a null position $P_N$ of the voice coil assembly. In the exemplary embodiments discussed herein, the rest position $P_R$ denotes the furthest position in which a back end of the voice coil former 254-1 can be placed due to the force applied to the front of the speaker cone 252 as a result the difference between the external ambient pressure (applied to the front of the speaker cone 252) and the internal pressure (applied to the back of the speaker cone 252) within the sealed enclosure 210.

The null position $P_N$ denotes a nominal position for placing the voice coil former 254-1 during normal operation of the speaker 250 so that the voice coil former 254-1 can move back and forth about the null position $P_N$ (to maximum positive and negative excursions) while preventing the back end of the voice coil former 254-1 from hitting the back plate 254-3 during operation of the speaker, and while ensuring that the entire primary voice coil winding 254-2 remains overlapped by the ring-shaped magnet 254-6 over the range of maximum positive and negative excursions of the voice coil assembly about the null position. It is to be understood that in some embodiments, the null position $P_N$ of the voice coil assembly denotes a normal resting position of the voice coil assembly in the absence of any differential pressure applied to the front and back sides of the speaker cone 252 (i.e., when the pressure applied to the front and back sides of the speaker cone 252 is the same or substantially the same).

Figure 18A:
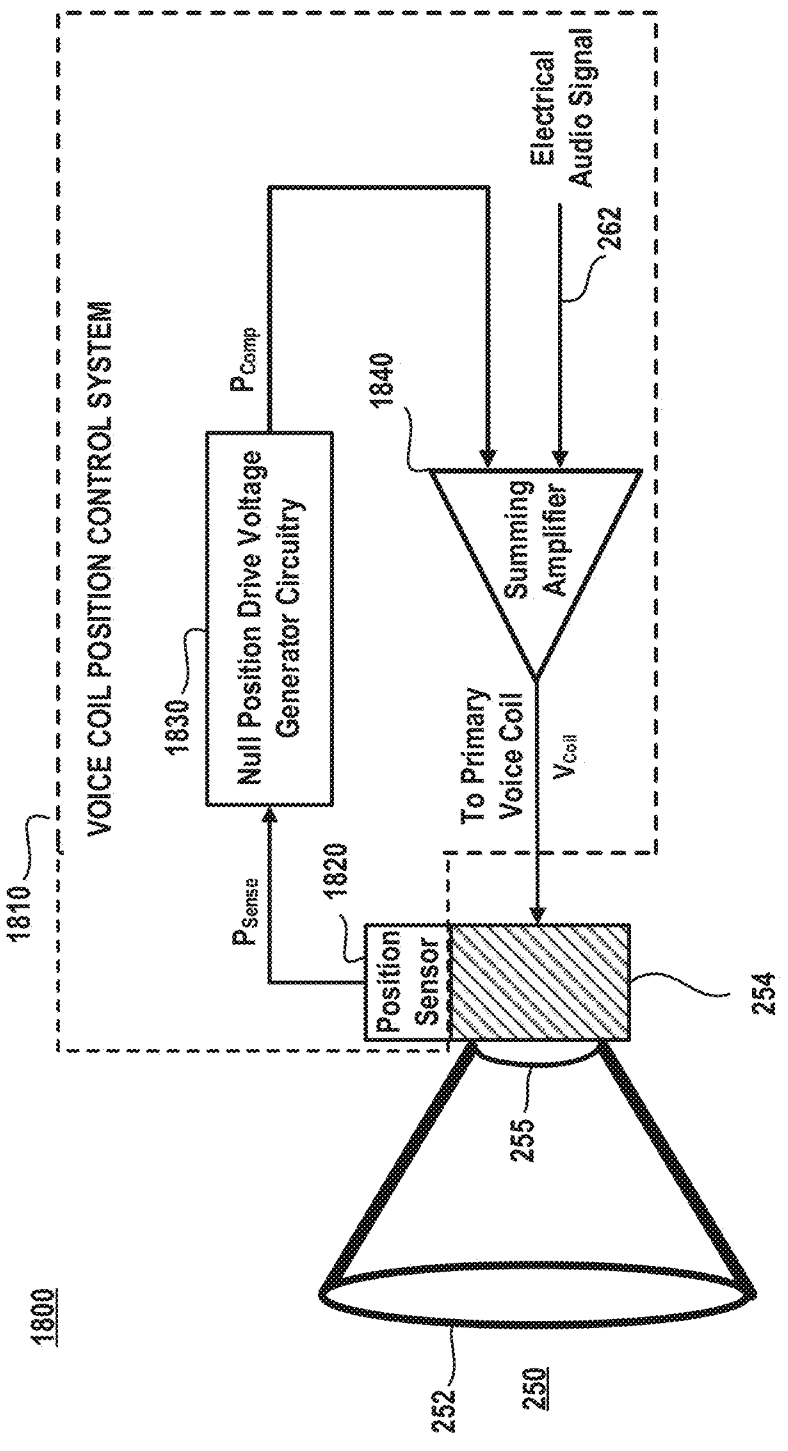
FIG. 18A schematically illustrates a sound reproduction apparatus which comprises a voice coil position control system to compensate for a pressure differential between a front side and a back side of a speaker cone of a speaker, according to yet another embodiment of the disclosure.

FIG. 18A schematically illustrates a sound reproduction apparatus 1800 which comprises a voice coil position control system 1810 to compensate for a pressure differential between a front side and a back side of a speaker cone of a speaker, according to another embodiment of the disclosure. FIG. 18A schematically illustrates another exemplary embodiment of the voice coil position control system 1510 of FIG. 15. The voice coil position control system 1810 comprises a position sensor 1820, null position drive voltage generator circuitry 1830, and a summing amplifier 1840. The position sensor 1820 is configured to detect a position of the voice coil assembly and generate a position sensing signal $P_{Sense}$ that is input to the null position drive voltage generator circuitry 1830. The null position drive voltage generator circuitry 1830 is configured to process the position sensing signal $P_{Sense}$ and generate a position compensation signal $P_{Comp}$. In some embodiments, the position compensation signal $P_{Comp}$ comprises a DC voltage which is applied to the primary voice coil winding (e.g., asymmetric voice coil) to drive the voice coil assembly 254 to a target "null position" (or "0" position) based on magnitude of the position compensation signal $P_{Comp}$.

The summing amplifier 1840 amplifies a sum of the position compensation signal $P_{Comp}$ and the input electrical audio signal (which is an alternating current (AC) signal), and outputs a voice coil drive voltage $V_{Coil}$ which comprises an amplified AC audio signal with a DC offset that corresponds to the position compensation signal $P_{Comp}$. The DC offset component of the voice coil drive voltage $V_{Coil}$ induces a constant EM force on the voice coil to compensate for the pressure differential between the front and back side of speaker cone, which places the voice coil in a suitable null position for proper operation.

The position sensor 1820 and the null position drive voltage generator circuit 1830 can be implemented using various sensor configurations and control circuitry frameworks, exemplary embodiments of which will be explained in further detail below. In some embodiments, the position sensor 1820 is integrated within the voice coil assembly 254 of the speaker 250. In some embodiments, the position sensor 1820 implements a linear encoder framework comprising at least one sensor device (e.g., transducer or read-head) that is paired with at least one encoder scale. The encoder scale comprises an encoded pattern which is read or otherwise detected by the sensor device to determine a position of the voice coil, e.g., an absolute position or a relative position (e.g., relative to a null position or rest position, etc.). The sensor device reads the encoder scale and generates a position sensing signal $P_{Sense}$ (e.g., an analog or digital signal) which is indicative of a position (absolute or relative) of the voice coil. The position sensing signal $P_{Sense}$ is decoded by the null position drive voltage generator circuitry 1830 to generate a position compensation signal $P_{Comp}$ at a given magnitude which is sufficient to position the voice coil at or near a target null position prior to operation of the speaker 250. The position sensing signal $P_{Sense}$ may be processed in its raw format (if in a native useful format) or decoded into a position using an analog or digital calibration system.

It is to be understood that the position sensor 1820 can be implemented using various types of position encoder frameworks to provide sensing and control schemes that are suitable for the given application. For example, a linear encoding framework implemented by the position sensor 1820 can be an absolute encoder or an incremental encoder. An absolute encoder implements an encoder scale in which the encoded markings of the encoder scale generate a unique code for each position of the voice coil over a pre-specified range of detectable positions of the voice coil.

On the other hand, an incremental encoder implements an encoder scale in which the encoded markings are uniform and allow the incremental encoder to count a number of markings that are traversed based on a number of detection pulses that are generated as the encoder scale is moved. The counting is performed relative to one or more reference positions, e.g., a rest position of the voice coil upon power-up of the speaker, or positions that correspond to hard stops or hard limit markings that are encoded at the end portions of the encoder scale, etc. For incremental encoders, position markings that correspond to hard stops or hard limits are utilized for absolute position knowledge or system calibration. While an incremental encoder implements a single detector/encoder scale pair to determine relative position, an incremental encoder can utilize two detector/encoder scale pairs to determine both relative position and direction of movement, which allows the counter to increase or decrease the count value in response to a detected pulse depending on the direction in which the encoder scale is moving.

For example, two adjacent encoder scales E1 and E2 with markings that are positioned 900 out of phase can be used to determine both position and direction. As the encoder scales move (with motion of the voice coil), if the detection pulse generated from E1 is determined to lead the detection pulse generated from E2, it can be determined that the motion is in a first direction. On the other hand, if the detection pulse generated from E2 is determined to lead the detection pulse generated from E2, it can be determined that the motion is in a second direction, opposite the first direction.

The linear encoding can be implemented using standard linear encoder technologies such as optical, magnetic, inductive, capacitive and eddy current types of linear encoding techniques. By way of specific example, with optical encoders, the position sensor 1820 can implement a read head comprising one or more light sources (e.g., infrared LED (light emitting diode), visible LEDs, ultraviolet LEDs, laser diodes, miniature light bulbs, etc.) and one or more light detectors (e.g., light-dependent resistors, photodiodes, photo-transistors, etc.). Further, with optical encoders, one or more reflective encoder scales are disposed on the voice coil, wherein the encoder scales have reflective and non-reflective areas that define the encoded markings which are used to encode and determine the position (either incremental or absolute) of the voice coil. For example, an encoder scale can implement reflective grey code encoder. Within the read head, the LED emits light laterally onto a corresponding encoder scale having the reflective and non-reflective areas. The light is directed back off the reflective areas to a corresponding light detector which generates a detection signal that is decoded to determine the position of voice coil to which the encoder scale is attached.

In other embodiments, a transmissive optical linear encoding scheme can be implemented in which an encoder scale comprises a linear transparent substrate film (e.g., plastic or glass, etc.) with alternating transparent and opaque lines or marking deposited or etched onto the film, wherein the markings on the encoder scale effectively act as shutters that block and unblock light from passing through the encoder scale. In particular, with a transmissive optical linear encoder, a light source (e.g., LED) provides a narrow light beam that is aimed at, and in in alignment with, a light detector (e.g., photodiode), with the encoder scale movably disposed between the fixed positions of the light source and light detectors. As the encoder scale moves with the motion of the voice coil, the light beam is either transmitted through the encoder scale to the light detector, or blocked by the opaque markings of the encoder scale. The light detector generates an output signal that is decoded by the drive voltage generator circuitry 1830 to determine a position of the voice coil. In some embodiments, the light source (e.g., LED) comprises an integral or external collimating or focusing lens to transmit light through a fine reticle slit, and the light that is transmitted through a transparent portion of the encoder scale passes through another fine reticle slit, to another collection lens which focusses the light onto the optical detector.

The frequency response of the light detector (e.g., photodiode) and the signal to noise of the response from light impingent upon the light detector should be suitable to measure position of the voice coil at the frequencies required for sound production. In some embodiments, the linear encoding system is configured to have a frequency response which is at least 10 times the highest frequency reproduced. For example, a zero to 20 KHz sound reproduction in a speaker system would advantageously employ a 200 KHz encoder response. Moreover, the encoder scales and corresponding encoder transmissive or reflective line widths may vary from hundreds of micrometers down to sub-micrometer, wherein various forms of interpolation can be implemented with such linear encoder techniques to resolve position detection down to sub-nanometer resolutions, if desired. Advantageously, linear encoder systems re accurate enough to require no external position compensation.

In some embodiments, the limit or hard stops are disposed at each end of the voice coil former, wherein the limit or hard stops comprise single transmissive or reflective markers on two additional encoder scales, one for each limit or hard stop, with independent read heads that uniquely identify each limit or hard stop. In addition, one or more mechanical, magnetic, capacitive, or optical limit switches may be employed to determine limits or hard stops.

In other embodiments, a linear magnetic encoder is implemented with active (magnetized) encoder scales or passive (variable reluctance) encoder scales, wherein position is sensed using sense-coils, Hall Effect or magnetoresistive read heads. In other embodiments, a capacitive linear encoder is utilized, which is configured to sense the capacitance between a reader and scale. In yet another embodiment, an inductive technology is utilized, which is robust to contaminants, allowing calipers and other measurement tools that are coolant-proof.

It is to be understood that exemplary embodiments of the disclosure are not limited to linear encoders or encoders utilizing the aforementioned technologies. Indeed, any position readout system capable of suitable bandwidth may be employed (e.g., such as a laser interferometer) depending on the costs, desired accuracy, and other desired system properties. In addition, rotary encoders or other forms of encoder may be utilized with a suitable mechanism for translating speaker motion into encoder rotation. For example, in lieu of a voice coil, a high-speed servo motor may be utilized with a rotary encoder optionally through a suitable mechanical reduction system, to move the speaker cone in real-time.

Figure 18B:
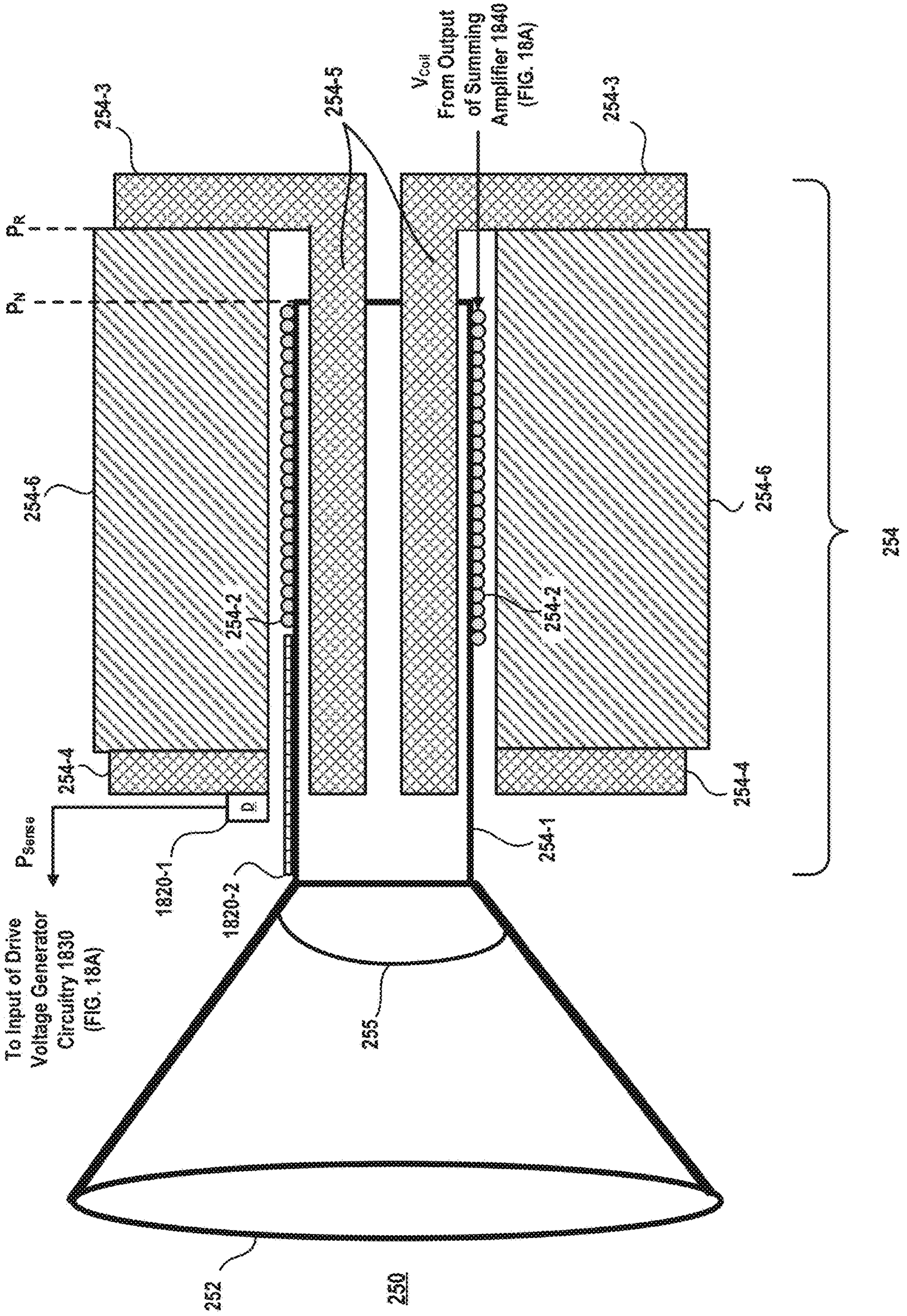
FIG. 18B schematically illustrates a speaker architecture comprising a position sensor system according to an embodiment of the disclosure, which is configured to operate in conjunction with the voice coil position control system of FIG. 18A.

FIG. 18B schematically illustrates a speaker architecture comprising a position sensor system according to an embodiment of the disclosure, which is configured to operate in conjunction with the voice coil position control system 1810 of FIG. 18A. In particular, FIG. 18B schematically illustrates an exemplary architecture of a voice coil assembly 254, which is the same as the voice coil framework shown and described above with reference to FIG. 17A, except that the voice coil assembly 254 in FIG. 18B comprises the primary voice coil winding 254-2 and not a secondary voice coil winding. As shown in FIG. 18B, an exemplary embodiment of the position sensor 1820 (FIG. 18A) comprises a sensor element 1820-1 (e.g., read-head element, transducer, detector, combination LED and photodiode, etc.) and a position encoder 1820-2 (or encoder scale element). In some embodiments, the sensor element 1820-1 and the position encoder 1820-2 are implemented using a reflected binary code (RBC) (or Gray code) scheme in which the position encoder 1820-2 comprises a code pattern that is read by the sensor element 1820-1 (e.g., code pattern where two successive values differ by one bit, e.g., gray code).

In the exemplary embodiment shown in FIG. 18B, the sensor element 1820-1 is mounted to a side surface of the top plate 254-4 of the voice coil assembly 254, and the position encoder 1820-2 is disposed on surface of the voice coil former 254-1 in the front region of the voice coil former 254-1 which couples to the speaker cone 252. The sensor element 1820-1 and the position encoder 1820-2 are disposed in alignment with each other to allow the sensor element 1820-1 to read/sense the position encoder 1820-2 as the voice coil former 254-1 moves back and forth and thereby determine the position of the voice coil former 254-1 based on the detected gray code value of the gray code pattern of the position encoder 1820-2. The position encoder 1820-2 can be integrally formed on a surface of the voice coil former 254-1 or otherwise can be a thin film that is either formed on, or otherwise bonded/adhered to, the surface of the voice coil former 254-1.

Figure 18C:
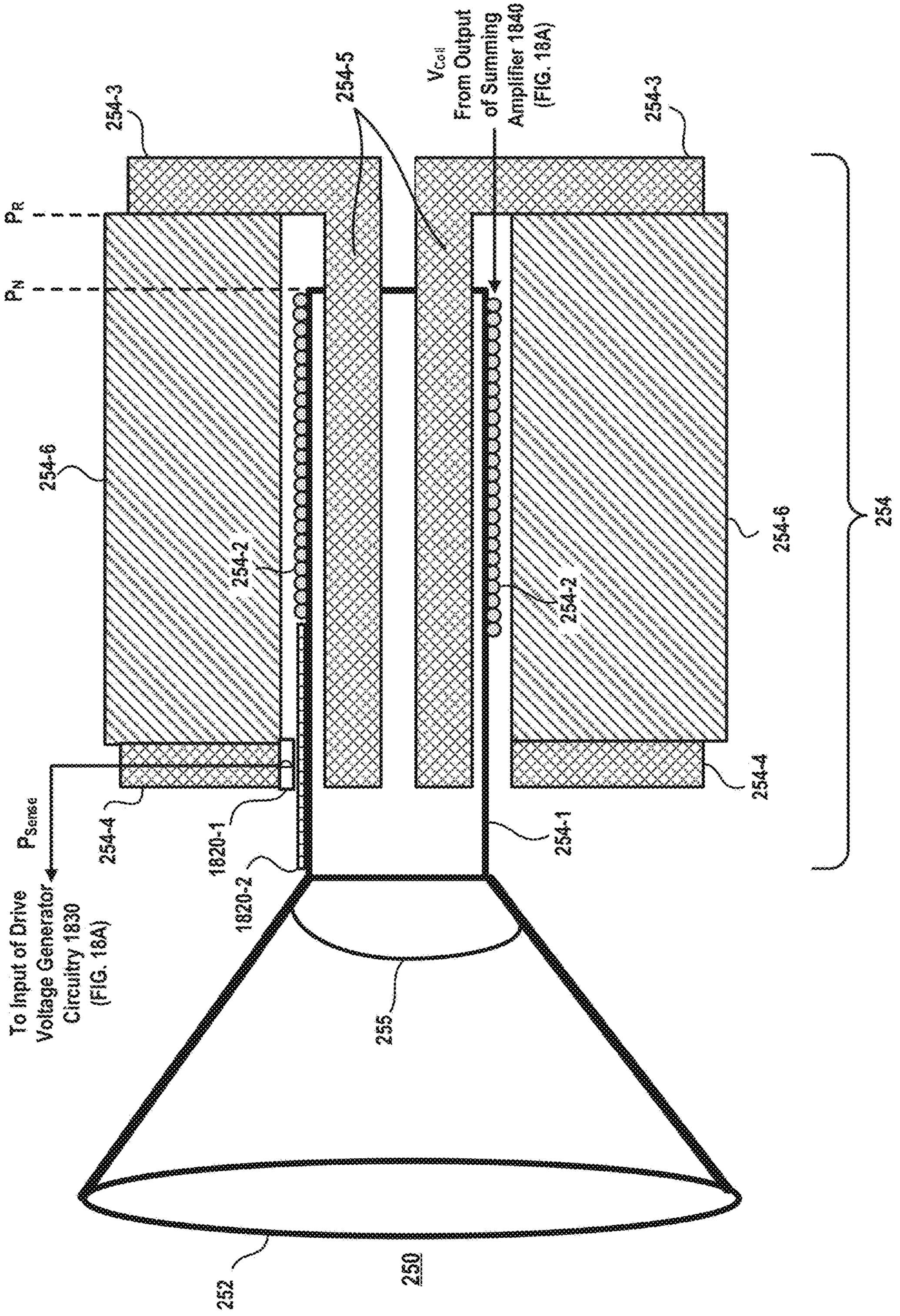
FIG. 18C schematically illustrates a speaker architecture comprising a position sensor system according to another embodiment of the disclosure, which is configured to operate in conjunction with the voice coil position control system of FIG. 18A.

FIG. 18C schematically illustrates a speaker architecture comprising a position sensor system according to another embodiment of the disclosure, which is configured to operate in conjunction with the voice coil position control system of FIG. 18A. FIG. 18C schematically illustrates an exemplary embodiment of the position sensor 1820 comprising a sensor element 1820-1 (e.g., read-head element, transducer, detector, combination LED and photodiode, etc.) and a position encoder 1820-2 similar to FIG. 18B. However, in the exemplary embodiment of FIG. 18C, the sensor element 1820-1 is mounted to a bottom surface of the top plate 254-4 of the voice coil assembly 254 such that the sensor element 1820-1 is disposed in a space between the voice coil former 254-1 and the magnet 254-6.

Figure 18D:
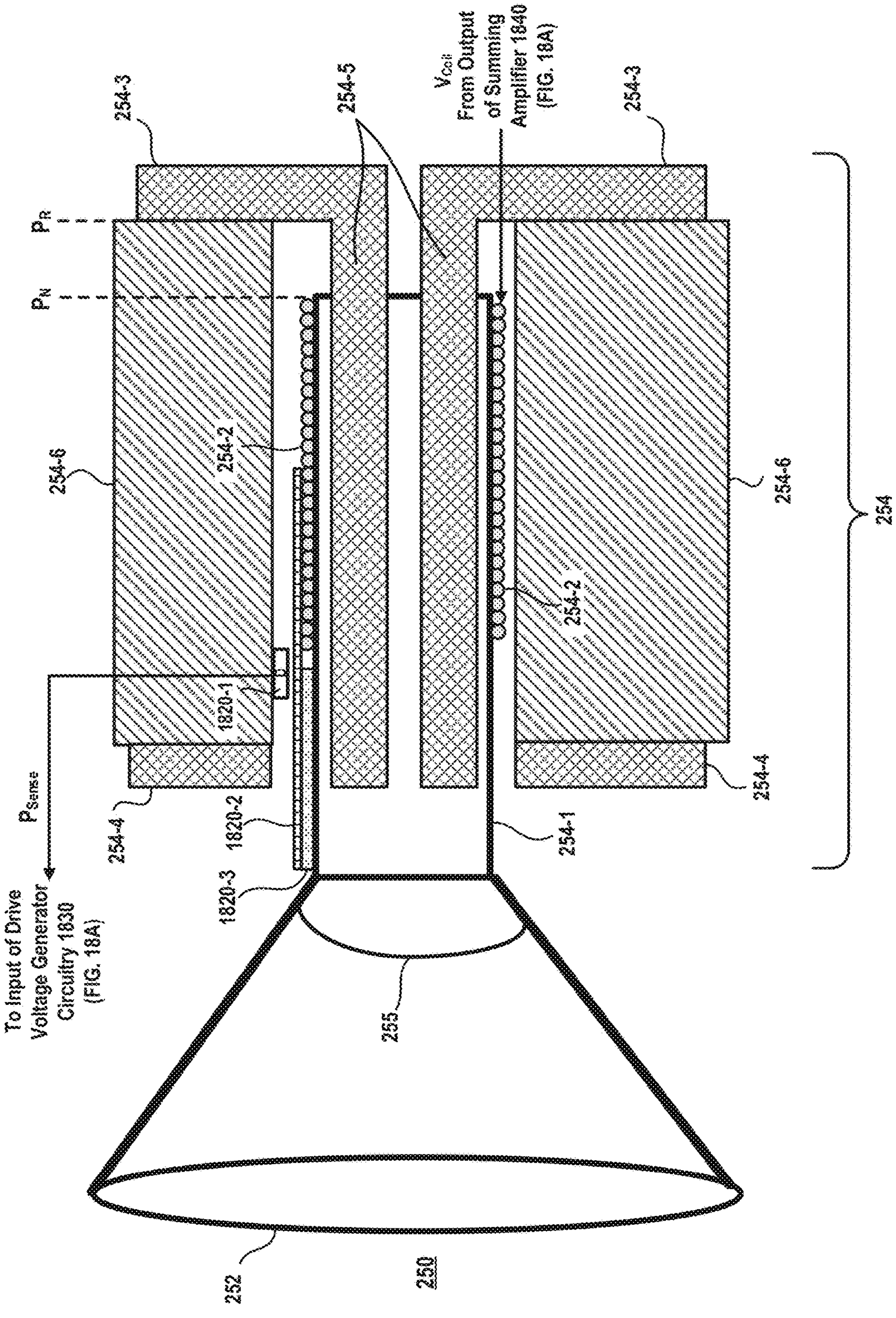
FIG. 18D schematically illustrates a speaker architecture comprising a position sensor system according to another embodiment of the disclosure, which is configured to operate in conjunction with the voice coil position control system of FIG. 18A.

FIG. 18D schematically illustrates a speaker architecture comprising a position sensor system according to another embodiment of the disclosure, which is configured to operate in conjunction with the voice coil position control system of FIG. 18A. FIG. 18D schematically illustrates an exemplary embodiment of the position sensor 1820 comprising a sensor element 1820-1 (e.g., read-head element, transducer, detector, combination LED and photodiode, etc.) and a position encoder 1820-2 similar to the embodiments of FIGS. 18B and 18C. However, in the exemplary embodiment of FIG. 18D, the sensor element 1820-1 is mounted to a surface of the magnet 254-6 and is disposed in a space between the voice coil former 254-1 and the magnet 254-6. In addition, the position encoder 1820-2 spans a length of the front portion of the voice coil former 254-1 and a portion of the primary voice coil winding 254-2. In addition, a standoff element 1820-3 is disposed on a surface in the front region of the voice coil former 254-1 to compensate for the offset in height of the voice coil winding 254-2. In this instance, the position encoder 1820-2 can be a thin film that is either formed on, or otherwise bonded/adhered to, the surface of the standoff structure 1820-3 and the voice coil winding 254-2.

Figure 18E:
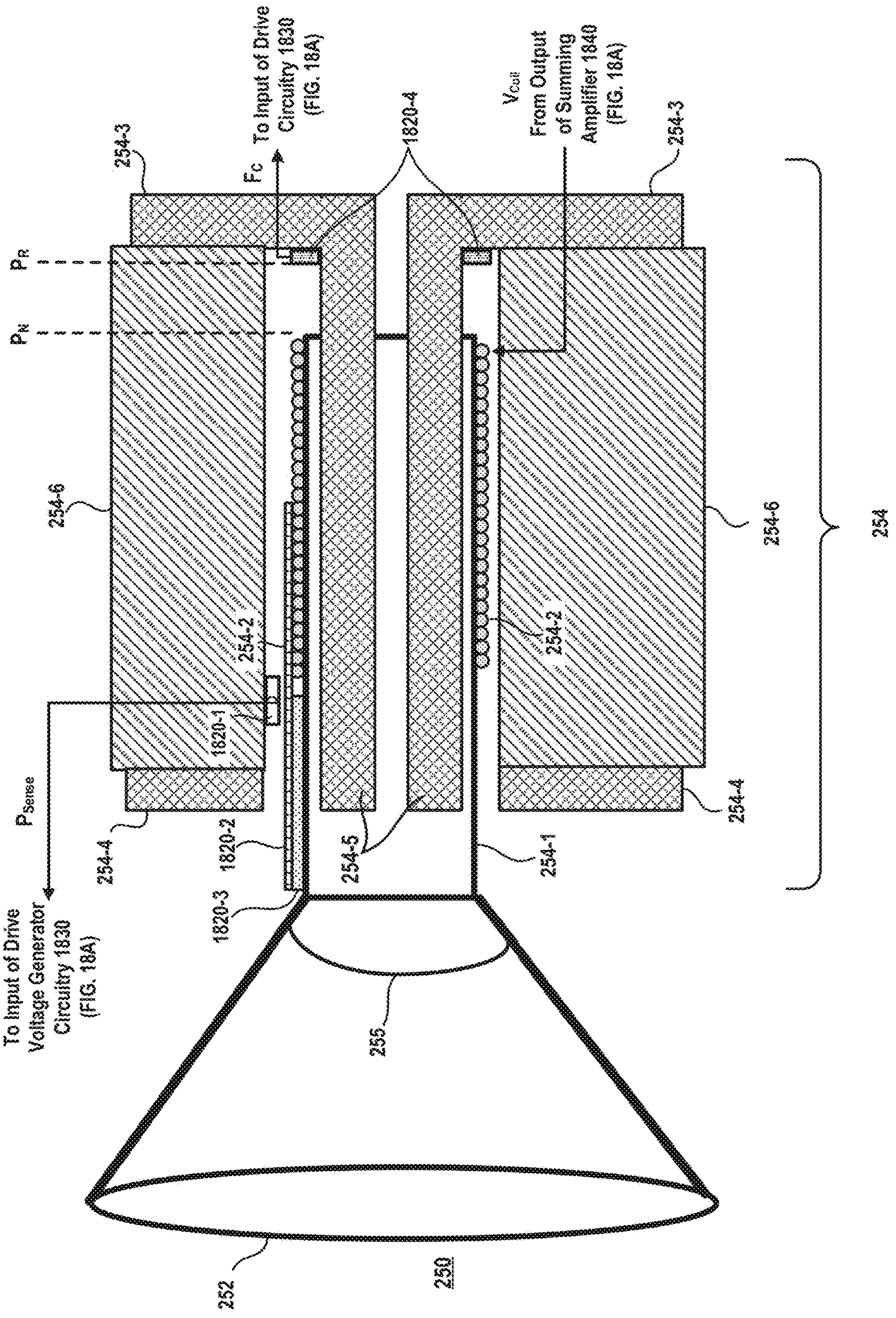
FIG. 18E schematically illustrates a speaker architecture comprising a position sensor system and an internal pressure sensor, which are configured to operate in conjunction with the voice coil position control system of FIG. 18A, according to another embodiment of the disclosure.

FIG. 18E schematically illustrates a speaker architecture comprising a position sensor system and an internal pressure sensor, which are configured to operate in conjunction with the voice coil position control system of FIG. 18A, according to another embodiment of the disclosure. In particular, FIG. 18E schematically illustrates an exemplary embodiment of the position sensor 1820 comprising a sensor element 1820-1 (e.g., read-head element, transducer, detector, combination LED and photodiode, etc.) and a position encoder 1820-2 similar to the embodiments of FIGS. 18B, 18C, and 18D. However, FIG. 18E schematically illustrates an extended embodiment of FIG. 18D, wherein a force sensor 1820-4 is positioned on the inner surface wall of the back plate 254-3 (or rest stop element) to detect the force that the voice coil assembly asserts in the rest position when the speaker is not being used and differential pressure is applied to the front and back side of the speaker cone 252. In this embodiment, when a differential force is applied to the speaker cone 252 due to a relatively larger external ambient pressure applied to the front side of the speaker cone 252 as compared to a reduced internal pressure applied to the back side of the speaker cone 252, the back end of the voice coil former 254-1 will push up against the force sensor 1820-4 with a certain magnitude of force which is indicative of the differential pressure.

In this instance, when the speaker 250 is first powered up, the force sensor 1820-4 can generate a force control signal $F_C$ which is indicative of the magnitude of the force applied by the voice coil former 254-1 on the force sensor 1820-4. The force control signal $F_C$ is input to the null position drive voltage generator circuitry 1830 (FIG. 18A), which in turn generates a position compensation signal $P_{Comp}$ to drive the primary voice coil 254-1 and position the voice coil former 254-1 at or near the null position $P_N$. In this instance, the force control signal $F_C$ can provide a coarse position adjustment, while the sensor element 1820-1 and position encoder 1820-2 operate as discussed above to provide a fine-tune adjustment for placing the voice coil former 254-1 into the target null position $P_N$. In this embodiment, the sensing system can be calibrated such that different values of the force control signal $F_C$ are determined, a priori, to correspond to different magnitudes of force detected by the force senor 1820-4.

It is to be understood that while FIGS. 18B-18E illustrate one sensor element 1820-1 (e.g., read-head element, transducer, detector, combination LED and photodiode, etc.) that is paired with one position encoder 1820-2, one or more additional sensor/encoder scale element pairs can be utilized for various purposes such as, but not limited to, determining direction of movement of the voice coil in an incremental encoder implementation, or implementing hard stops at the ends of the voice coil former 254-1 using transmissive or reflective markers on two additional encoder scales, one for each limit or hard stop, with independent read heads that uniquely identify each limit or hard stop, etc. In addition, for optical transmissive encoder implementations, the sensor element 1820-1 may comprise an LED that directs light through the encoder scale (e.g., element 1820-2) to an optical detector that is fixedly aligned to the sensor element 1820-1.

For example, in FIG. 18B, an optical detector can be fixedly disposed on the end of the magnetically conductive pole 254-5 within an interior region of the cylindrical voice coil former 254-1 and aligned to the sensor device 1820-1 (which comprises a light source such as an LED). In this instance, the encoder scale 1820-2 would be disposed over an open slot formed in the voice coil former 254-1 or disposed over a transparent window formed in the surface of the voice coil former 254-1 to thereby allow light to be transmitted from the sensor device 1820-1 to the optical detector through an optically transparent region of the encoder scale 1820-2 and the open slot or transparent window formed in the voice coil former 254-1. Those of ordinary skill in the art can readily envision other structural configurations and arrangements for implementing the requisite sensor/encoder scale element pairs for different encoder implementations.

It is to be understood that the null position drive voltage generator circuitry 1830 can be implemented using various framework to provide sensing and control schemes that are suitable for the given application. For example, the null position drive voltage generator circuitry 1830 can be configured with different components depending on whether the position sensing/detection and voice coil positioning is implemented based on an "incremental" or "absolute" encoding framework, and/or based on whether or not the force sensors 1820-4 (FIG. 18E) are utilized. For example, in one exemplary embodiment of an absolute linear encoding scheme, the position sensor 1820 in FIG. 18A will generate an absolute position feedback signal, and the null position drive voltage generator circuitry 1830 uses a look-up table to determine a digital code that corresponds to the proper DC voltage needed to drive the voice coil to a null position based on the absolute position feedback signal. In some embodiments, the null position drive voltage generator circuitry 1830 comprises a D/A converter to generate the DC drive voltage in response to the digital code and comprises a sample/hold circuit to maintain the drive voltage at the proper DC level (after an initialization stage when the voice coil is placed in proper null position) while the speaker is being utilized under normal operation.

It should be noted that the summing functions performed by the summing amplifiers discussed above may be performed at any step in the process, such as before pre-amplification or amplification, and with any type of signal, electrical, optical, wireless, etc. In addition, in other embodiments, a position compensation signal can be generated based on a voice coil back electromotive force (EMF). For example, a secondary voice coil (e.g., 1750, FIG. 17B) is ideally suited to measure back EMF.

In other embodiments, the pressure compensation systems and methods as discussed above in connection with FIGS. 14-18E can be implemented in the system of FIG. 12, to compensate for the increased pressure applied to the front of the speaker cone 252 (via the acoustic coupling device 1210) as compared to the reduced pressure level behind the speaker cone within the reduced pressure environment in the enclosure 210.

FIG. 19 schematically illustrates a sound reproduction apparatus 1900 which comprises a voice coil position control system to compensate for a pressure differential between a front side and back side of an earphone device, according to another embodiment of the disclosure. In particular, the sound reproduction apparatus 1900 illustrates an exemplary embodiment for implementing a wireless noise attenuating earphone device (e.g., headset, EarPod, AirPod etc.) to provide high fidelity audio reproduction capability through the use of an earphone device with an evacuated or low-pressure enclosure, while simultaneously providing passive sound isolation of the listener to eliminate unwanted noise from the external environment. As shown in FIG. 19, the apparatus 1900 (or earphone device 1900) comprises a wireless receiver 1910 which is configured to receive wireless audio data input signals, a wired digital audio data input 1920, an A/D converter 1930 configured to receive wired analog audio input data 1932, an input selector module 1940 (e.g., multiplexer circuitry), a data decompression module 1950, an earphone controller/driver module 1960, an earphone 1970, and a power source 1980. The earphone 1970 comprises a housing 1972, a voice coil assembly 1974, and a speaker cone 1976, wherein the voice coil assembly 1974 is disposed in an evacuated chamber 1972-1 within the housing 1972.

Similar to the exemplary embodiments discussed above for FIGS. 14-18E, the housing 1972 and speaker cone 1976 are structurally configured and designed to maintain a reduced pressure level within the evacuated chamber 1972-1, which is less than an ambient air pressure level outside the housing 1972. For example, the pressure inside the housing 1972 can be reduced to at least 10%, 15%, 20%, 25%, 30%, 35%, 40%, 45%, 50%, 55%, 60%, 65%, 70%, 75%, 80%, 85%, 90%, or 95% lower than the ambient air pressure level outside the housing 1972, or more generally, in a range of about 10% to about 95% less than the ambient pressure level outside the housing 1972.

The wireless receiver 1910 is configured to receive command data and audio data through one or more of existing or future wireless transmission technologies. For example, in some embodiments, the wireless receiver 190 is configured to operate using Wi-Fi technologies defined by IEEE standards such as Wi-Fi 802.11a, 802.11b, 802.11g, 802.11n, 802.11h, 802.11i, 802.11-2007, 802.11-2012, 802.11ac, 802.11adj, 802.11af, 802.11-2016, 802.11ah, 802.11ai, 802.11aj, 802.11aq, 802.11ax (Wi-Fi 6), 802.11ay. In some embodiments, the wireless receiver 1910 supports multiple Wi-Fi versions for compatibility with a wide variety of transmitting devices such as cell phones, personal digital assistants, and other sources of audio.

In other embodiments, the wireless receiver 1910 utilizes Bluetooth wireless technologies either alone, or in addition to Wi-Fi wireless technologies, to wirelessly receive command and audio data. As is known in the art, Bluetooth operates at frequencies between 2402 and 2480 MHz, or 2400 and 2483.5 MHz including guard bands 2 MHz wide at the bottom end and 3.5 MHz wide at the top. Bluetooth utilizes a radio technology called frequency-hopping spread spectrum. Bluetooth divides transmitted data into packets, and transmits each packet on one of 79 designated Bluetooth channels. Each channel has a bandwidth of 1 MHz. It usually performs 1600 hops per second, with adaptive frequency-hopping (AFH) enabled. Bluetooth Low Energy uses 2 MHz spacing, which accommodates 40 channels.

In other embodiments, the wireless receiver 1910 utilizes cellular wireless technologies either alone, or in addition to Wi-Fi and/or Bluetooth technologies, to wirelessly receive command and audio data. The wireless receiver 1910 can utilize any generation of cellular technology capable of transmitting audio data at a suitable bandwidth, e.g., $4^{th}$ generation cellular technology (4G), $5^{th}$ generation cellular technology (5G), etc. In other embodiments, the wireless receiver 1910 can utilize any existing or future method or transmitting audio data such as infrared photons, visible photons, analog or digital radio frequency transmission, or any other methodology which provides a suitable data transmission bandwidth for audio reproduction.

While the earphone device 1900 can implement wireless audio input alone, in other embodiments, the earphone device 1900 can also be configured for wired audio input through the wired digital audio input 1920 (which is connected to a digital audio data source) and/or the wired analog input to the A/D converter 1930 (which is connected to an analog audio data source). The A/D converter 1930 is configured to convert the analog audio data to digital data for processing by the earphone controller/driver module 1960.

In embodiments where the earphone device 1900 is configured with multiple audio data inputs, the input selector module 1940 is configured to select an input audio source either automatically, manually, or via external automatic or user command. The input selector module 1940 is an optional component which may not be utilized in embodiments where the earphone device 1900 is configured with a single audio data input (e.g., wireless only implementation). The audio data that is transmitted to the earphone device 1900 can be uncompressed audio data or compressed audio data. In embodiments where compressed audio data is received by the earphone device 1900, the data decompression module 1950 is configured to decode the compressed data using any suitable data decompression techniques.

The earphone controller/driver 1960 comprises a voice coil position control system that is the same or similar to any one of the exemplary embodiments of the voice coil position control systems described above, for example, in conjunction with FIGS. 15, 16, 17A, 17B, 18A, 18B, 18C, 18D and 18E. In this regard, the earphone controller/driver 1960 is configured to generate voice coil driver signals to control primary and/or secondary coils of the earphone 1970. The earphone controller/driver 1960 is responsive to position sensor feedback signals from one or more voice coil position sensors to generate the voice coil driver signals based on detected positions of the voice coil assembly 1974 of the earphone 1970 using the same or similar techniques as discussed herein.

The power source 1980 provide DC supply power to operate the various components 1910, 1930, 1940, 1950, and/or 1960 of the earphone device 1900. In some embodiments, the power source 1980 comprises an internal power source such as a battery or cell that is rechargeable or disposable. For a rechargeable battery, a wired input power feed 1982 can be connected to the power source 1980 to recharge the battery using an external power source. In other embodiments, a source of power can be transmitted to the earphone device 1900 through, e.g., the wireless receiver 1910, the wired digital audio input 1920, or the wired analog audio input 1932 and captured using known techniques.

It is to be appreciated that the evacuated chamber 1972-1 serves multiple functions. For example, the evacuated chamber 1972-1 enhances the audio fidelity through the elimination of undesired out of phase audio waves that could otherwise be input to an individual's ear. In addition, the evacuation chamber 1972-1 provides external noise attenuation and/or elimination of external acoustic signals and sounds.

While FIG. 19 illustrates the earphone device 1900 having one earphone 1970, in some embodiments, the earphone device 1900 is physically configured using a standard headset architecture having two earpieces that are either joined by a mechanical device or completely separated with no external electrical or mechanical connections between the two earpieces. In this instance, the wired and/or wireless inputs and power may be fully duplicated in each earpiece or shared commonly between earpieces and operatively coupled via wires or wireless signals. In other embodiments, the headset can be configured with a combined headphone and microphone with either a single earpiece or double earpiece.

Depending on the type and structural configuration of the earphone device 1900, the earphone 1970 may be configured to be partially inserted or wholly inserted within an ear canal of an individual. In other embodiments, the earphone 1970 may be configured to be partially inserted or wholly inserted within an ear pinna of an individual. In other embodiments, the earphone 1970 may be configured to be disposed partially external or wholly external to an ear pinna of an individual. In other embodiments, the earphone 1970 is configured to partially surround or wholly surround an ear pinna of an individual.

FIG. 20 schematically illustrate a sound isolation apparatus 2000 for implementation with an earphone according to another embodiment of the disclosure. The apparatus 2000 comprises an earphone 2002 (e.g., EarPod, AirPod, headset earpiece, etc.) and a housing 2004 (rigid or semi-rigid housing), wherein the earphone 2002 is disposed in an evacuated chamber 2004-1 within the housing 2004. Similar to the exemplary embodiments discussed above, the housing 2004 and earpiece 2002 are structurally configured and designed to maintain a reduced pressure level within the evacuated chamber 2004-1, which is less than an ambient air pressure level outside the housing 2004. For example, the pressure inside the housing 2004 can be reduced to at least 10%, 15%, 20%, 25%, 30%, 35%, 40%, 45%, 50%, 55%, 60%, 65%, 70%, 75%, 80%, 85%, 90%, or 95% lower than the ambient air pressure level outside the housing 2004, or more generally, in a range of about 10% to about 95% less than the ambient pressure level outside the housing 2004. The exemplary embodiment of FIG. 20 implements sound isolation techniques using an evacuated chamber that is disposed outside a standard earphone 2002 to provide isolation from external sounds without the need for any active electronics.

While the housing 2004 is generically and schematically shown in FIG. 20 for illustrative purposes, it is to be understood that the housing 2004 would be structurally configured for its intended use for insertion (partially or wholly) into an ear canal of an individual, while being structurally designed to prevent the housing 2004 from being crushed or collapsing due to the external ambient pressure being greater than the internal pressure within the evacuated chamber 2004-1. In some embodiments, the housing 2004 can be formed of a semi-rigid, flexible material that is supported by an internal flexible micro-frame structure to prevent the housing 2004 from collapsing due to the pressure differential, while being pliable or malleable to be insertably fitted into the ear canal of an individual.

Although illustrative embodiments of the present disclosure have been described herein with reference to the accompanying figures, it is to be understood that the embodiments of the inventions discussed herein are not limited to those precise embodiments, and that various other changes and modifications may be made therein by one skilled in the art without departing from the scope of the appended claims.

What is claimed is:

1. An earphone device comprising:
- an earphone comprising a speaker cone and a voice coil assembly coupled to the speaker cone;
- a sealed enclosure, wherein a front side of the speaker cone is disposed outside the sealed enclosure and a back side of the speaker cone is disposed inside the sealed enclosure, wherein sealed enclosure is configured to maintain a gas pressure level inside the sealed enclosure which is lower than an ambient air pressure level outside the sealed enclosure; and
- a control system configured to generate a position control signal and apply the position control signal to a voice coil of the voice coil assembly;
- wherein the position control signal is configured to generate an electromagnetic force that is sufficient to move the voice coil to a target null position, while allowing the voice coil to move back and forth about the null position in response to an audio signal applied to the voice coil during operation of the earphone.

2. The earphone device of claim 1, wherein the earphone is configured to be one of inserted partially and inserted wholly within an ear canal of an individual.

3. The earphone device of claim 1, wherein the earphone is configured to be one of inserted partially and inserted wholly within an ear pinna of an individual.

4. The earphone device of claim 1, is configured to be one of partially external and wholly external to an ear pinna of an individual.

5. The earphone device of claim 1, wherein the earphone is configured to one of partially surround or wholly surround an ear pinna of an individual.

6. The earphone device of claim 1, wherein the gas pressure level inside the sealed enclosure is in a range of 10% to 95% lower than the ambient air pressure level outside the sealed enclosure.

7. The earphone device of claim 1, wherein the control system comprises a summing amplifier, wherein the summing amplifier comprises a first input to receive the position control signal, and a second input to receive the audio signal.

8. The earphone device of claim 7, wherein summing amplifier is configured to (i) combine the position control signal and the audio signal to thereby generate a voice coil control signal and (ii) apply the voice coil control signal to a primary voice coil winding of the voice coil.

9. The earphone device of claim 1, wherein the control system is configured to (i) apply the position control signal to a secondary voice coil winding of the voice coil, and (ii) apply the audio signal to a primary voice coil winding of the voice coil.

10. The earphone device of claim 1, wherein the control system comprises:

control signal generator circuitry which is configured to generate the position control signal that is applied to the voice coil; and a force sensor fixedly positioned on an inner surface of a rest stop element of the voice coil assembly;

wherein the force sensor is configured to detect an amount of force that the voice coil asserts against the rest stop element when the voice coil is in a rest position when the earphone is initially powered up and differential pressure is applied to the front and back side of the speaker cone; and wherein the force sensor is configured to generate a force control signal which is indicative of the detected amount of force that the voice coil asserts against the rest stop element with the voice coil in the rest position.

11. The earphone device of claim 10, wherein:

the force control signal is applied to the control signal generator circuitry;

the control signal generator circuitry is configured to utilize the force control signal to generate an initial position control signal upon power up of the earphone; and the control system is configured to utilize the initial position control signal to cause a coarse position adjustment of the voice coil to the target null position upon the power up of the earphone.

12. The earphone device of claim 1, wherein a gas within the sealed enclosure comprises air.

13. The earphone device of claim 1, wherein a gas within the sealed enclosure comprises an inert gas such as dry nitrogen.

14. The earphone device of claim 1, wherein the control system comprises a position sensor which is configured to determine a position of the voice coil, and generate a position feedback control signal which is utilized by the control system to generate the position control signal.

15. The earphone device of claim 14, wherein:

the position sensor comprises:

a sensor device fixedly coupled to the voice coil assembly; and a position encoder scale element which is disposed on a movable element of the voice coil assembly, and which is aligned to the sensor device; and the sensor device is configured to read the position encoder scale element to detect a position of the movable element of the voice coil assembly and generate the position feedback control signal in response to the detected position of the movable element.

16. The earphone device of claim 15, wherein the movable element comprises a voice coil former of the voice coil assembly.

17. The earphone device of claim 15, wherein the movable element comprises a primary voice coil winding of the voice coil assembly.

18. The earphone device of claim 15, wherein the position sensor comprises at least one of an absolute linear encoding system and an incremental linear encoding system.

* * * * *